(12) United States Patent
Ly et al.

(10) Patent No.: US 11,470,168 B2
(45) Date of Patent: Oct. 11, 2022

(54) INTERWORKING SERVICE FOR THE RESTFUL INTERNET OF THINGS

(71) Applicant: CONVIDA WIRELESS, LLC, Wilmington, DE (US)

(72) Inventors: Quang Ly, North Wales, PA (US); Chonggang Wang, Princeton, NJ (US); Xu Li, Plainsboro, NJ (US); Mahmoud Watfa, Saint Leonard (CA); Dale N. Seed, Allentown, PA (US); Rafael A. Cepeda, London (GB); Owen Griffin, Reading (GB)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/754,152

(22) PCT Filed: Oct. 12, 2018

(86) PCT No.: PCT/US2018/055595
§ 371 (c)(1),
(2) Date: Apr. 7, 2020

(87) PCT Pub. No.: WO2019/075317
PCT Pub. Date: Apr. 18, 2019

(65) Prior Publication Data
US 2021/0211509 A1    Jul. 8, 2021

Related U.S. Application Data

(60) Provisional application No. 62/571,493, filed on Oct. 12, 2017.

(51) Int. Cl.
*H04L 67/51* (2022.01)
*H04L 41/22* (2022.01)
(Continued)

(52) U.S. Cl.
CPC ............. *H04L 67/51* (2022.05); *H04L 41/22* (2013.01); *H04L 67/12* (2013.01); *H04L 69/08* (2013.01); *H04L 69/321* (2013.01)

(58) Field of Classification Search
CPC ......... H04L 67/16; H04L 67/12; H04L 41/22; H04L 69/08; H04L 69/321
See application file for complete search history.

(56) References Cited

U.S. PATENT DOCUMENTS 9,872,122 B2 *  1/2018  Iwai ........................ H04L 43/04
9,979,606 B2 *  5/2018  Gupta .................. H04L 41/145
(Continued)

FOREIGN PATENT DOCUMENTS

EP    3496357 A1 *  6/2019  ......... H04L 67/2823

OTHER PUBLICATIONS

Jaffey et al., "Hypercat 3.00 Specification" Feb. 2016, 41 pages.
(Continued)

*Primary Examiner* — Blake J Rubin
(74) *Attorney, Agent, or Firm* — BakerHostetler

(57) ABSTRACT

An interworking service entity receives server registration requests including indications of service layer protocols used by each server, maintains a repository of server information, and uses the repository for interworking requests of devices to servers of different protocols based on a server type provided in discovery requests. Other matching information may include, for example, server security protocol, supported services, service territory, availability, capacity, or loading, as device information or preferences, such as supported service, supported interface type, or a supported device type.

19 Claims, 37 Drawing Sheets

(51) Int. Cl.
*H04L 67/12* (2022.01)
*H04L 69/08* (2022.01)
*H04L 69/321* (2022.01)

(56) References Cited

U.S. PATENT DOCUMENTS

| | | | | |
|---|---|---|---|---|
| 10,104,180 | B2 * | 10/2018 | Seed | H04W 4/70 |
| 10,136,244 | B2 * | 11/2018 | Bhalla | H04L 69/08 |
| 10,148,739 | B2 * | 12/2018 | Yu | H04L 67/12 |
| 10,193,851 | B2 * | 1/2019 | Bhalla | H04W 60/04 |
| 10,419,931 | B1 * | 9/2019 | Sohail | G06F 8/65 |
| 2013/0346564 | A1 | 12/2013 | Warrick et al. | |
| 2015/0381776 | A1 * | 12/2015 | Seed | H04L 5/0055 709/203 |
| 2016/0007137 | A1 * | 1/2016 | Ahn | H04L 41/0681 370/254 |
| 2016/0277530 | A1 | 9/2016 | Jung et al. | |
| 2016/0286590 | A1 * | 9/2016 | Cheng | H04W 4/08 |
| 2017/0006141 | A1 * | 1/2017 | Bhadra | H04W 4/70 |
| 2017/0064488 | A1 * | 3/2017 | Granzow | H04W 4/70 |
| 2017/0093915 | A1 * | 3/2017 | Ellis | H04W 12/08 |
| 2017/0150330 | A1 * | 5/2017 | Kim | H04W 48/16 |
| 2017/0180208 | A1 * | 6/2017 | Smith | H04W 4/70 |
| 2017/0359237 | A1 * | 12/2017 | Hao | H04W 12/069 |
| 2018/0007172 | A1 * | 1/2018 | Wang | H04L 67/24 |
| 2018/0191729 | A1 * | 7/2018 | Whittle | H04L 67/01 |
| 2018/0227128 | A1 * | 8/2018 | Church | H04L 63/0853 |
| 2018/0270188 | A1 * | 9/2018 | Kodaypak | H04L 63/0428 |
| 2018/0316673 | A1 * | 11/2018 | Shah | H04W 12/06 |
| 2018/0316755 | A1 * | 11/2018 | Keum | H04L 65/40 |
| 2018/0324671 | A1 * | 11/2018 | Palnati | H04W 8/26 |
| 2019/0114061 | A1 * | 4/2019 | Daniels | G06F 3/04847 |

OTHER PUBLICATIONS

OneM2M Technical Specification TS-0001 V3.5.0 "Functional Architecture", Apr. 2017, 461 pages.
Open Connectivity Foundation (OCF) "OIC Core Specification V1.1.1 Part 1", Copyright 2016, 151 pages.
Shelby et al., CoRE Internet-Draft, "CoRE Resource Directory draft-ietf-core-resource-directory-10", Mar. 2017, 52 pages.

* cited by examiner

| | | |
|---|---|---|
| Application Layer | Application logic | Business logic |
| | SL protocol | oneM2M, OCF, W3C WoT, OMA LwM2M, CoRE RD |
| | Payload format | JSON, XML, CBOR, Plain Text |
| | Application protocol | HTTP, CoAP, MQTT |
| Transport Layer | Transport protocol | TCP, UDP |
| IP Layer | IP protocol | IPv4, IPv6 |

Figure 1

Data Model Mapping Table: LWM2M, oneM2M

| LWM2M | oneM2M |
|---|---|
| /0 (Security) | dmSecurity (mgmtObj) |
| /1 (Server Info) | dmServerInfo (mgmtObj) |
| /2 (Access Control) | accessControlPolicy |
| /3 (DeviceInfo) | deviceInfo (mgmtObj) |
| /4 (Connectivity) | dmConnectivity (mgmtObj) |
| /5 (Firmware Update) | Firmware (mgmtObj) |
| /6 (Location) | deviceLoc (mgmtObj) |
| /7 (Connectivity Stats) | connectStats (mgmtObj) |

Versions:
oneM2M R2.3
LwM2M 1.0

Last Updated:
20170707T112233

Add   Delete   Update

Figure 33

INTERWORKING SERVICE FOR THE RESTFUL INTERNET OF THINGS

CROSS-REFERENCE TO RELATED APPLICATIONS

This application is the National Stage Application of International Patent Application No. PCT/US2018/055595 filed Oct. 12, 2018, which claims the benefit of U.S. Provisional Application No. 62/571,493 filed on Oct. 12, 2017, entitled "Interworking Service for the RESTful Internet of Things, the content of which is hereby incorporated by reference in its entirety.

BACKGROUND

Machine-To-Machine (M2M), Internet-of-Things (IoT), and Web-of-Things (WoT) network deployments may employ unicast and multicast communications between nodes such as M2M/IoT/WoT servers, gateways, and devices which host M2M/IoT/WoT applications and services. Such network deployments may include, for example, constrained networks, wireless sensor networks, wireless mesh networks, mobile ad-hoc networks, and wireless sensor and actuator networks, and operate according to various standards, such as oneM2M, OCF, IETF CoRE RD, Hyper-CAT, W3C WoT, or OMA LWM2M.

SUMMARY

An interworking service entity facilitates discovery, registration, and interoperability of IoT devices and servers that operate according to different protocols, thus, for example, enabling dynamic configuration of IoT networks post deployment. The interworking service entity processes registration and discovery requests, and other communications, in accordance with data repositories of server information and device information, along with mapping tables, policies, protocol units, API definitions, and the like to effect server matching, translation, and message forwarding services. Communications with devices and servers may use multiple protocol units. Mapping tables and policies, for example, may be modified by authorized users or entities via web interfaces.

For example, an interworking service entity may receive server registration requests, where each request includes an indication of a service layer protocol by each server. The interworking service entity may then maintain a repository of such server information, and use the repository to match a device to a server when the device provides a discovery request that includes an indication of a server type sought by the device. Similarly, servers may provide other information, such as an indication of a security protocol, a supported service, a service territory, an availability, a capacity, or a loading, which the interworking service entity may use in finding a match between a device seeking a service and a server providing the service, albeit via a different protocol. Devices may similarly provide information such as a supported service, a supported interface type, or a supported device type to assist the interworking service entity in finding a matching server.

Once a device and server are matched, the interworking service entity may further facilitate communication between the device and server by forwarding, relaying, translation, or otherwise processing messages between device and server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

FIG. 1 illustrates example high-layer components of an IoT protocol stack.

FIG. 33 shows an example graphical user interface of a data model mapping table.

DETAILED DESCRIPTION

Figure 2:
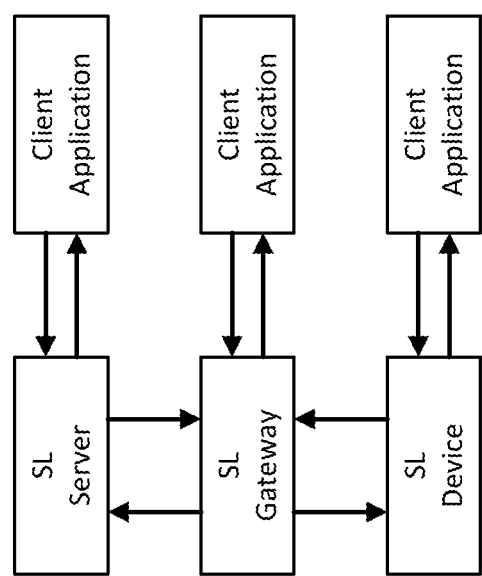
FIG. 2 illustrates an example system architecture for IoT client-server operations.

The benefits of the Internet of Things (IoT) will be more fully realized when multiple and disparate "connected" devices are able to communicate with each other, and be accessible, in a seamless manner. This is proving difficult to achieve as the race to implement IoT solutions has resulted in a multitude of different, isolated IoT platforms supporting different connected sensors and devices. Initial efforts to standardize the way devices are accessed and share information has been started by Standards Developing Organizations (SDOs) such as oneM2M, ETSI, OCF, W3C, IETF, and OMA, among others. The emerging problems with these standardization activities include vendors being uncertain as to which standards to adopt, on the one hand, and limited physical and economical resources preventing the implementation of multi-standard compatibility in devices.

With multiple private and standardized Service Layer (SL) platforms in the market, the key issue to solve now is how these platforms may integrate and interoperate in a seamless manner. Taking a smart city deployment as an example, city planners may be commissioned to acquire the best sensors within a price range. Currently, vendors of connected devices usually develop their own proprietary platforms, and therefore the data from their devices is only available and locked within their platforms. As a result, cities end up with many incompatible systems and disconnected datasets preventing effective and coordinated city planning. In another example, a smart home, such as the example smart home shown in FIG. 4, may have different standard-compatible devices that cannot be controlled or accessed using a single standardized protocol. The reason being is that each device will only have connectivity to a particular standard. Consequently, users will be forced to use multiple applications to interact with their connected devices, with these devices existing in isolated groups.

Current interworking developments within some SDOs are focused on interworking other IoT technology platforms to their respective frameworks. For example, there are interworking developments within oneM2M that interworks other IoT technologies such as OCF, LWM2M, etc. to oneM2M. However, the expected and currently growing market for IoT-enabled devices is becoming so large that interoperability across multiple private and standardized IoT technology platforms is crucial to enable the next generation of interworking connected devices.

In addition, and due to the rapid development of devices for specific purposes, the current solutions for device configuration in SL protocols may not work for all devices. Typically, the device configuration is one of pre-provisioning information onto the IoT-enabled device. For headless devices, this may be an issue as there is no user interface to update their configuration. An alternative method is to use device management (DM), which requires certain over-head that includes communicating to a DM server to obtain configuration information. Finally, a device may discover relevant configuration data using discovery mechanisms, but constrained devices may not have enough resources to be programmed to discover relevant information from them and programmatically use it to communicate to the IoT system. When interworking is factored in, the process becomes more complex as the device configuration information of multiple SL protocols may be different, which places an extra burden to the user who is deploying the device.

An interworking entity may solve the need for interoperability of IoT devices from different IoT technology platforms, facilitate access to data, and provide for a more simplified device configuration process. The interworking entity will need to support various IoT protocols and provide interworking among these different protocols. In addition, the entity may support providing device configuration services on behalf of devices to offload a crucial but sometimes difficult requirement for the devices. Finally, the interworking entity will be in position to expose data and devices, from a particular private or standardized IoT platform, for external consumption through Application Programming Interfaces (APIs), web portals, or any other technologies that may use current or future web protocols.

The growing market for generic and specific IoT solutions is growing so large that multiple IoT standards are fundamental to integrate and unleash the full potential of the IoT. With many emerging applications relying on IoT, and the lack of a framework to share data across multiple systems, an interworking service may help solve the fragmentation of having devices from multiple IoT protocols communicate with each other. The service may provide interworking at the message level where information in a message is formatted from one protocol to another protocol. The IoT entities, hence, receive messages in their native protocols and may not be aware that the message originated from another protocol. The interworking service may also assist in the device configuration process to simplify the deployment of IoT devices and may expose devices and their data, originally from a single framework, to external applications.

An Interworking Service such as those described herein may achieve several goals. First is defining a system architecture for an Interworking Service to interface to IoT servers and IoT devices and to offer interworking communications between different IoT standards.

Second is providing a procedure for IoT servers to register to the Interworking Service to advertise their services to IoT devices. The procedure exposes an interface to the IoT server to enable interworking via the Interworking Service without needing to support alternative protocols.

Third is providing a generic IoT Server Discovery procedure for IoT devices and other IoT servers to discover available IoT servers using common application protocol bindings available in all SL standards. The IoT Server Discovery procedure may also assist with device configuration of IoT devices to make deployment easier.

Fourth is providing a capability for discovering IoT devices who host their own resources and registering the device to an available IoT server for advertising the resources available on the devices.

Fifth is providing external web-based interfaces, or supported standard-based interfaces, that expose the IoT devices, data, and IoT servers the Interworking Service manages, and also providing for extensible updates to mapping tables that are critical for interworking.

Sixth is defining interworking procedures with the Interworking Service to offer mixed SL standard communications among IoT devices. Embodiments are provided for interworking a request from one SL protocol to another, for interworking a response from one SL protocol to another, and for interworking between SL protocol systems such as oneM2M, OCF, IETF CoRE RD, HyperCAT, W3C WoT, OMA LWM2M, and the like.

TABLE 1

Abbreviations

| | |
|---|---|
| 3GPP | 3rd Generation Partnership Project |
| AE | Application Entity |
| CBOR | Concise Binary Object Representation |
| CoAP | Constrained Application Protocol |
| CoRE | Constrained RESTful Environments |
| CSE | Common Services Entity |
| CSF | Common Services Function |
| DM | Device Management |
| ETSI | European Telecommunications Standards Institute |
| GUI | Graphical User Interface |
| HTTP | Hypertext Transfer Protocol |
| IETF | Internet Engineering Task Force |
| IoT | Internet of Things |
| IP | Internet Protocol |
| IPE | Interworking Proxy Entity |
| IPv6 | Internet Protocol version 6 |
| JSON | JavaScript Object Notation |
| LwM2M | Lightweight Machine-to-Machine |
| M2M | Machine-to-Machine |
| MBMS | Multimedia Broadcast/Multicast Service |
| MQTT | Message Queue Telemetry Transport |
| OCF | Open Connectivity Foundation |
| OIC | Open Interconnect Consortium |
| OMA | Open Mobile Alliance |
| RD | Resource Directory |
| SCEF | Service Capability Exposure Function |
| SDO | Standards Developing Organization |
| SL | Service Layer |
| TCP | Transmission Control Protocol |
| UDP | User Datagram Protocol |
| URI | Uniform Resource Identifier |
| W3C | World Wide Web Consortium |
| WoT | Web of Things |
| XML | eXtensible Markup Language |

Herein, the term "client" generally refers to an application that initiates a request to a server entity to obtain some information about resources hosted on the server. A client application may run on a device as a standalone application and may be referred to as a client device. In IoT, clients may also have server capabilities if they are able to accept notifications or process requests. Generally, clients do not host resources.

Herein, the terms "headless device" and "headless application" generally refer to a device or an application that does not have a user interface via which configuration information may be provided. Such a device or application has to be configured using a network connection or through some hardware port such as a serial port.

Herein, the term "IoT" refers to all Machine-To-Machine (M2M), Internet-of-Things (IoT), and Web-of-Things (WoT) network deployments, e.g., servers, gateways, and devices which host M2M/IoT/WoT applications and services, such as are used on oneM2M, OCF, IETF CoRE RD, HyperCAT, W3C WoT, and OMA LWM2M networks.

Herein, the terms "IoT server" and "SL server" generally refer to a server entity that operates within an IoT system. An IoT server is generically any server in the system while a SL server is an IoT server that implements a particular SL protocol. The terms are used interchangeably herein.

Herein, the term "primitive message" generally refers to a message formatted according to a service layer protocol in which devices that implement such a protocol may communicate with each other.

Herein, the term "server" generally refers to an entity that hosts resources and offers services to client applications. Servers receive and process requests from client applications. Examples are web servers and service layer servers such as an oneM2M CSE. Servers may also have client capabilities if they are able to send or initiate a request to another server or device.

Herein, the term "procedure" generally refers to methods, devices, and architectures for achieving certain functionality. The term "procedure" is often used in lieu of "method" to avoid confusion with the term "method" as applied to IoT protocols. The procedures described herein should be understood as being adaptable, for example, to being performed in a variety contexts and a variety ways, including altering the exact steps and sequence of steps, without departing from the spirit of the concepts disclosed.

The Internet of Things (IoT) is a technology concept in which devices encompassing everyday objects may be connected to a network for communicating to other objects, exchange data and make this data available to derive insight and information. As a result, there is potential for billions and billions of networked, or connected, devices to communicate with each other and generate large amounts of data for consumption and analysis. To take advantage of these possibilities, multiple Standards Developing Organizations (SDOs) have formed to define a standardized way in which these connected devices may operate with each other and be accessible through a common format. Organizations such as oneM2M, ETSI, OCF, W3C, IETF, OMA, etc. have set out to define such a standard.

The standards development from each SDO share common elements in the service layer (SL) protocols they define. FIG. 1 shows the upper layers of an IoT protocol stack, in which different SL protocols and supporting protocols are listed for each layer. At the very top of the Application layer is the software that implements the desired business logic that creates the initial message content. Underneath the application logic are the SL protocols themselves. The payloads of the SL protocols are encoded in a format such as JSON or XML and the entire message is encoded using an Application protocols such as HTTP, CoAP or MQTT. The resulting message is then encapsulated within a Transport Layer protocol (e.g., TCP or UDP) and then within an IP protocol (e.g., IPV4 or IPv6) before being sent to the lower layers for distribution.

For each SL protocol, there are bindings to the various payload and application protocols shown in FIG. 1. In fact, some SL protocols have bindings to multiple payload formats, and possibly multiple application protocols as well. As a result, one SL protocol may share the use of the same payload formats and application protocols as another SL protocol. The difference then among different SL protocols is the information required within a primitive message at the service layer. This information mainly consists of SL identifiers, the data model representation of SL entities, the required data for a primitive message, and how the SL protocol binds to the underlying protocols.

Figure 3:
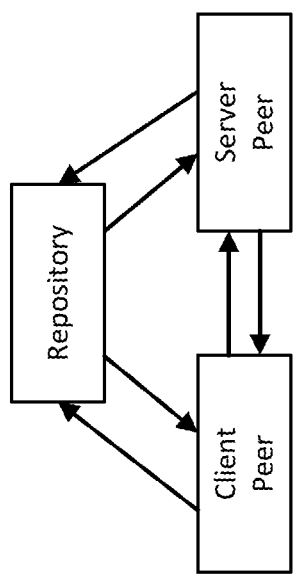
FIG. 3 illustrates an example system architecture for IoT peer-to-peer operations with a central repository.

Service layer architectures usually take the form of either a client-server architecture, as illustrated in FIG. 2, or a peer-to-peer architecture, as illustrated in FIG. 3. In a client-server architecture, a client initiates communications by sending a request to a server. The server, which hosts resources that clients access, provides the capability to return data or to perform some operation as requested by the clients. The server operates as a centralized entity that may be scaled to process many requests from client applications. If a device running a client application has resources, it will store its resources on the server and let the server manage those resources. In the example of FIG. 2, the servers SL Server, SL Gateway, and SL Device all have both server functionalities, such as accepting requests, and client functionalities, such as initiating or sending requests. The Client Applications mainly have client functionality but may also have server functionality if they support receiving notifications. Thus, the main difference between server and client functionality is that servers host resources while clients do not.

In the example peer-to-peer architecture shown in FIG. 3, two or more entities communicate in a distributed manner in a decentralized system. The peers themselves may have both client and server functionalities but for a given communications link, one peer performs the role of a client while the other peer performs the role of a server. The same semantics of resource hosting applies here as in the client-server architecture. However, peers host their own resources instead of hosting them on a centralized server. A repository may exist to host resource links on behalf of a peer to support cases when the peer may not be available, for example during sleep cycles. Clients may discover the resource links from the repository and access the resource's content directly on the peer owning the resource.

Another component of SL protocols (e.g., oneM2M, OMA) is the method to perform device configurations, which entails giving IoT devices information on how to connect to and communicate with an IoT server. The information consists of the contact address of the IoT server, some identifiers, security credentials, information to include in the initial request, and other protocol specific information. An IoT device must somehow discover or be provisioned with this information about the SL server it is going to communicate with. The device configuration is typically performed through pre-provisioning of the SL server information to IoT devices prior to deployment. An alternative method is to use a SL feature such as device management to download the information to the IoT device. A third method is to use a configuration tool to provision the information but the mechanisms on how to do so are usually not specified by the SL protocol.

Figure 4:
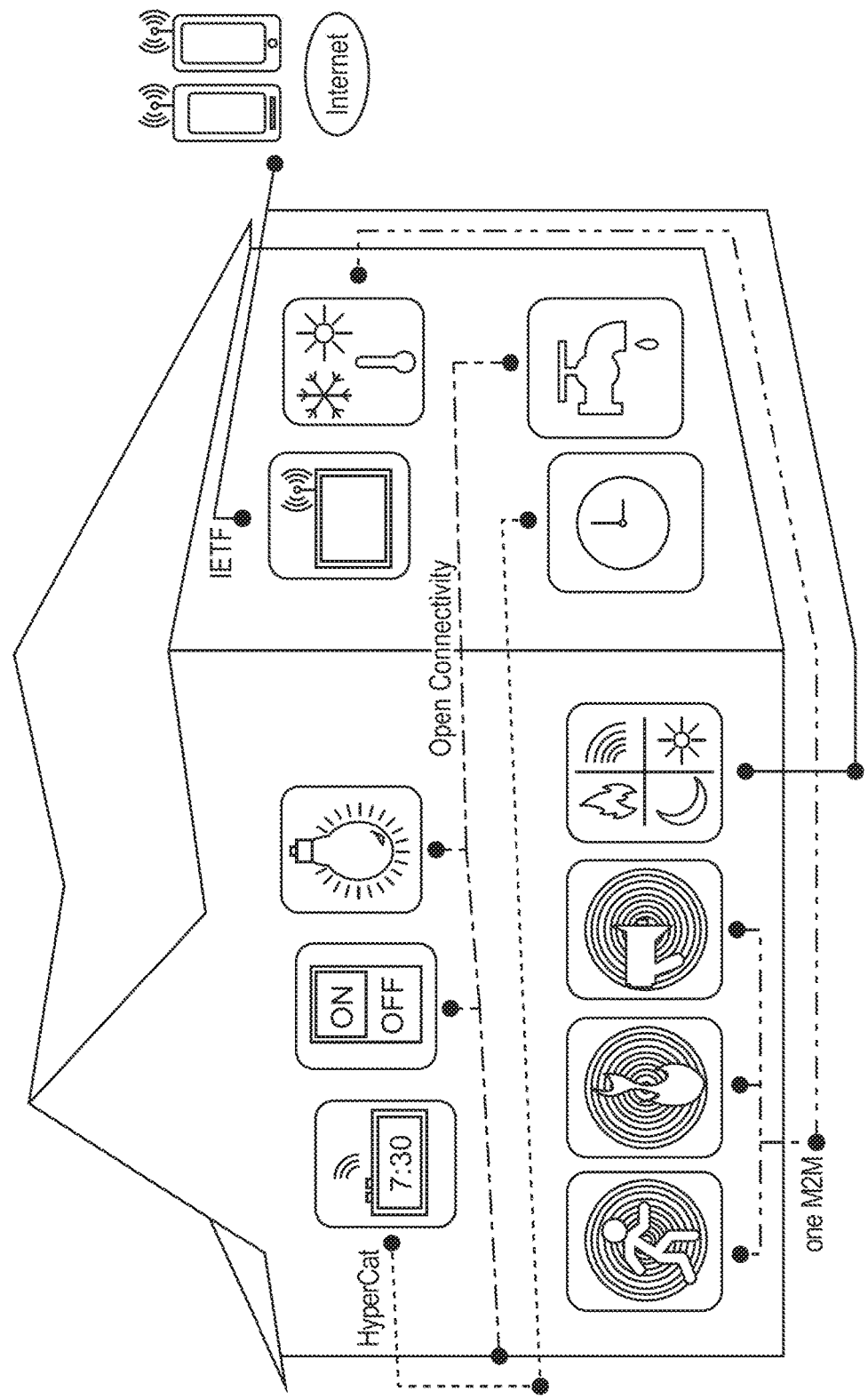
FIG. 4 illustrates an example smart home.

With the proliferation of connected devices, proprietary platforms and SDOs developing IoT standards, the issue of interoperability arises. Take for example a home automation use case in which various IoT devices are deployed. These devices may operate using SL protocols from different SDOs, as shown in the example of FIG. 4. In this example, four different SL protocols are used by IoT devices deployed in the home. As a result, the devices are not accessible or able to communicate or work with each other in a coordinated manner. Instead, the homeowner needs to have multiple applications that are compliant with one or more of the four different used standards to control all the devices in the home. This adds undue complexity to the management of the devices on the homeowner, who may want one device, from one standard, to follow action from input to another device belonging to another standardized platform.

Figure 5:
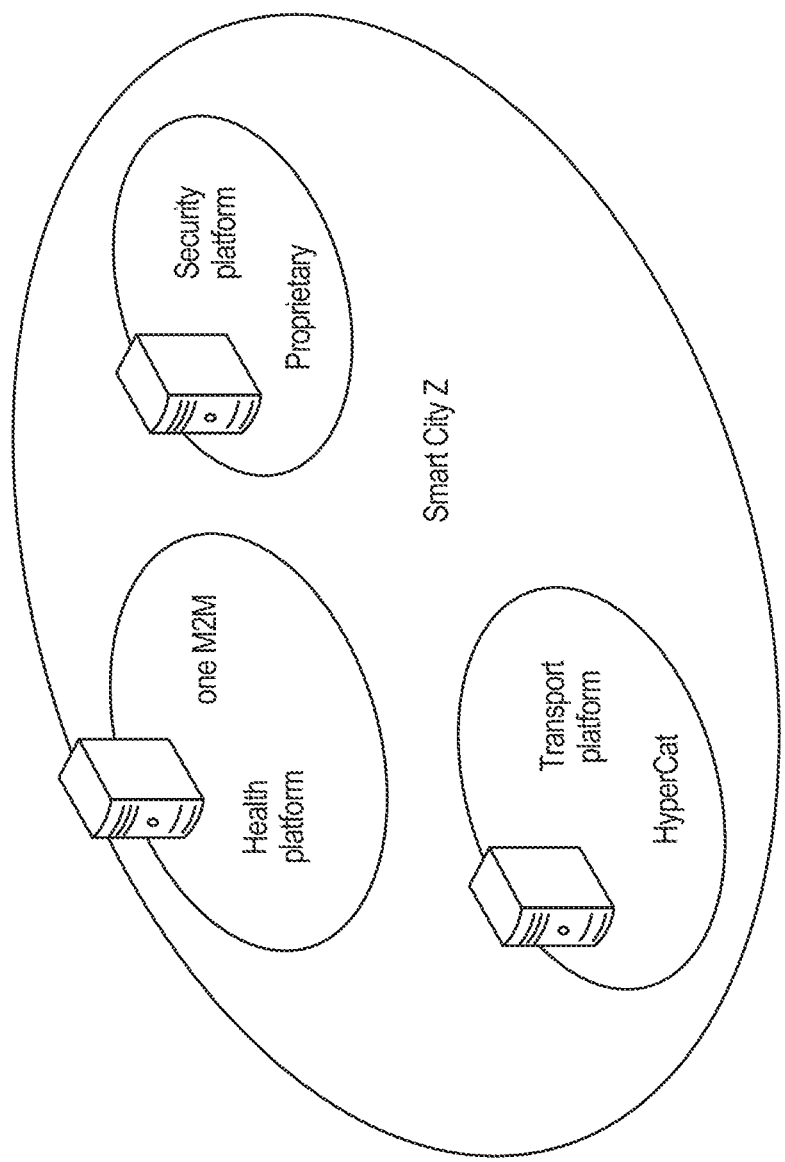
FIG. 5 illustrates an example smart city.

FIG. 5 shows a similar use case in a smart city deployment. The local government of a city wants to improve the services offered to its citizens by deploying IoT-enabled sensors connected to an underlying platform. However, the city has limited resources and money to purchase, configure, and monitor the IoT infrastructure. Consequently, the city ends up with a mix of isolated devices and locked data repositories using different SL protocols. In the short-term, this solution fulfills the city's expectations for each specific sector, at the cost of preventing the future creation of more comprehensive cross-sector solutions by having interconnectivity across all their IoT-enabled devices and platforms.

Figure 6:
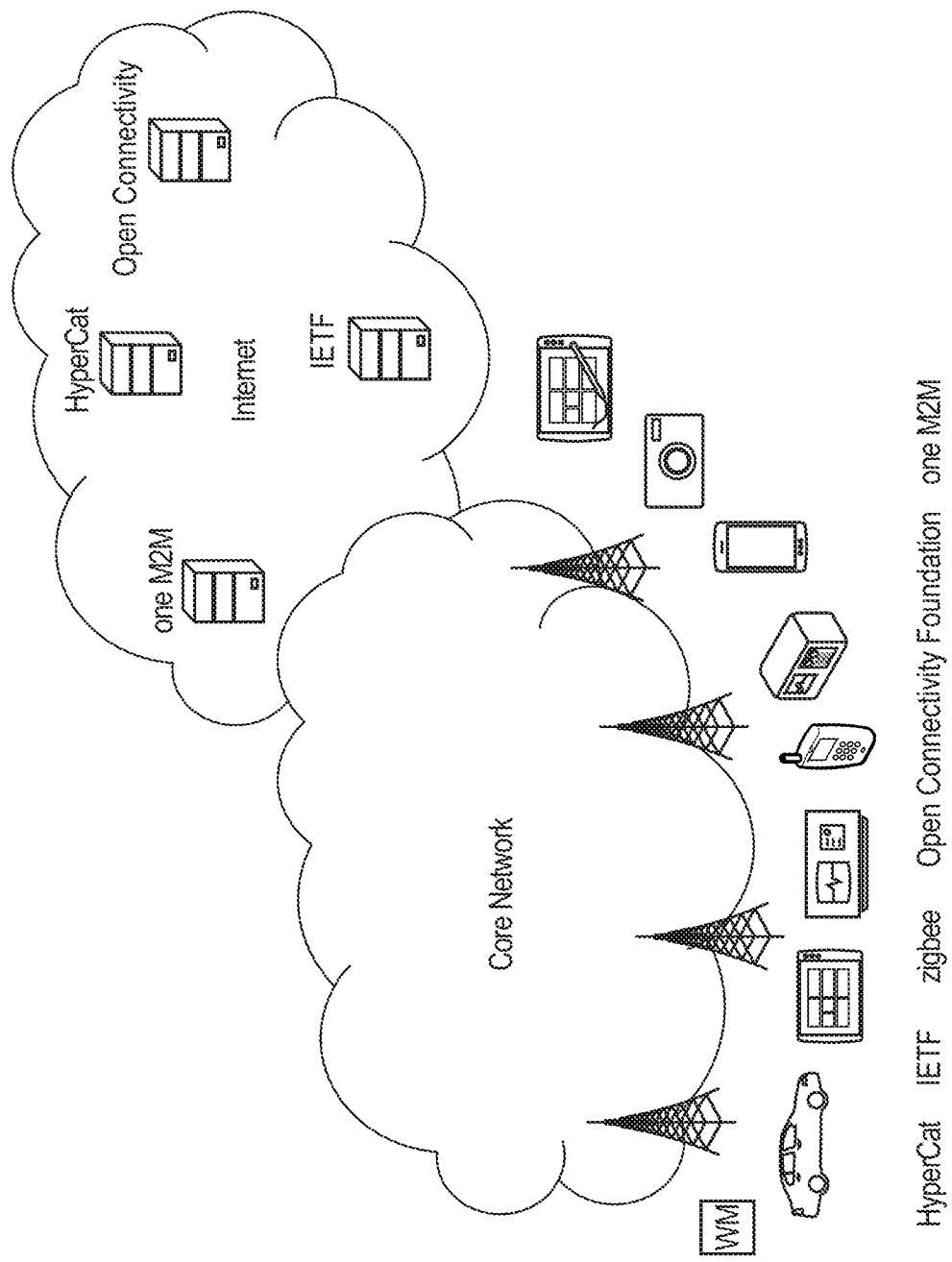
FIG. 6 illustrates an example cellular network operator use case.

FIG. 6 illustrates an example use case involving a cellular operator's interest in providing connectivity for the IoT market. The operator wants to attract as many IoT service providers as possible and offer value add IoT services, such as data cleaning and analytics, in addition to offering connectivity. These services offer the operator an additional revenue stream on top of the revenue they receive for providing connectivity. For example, if operators could offer multi-protocol interactions, they could then add bootstrapping and device provisioning services in their secure networks to further enhance their IoT services to users by not only offering connectivity, but a means to offer services that exploit the synergies created when multiple datasets and devices may be accessed using the same mechanism.

Each of the three use cases highlights the need for IoT interoperability in order to enable a new level of multi-system functionality and offer better services to data consumers and end users. Currently, various SDOs are fervently working towards defining their own standard in order to make it the de facto standard for IoT. As such, there are numerous competing standards with varying levels of acceptance/adoption from different industry sectors, which is adding fragmentation to an already fragmented IoT ecosystem.

Current interworking developments within some SDOs are focused on interworking other IoT technology platforms to their specific propositions. For example, there are developments within oneM2M for interworking with other IoT platforms, such as OCF and LWM2M. However, the current and expected market for IoT is promising to be so large that multiple IoT platforms, with slightly different offerings, may be needed to cover different applications and sectors. Consequently, an interworking framework to enable better integration of data and systems is fundamental to unleash the full potential from the IoT.

In addition, the current solutions for device configuration in SL protocols may not work for all devices regardless of the underlying platform. Typically, the device configuration is one of pre-provisioning information onto the IoT device. For headless devices, this may be an issue as there is no user interface with which to provision configuration or management updates. A second method is to use device management which requires certain over-head that includes communicating to a DM server to obtain configuration details. Finally, the device may discover such information using discovery mechanisms but constrained devices may not have enough resources to be programmed with the capability to discover the information and programmatically use it to communicate to the underlying IoT platform. When interworking is factored in, the process becomes more complex as the device configuration information of SL protocols may be different, which may either reduce the functionality of connected devices or even make them useless.

An interworking entity may address the needs for interoperability among IoT-enabled devices from different IoT technology frameworks and provide for a more simplified device configuration process. The interworking entity will need to support various IoT protocols and provide interworking among the different protocols. In addition, the entity may support providing device configuration services on behalf of devices to offload this crucial but sometimes difficult-to-achieve requirement for the devices. Finally, the interworking entity will be in position to expose the servers and devices in an IoT system to external applications using web protocols or other mechanisms.

The procedures and systems described herein address, inter alia, the issues of IoT interworking in a holistic manner in which the focus is towards interworking among IoT technologies rather than just targeting interworking within a particular SL protocol. The architecture proposed herein allows users and devices from one IoT protocol to communicate with devices from another IoT protocol at the message level. In other words, the interworking is performed by formatting the information in a message from one protocol to another protocol. The IoT entities, hence, receive messages in their native protocols and may not be aware that the message originated from another protocol. Note that the interworking may not support complete interworking between SL protocols due to differences in features of each SL protocol. What is supported is the ability for devices to functionally communicate with each other to make a multi-standard IoT framework operate as seamlessly as possible. For example, a light switch may control a light even if the devices communicate using different SL protocols. On the other hand, complex SL operations or remote procedure calls may not be supported.

Central to such an interworking IoT system is an Interworking Service, which may communicate between IoT servers and IoT devices and provide interworking services between them. IoT servers or devices will send requests in their native SL protocol to the Interworking Service, which will translate the request to another SL protocol, and send the interworked request to the target IoT server or device. The same process repeats for responses but in the reverse direction. Therefore, messages sent to and from the Interworking Service are in the native SL protocol of the corresponding entities. The Interworking Service may operate as a standalone entity within the IoT system or be integrated into other entities that provides interworking capabilities to the integrated entity. For example, the Interworking Service may be integrated into a oneM2M CSE to offer interworking capabilities.

The internal components of the Interworking Service will be described, which features three interfaces: IoT Server, IoT Device, and Web interfaces, as an embodiment of external access. Procedures are proposed herein for both the IoT Server and IoT Device interfaces to enable the interworking capabilities. The Web interface provides the ability to update the policies and mapping tables within the Interworking Service to provide for interworking extensibility while also exposing the IoT servers and devices in the system to external web applications. A new IoT Server Registration procedure is proposed herein to allow IoT servers to register to the Interworking Service and advertise their services to IoT devices. In addition, two new discovery procedures are introduced to assist with the interworking: IoT Server Discovery and IoT Device Discovery. The IoT Server Discovery procedure makes it easy for IoT devices to find available IoT servers and incorporates the important function of device configuration to off-load this functionality from IoT devices. Finally, the IoT Device Discovery procedure allows the Interworking Service to proactively discover IoT devices that host their own resources and may register them to an available IoT server.

The procedures proposed herein are call flows that are in addition to existing SL protocol procedures that new devices may implement to take advantage of the interworking capabilities. These procedures introduce a slight overhead to existing SL protocols but offer interoperability afforded by the Interworking Service. Legacy devices that do not implement the procedures proposed herein may still operate with the Interworking Service. In those cases, the interworking may be determined by policies provisioned within the Interworking Service, which will be implementation dependent. Devices will either discover the Interworking Service using their native discovery request or be provisioned with information about the Interworking Service. They then send requests in their native protocol to the Interworking Service, which then translates the request to an entity operating with a different SL protocol.

Figure 7:
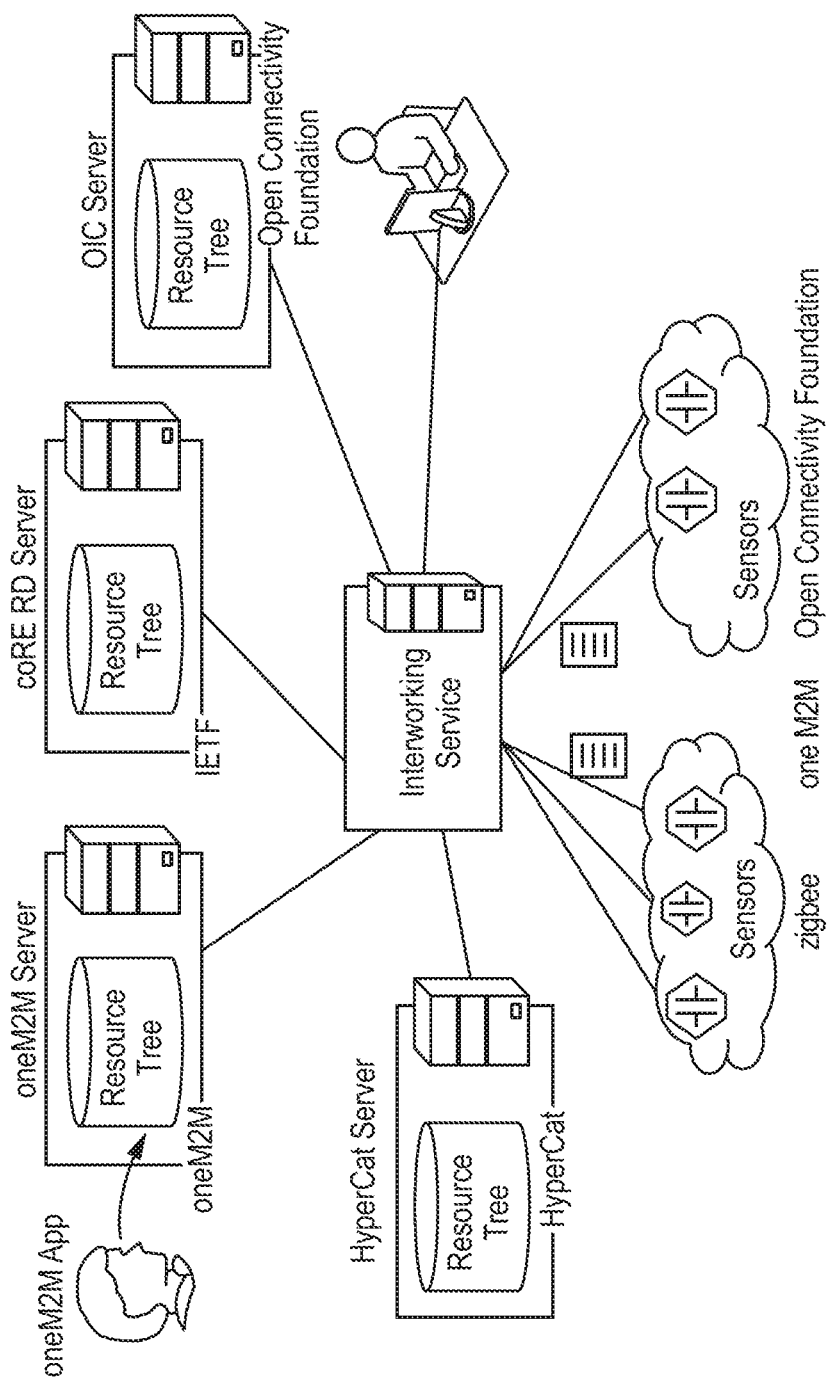
FIG. 7 is block diagram of an example interworking service system architecture.

The Interworking Service may operate as an intermediary between IoT servers and devices to offer interworking capabilities. The Interworking Service may be integrated in an IoT server, such as a oneM2M Common Services Entity (CSE) or a CoRE Resource Directory (RD) server, or implemented as a standalone server that offers interworking capabilities. FIG. 7 shows an example Interworking Service operating within an IoT system in which it interfaces to IoT servers, IoT devices, and to web entities such as a web browser. The Interworking Service manages communications among the various entities in the system and is able to allow communications between different SL protocols. For example, an OCF sensor may communicate with a oneM2M server through the Interworking Service. The web interface allows an administrator or authorized user to update certain functionalities within the Interworking Service such as the mapping tables and repository policies to add extensibility to the Interworking Service.

Figure 8:
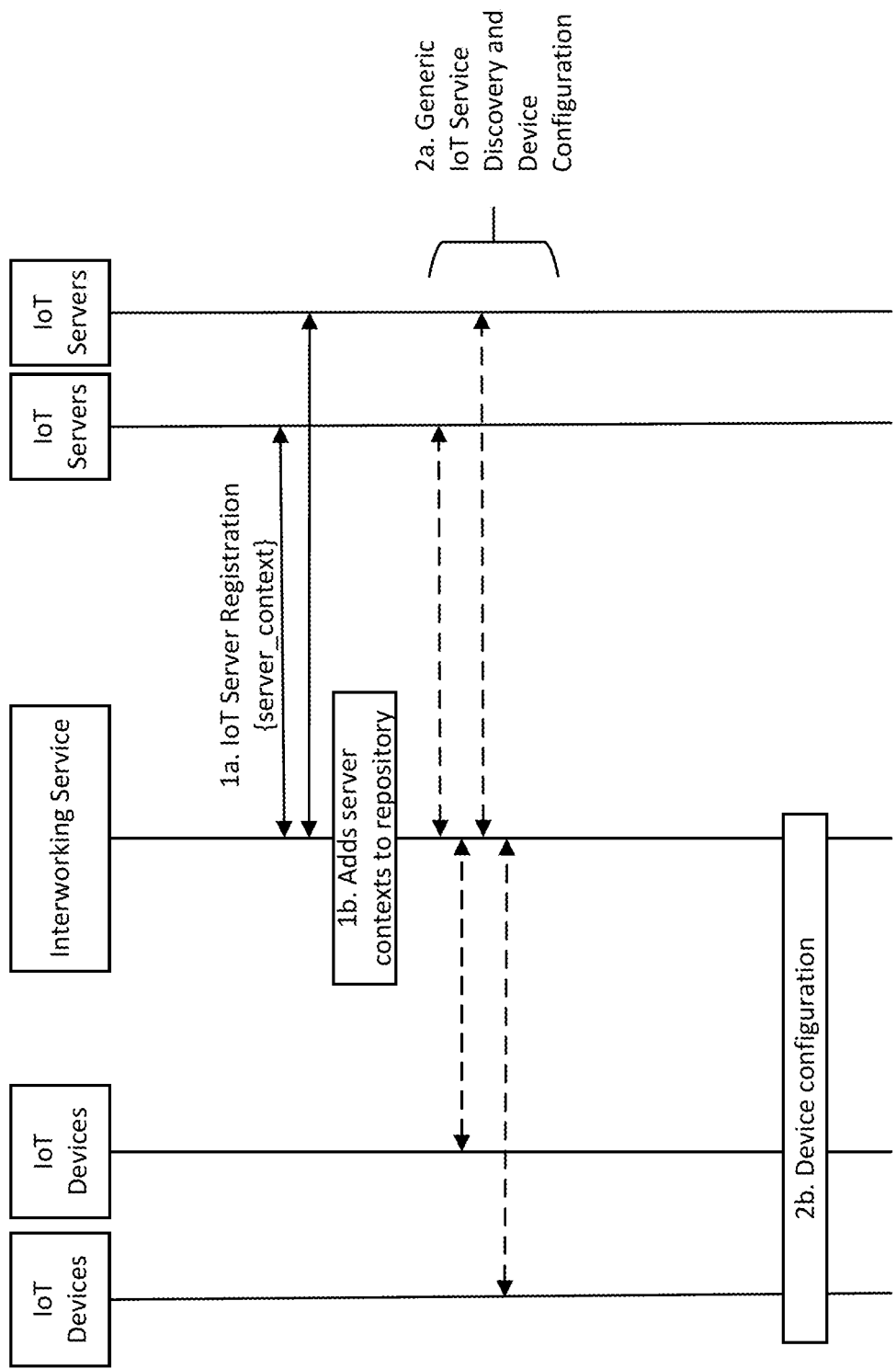
FIGS. 8, 9, and 10 show a call flow of an example interworking service procedure.
Figure 9:
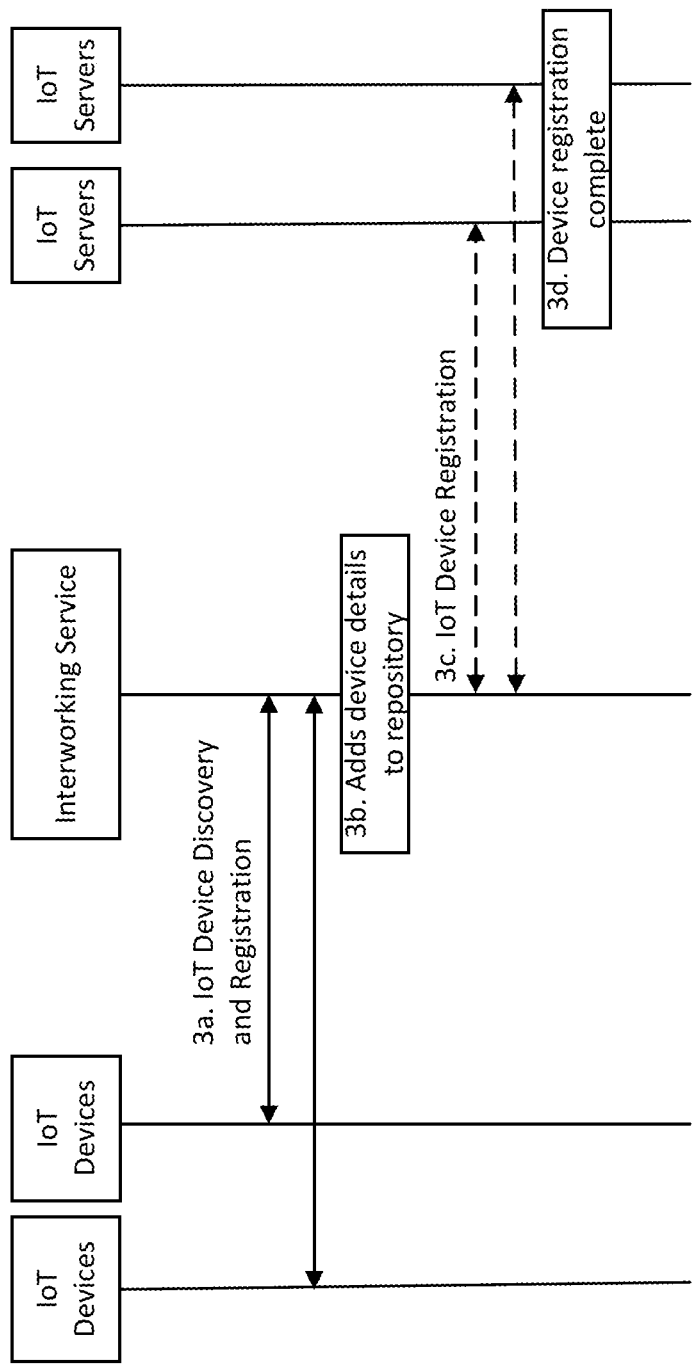
Figure 10:
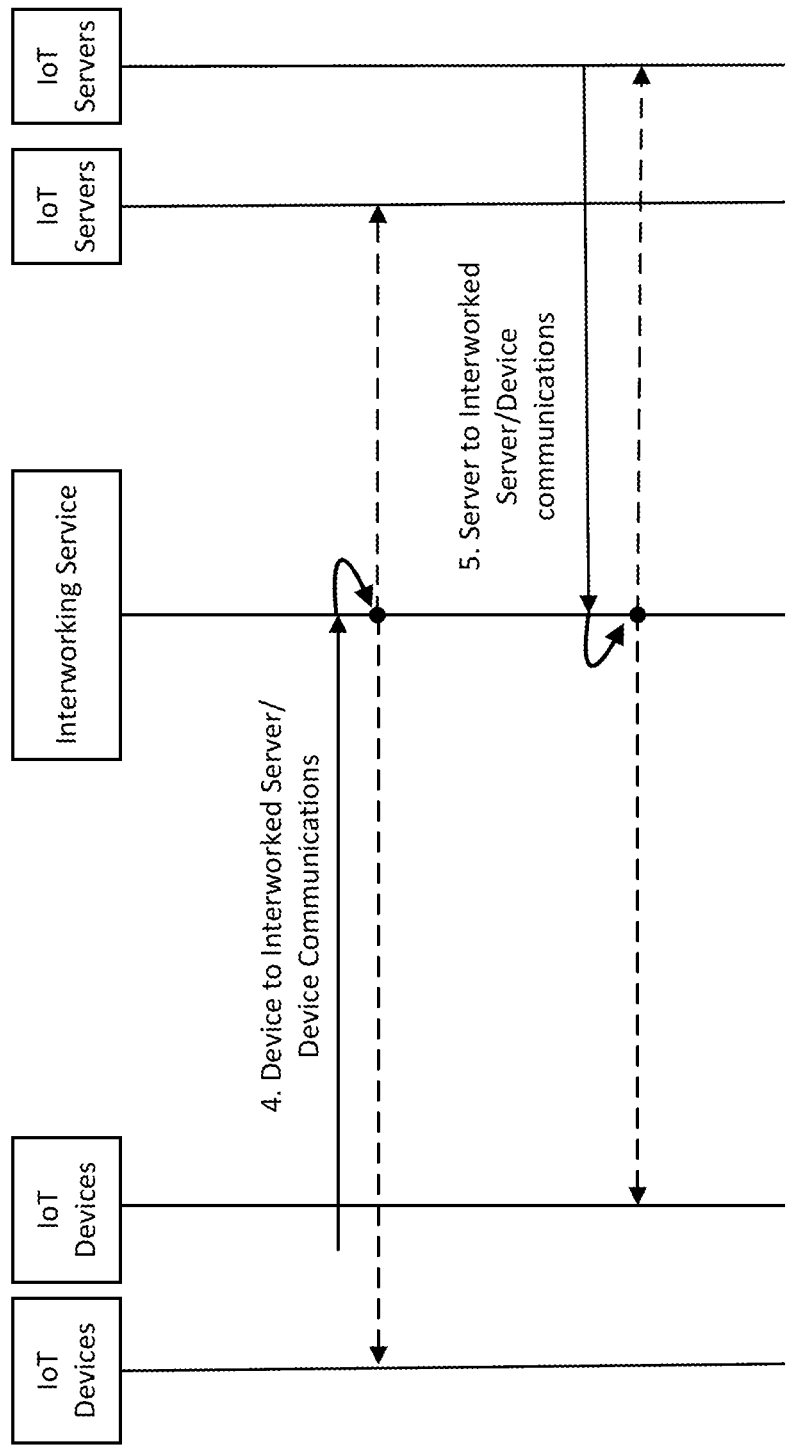

The capabilities of an example Interworking Service are illustrated in the call flows of FIG. 8, FIG. 9, and FIG. 10 as procedures within an IoT system. The procedures highlight the different capabilities provided by the Interworking Service and shows the relationship of the Interworking Service to IoT servers and IoT devices.

Figure 11:
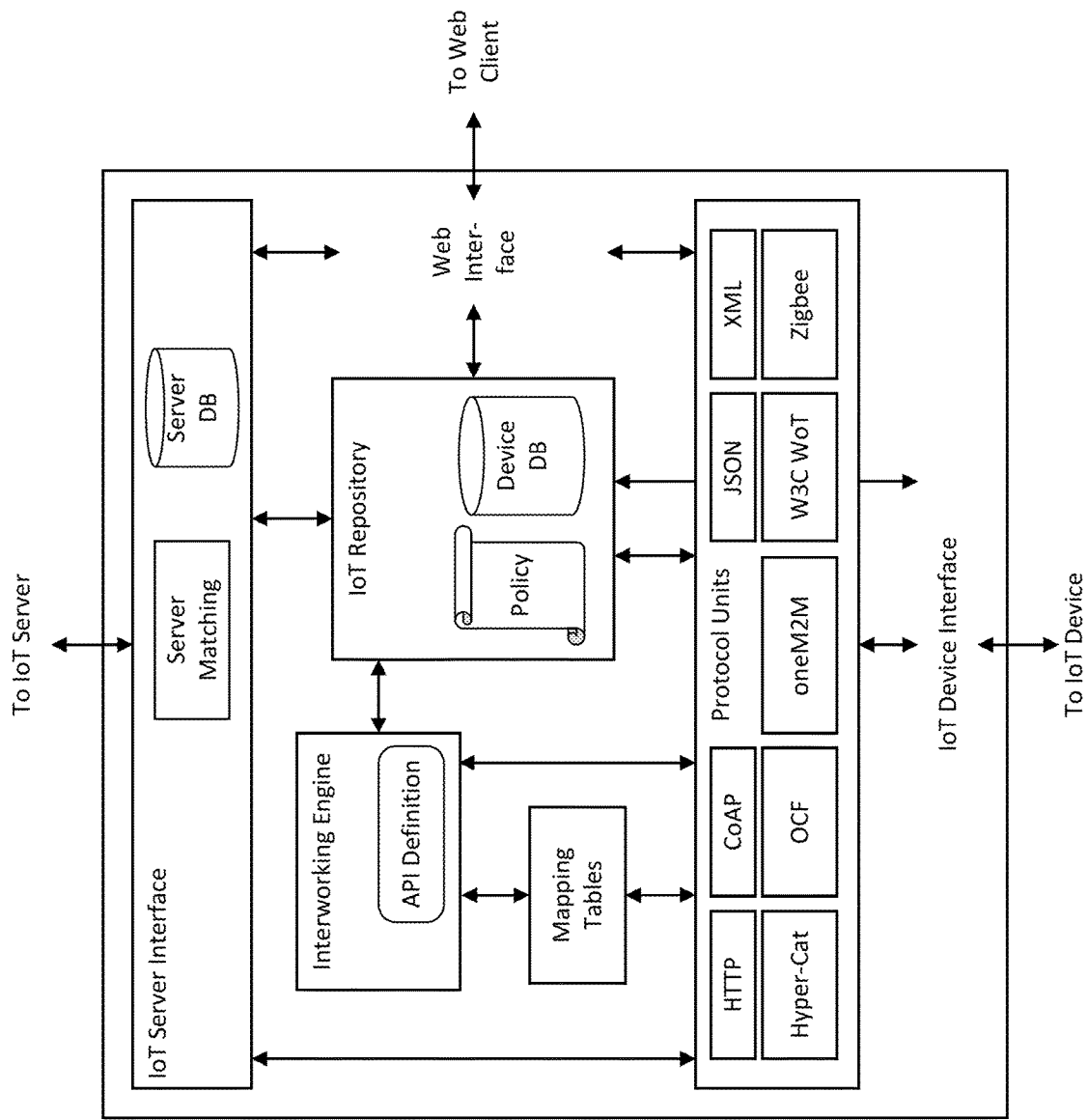
FIG. 11 is a block diagram of an example interworking service entity architecture.

An example internal architecture of an Interworking Service is shown in FIG. 11. As previously stated, there are two interface components that serve to communicate between IoT servers and IoT devices. Furthermore, individual Protocol Units for the supported SL protocols are required to enable interworking. These protocol units are integrated with other components of the Interworking Service to provide protocol message translation when interworking between SL protocols. The Interworking Engine interfaces to the Mapping Tables component to provide data model mapping and other mappings between SL protocols. Note that the Interworking Engine and the Mapping Tables components are shown as separate entities but they may be integrated as one entity as they are both required to perform interworking. The IoT Repository stores information about devices based on device requests through the Interworking Service and utilizes the provisioned policies to enable or assist for better interworking support. The IoT Server Interface contains a Server Matching component to assist in forwarding device requests to the appropriate IoT servers. A web interface is used for an administrator or authorized user to provision new mapping table documents or to update policies to add extensibility to the Interworking Service.

The IoT Server Interface serves as the communications link between the Interworking Service and IoT servers. This interface supports the IoT Server Registration procedure described herein and stores information about IoT servers obtained from the registration request. It then makes the information about the IoT servers available to the IoT Repository to enable web searches of IoT servers. In addition, the Server Matching component utilizes information about the IoT servers and possibly from device requests or policies provided to the IoT Repository to forward requests to the appropriate IoT servers.

An IoT server may explicitly register to the Interworking Service using the registration procedure described herein. Alternatively, an administrator or authorized user of the Interworking Service may also input details of an IoT server into the repository. Mandatory and options server information may be saved in the repository. This information may be used by the IoT Server interface to initiate communications to an IoT server on behalf of IoT device requests. The information may also be shared with the IoT Repository to enable web searches of IoT servers. This information may be shared as new IoT servers are registered or when an update is performed.

Mandatory server information may include: server address; server ID; SL protocol; payload formats; application protocols; security protocols; supported services; and supported resources.

A server address may contain contact information where the IoT server may be reached. For example, the server address may consists of an IP address and port number or a Fully Qualified Domain Name (FQDN). Optionally or additionally, a server address may include a cellular specific address such as an Access Point Network (APN) and a phone number.

A server ID may be an identifier or name for the IoT server. An SL protocol identifier may be used to identify the SL protocol and also the version the IoT server operates on, e.g., oneM2M R2, OCF 1.0, LWM2M 1.0, etc.

A payload format indicator may include a list of payload formats the IoT server supports, e.g., JSON, XML, CBOR, etc.

An application protocols indicator may include a list of application protocols the IoT server supports, e.g., CoAP, HTTP, MQTT, etc.

A security protocols indicator may be used to identifies the security framework and algorithms the IoT server supports, e.g., TLS, DTLS, IPSEC, VPN, PKI, AES, SHA256, 3DES, etc.

Supported services information may include a list of SL service types and/or instances the IoT server supports. This list may also include information such as a URI or link to a corresponding interface and/or semantic description of a service.

Supported resources information may include a list of SL resource types and/or instances the IoT server supports. This list may also include information such as a URI or link to a corresponding interface and/or semantic description of a resource.

Optional server information may include: supported interfaces; service territory; availability; capacity; and loading.

Supported interfaces information may include a list of interfaces the IoT server supports. This list may also include information such as a URIs or links to a corresponding resources or services associated with this interface and/or semantic descriptions of the interface.

Service territory information may include a service area the IoT server is serving.

Availability information may include availability in terms of a schedule the IoT server is on to provide services to IoT devices.

Capacity information may include a total capacity of the IoT server; the capacity may have multiple criteria such as # of devices, total storage capacity, maximum number of simultaneous transactions.

Loading information may include a current loading as a percentage of the capacity of the IoT server.

Once IoT servers are registered, the data saved may also be used in responses provided to the generic IoT Server Discovery procedure. The server context that is returned may provide details about available IoT servers that an IoT device may communicate with based on some discovery criteria. Some IoT devices may have the capability to choose which IoT server it registers or communicates to. These devices may have a user interface in which a human is present to deploy the device and help the device registers to the IoT server.

Similarly, the Server Matching component may also use the server context to match appropriate target IoT servers that a device request may be forwarded to. This determination may be provided by policies provisioned by an administrator to the IoT Repository component or determined by the device request itself by including information in protocol headers or payloads. In addition, the Server Matching component may need to maintain information for request-response matching once a device request is sent to the IoT server. When a response arrives to the IoT Server interface, the request-response matching information is used to forward the response to the IoT Repository informing it of the IoT device the response is targeted towards. The IoT Server interface may also receive requests from IoT servers, in which case the process defined above in reverse is applicable. In this case, the Server Matching component may obtain information about IoT devices from the IoT Repository.

The IoT Device Interface is responsible for communicating with IoT devices on behalf of IoT servers. This interface supports the generic IoT Server Discovery procedure in which IoT devices may discover available IoT servers. Once the discovery is made, IoT devices send their requests through the Interworking Service to the IoT server using their native protocol. The IoT Device interface in turn may assist in device configuration to select an IoT server for the device. In certain use cases, this may be sufficient as there may be only one IoT server available such as the home automation use case. In other use cases, there may be policies provisioned to the IoT Repository to help make the determination for device configuration. Note that device configuration in this case involves the Interworking Service making a decision of which IoT server to target the request to. The IoT device only needs to specify the name of the IoT server to send the request to and the Interworking Service forwards the request using the contact information from the server database. Therefore, the device configuration for IoT devices is limited to performing the IoT Server Discovery procedure and selecting a server name to target requests to. The Interworking Service manages the maintenance of potential changes in IP address of the IoT servers. Some constrained IoT devices may even let the Interworking Service decide on which IoT server to forward its requests to. The device may use the HTTP or CoAP Accept header to indicate the SL protocol it is operating with and let policies in the IoT Repository match the IoT server to forward the requests to.

This interface is responsible for implementing the generic IoT Server Discovery procedure by either responding to IoT client requests or by sending periodic multicast or broadcast messages advertising the availability of IoT servers. The multicast or broadcast messages may be performed over access technologies such as IP multicast or 3GPP MBMS. In addition, the multicast or broadcast messages may also be messages sent using different SL protocols on top of the aforementioned access technologies. When IoT clients that implement the discovery procedure described herein send a request towards the "/iotDiscovery" URI, the device interface communicates with both the Protocol Units and the IoT Repository to obtain the desired information to return in the response. After decoding the request using the appropriate protocol units, the device interface may obtain IoT server details through the IoT Repository based on the query parameters supplied in the discovery request. Upon receiving the data, the device interface contacts the Protocol Units to encode the response before sending it back to the IoT device.

The device interface may also support existing SL protocol discovery requests through the Protocol Units. This may include matching IoT server names and/or identifiers provided in the request to registered IoT servers obtained from the IoT Repository. It may also involve checking the policies that may be provisioned in the IoT Repository to determine which IoT servers to send the request to if there are multiple IoT servers that communicates using the same SL protocol as the protocol used by the request.

The Web interface offers extensibility to the Interworking Service as an administrator or authorized user is able to update the contents of the interworking policies within the IoT Repository or the mapping tables that are required for interworking. In addition, the Web interface exposes the IoT system to external web technologies where users may use a web browser to search for IoT servers and IoT devices that are stored in the server and device databases, respectively. If the information in the server and device databases are organized in a fashion similar to how web servers organize their resources, the Web interface may also support web crawlers to automate IoT server and IoT device discoveries.

The interworking policies are used to direct how requests are interworked and consists of a sequence of rules to map requests to an appropriate server, potentially to another SL protocol. More details are provided when the IoT Repository is described. In addition, an administrator may add or update the mapping tables that are required by the Interworking Engine. There are three main types of mapping tables: data model mappings, protocol to protocol mappings including identifiers, and data type mappings. These mappings and their examples will be described further when the Mapping Tables are described.

Protocol units may contain all the SL centric protocols required to support a particular IoT standard, such as the protocols shown residing at the application layer in the example of FIG. 1. Examples are the application protocols HTTP and CoAP, the payload formats JSON and WL, and the SL protocols themselves oneM2M, OCF, etc. These protocols are used by both the IoT Server and IoT Device interfaces to extract information from messages sent from IoT servers and devices, respectively, before forwarding the information to the IoT Repository. Conversely, the protocol components are used to encode messages targeting either IoT servers or IoT devices from both the Interworking Engine and the IoT Repository.

Each supported protocol will have a component operating in the Protocol Units that are decoupled from each other. As a result, each protocol may be called separately to extract protocol centric information and the data is saved into an internal data structure used within the Interworking Service for sharing with other components. For example, Example 1 shows a simple IoT message encoded in oneM2M protocol—note the message is formatted for easier viewing. Example 1 shows the components of the message: the method, a target URI, the application protocol used, a list of HTTP protocol header information, and a message payload in XML format. Notice in the HTTP headers that there are some oneM2M centric headers which have the prefix "X-M2M". The presence of this information may be used to determine the SL protocol the request was generated with.

Example 1

Example of an IoT Device Message Encoded in oneM2M and HTTP Protocols

| section | line | text |
|---|---|---|
| App. Protocol | 1 | POST/CSE01 HTTP/1.1 |
| Protocol Header | 2 | X-M2M-RI:webApp |
| | 3 | Accept:application/xml |
| | 4 | X-M2M-Origin:CExerciserApp |
| | 5 | Host:172.25.0.202:6000 |
| | 6 | Content-Type:application/xml; ty=2 |
| | 7 | Content-Length:369 |
| Message Payload | 8 | <?xml version="I.O" encoding="UTF-8" standalone="no"?> l |
| | 9 | <m2m:ae xmlns:m2m="http://www.onem2m.org/xml/protocols" : |
| | 10 | xmlns:xsi="http://www.w3.org/2001/XMLSchema-instance" rn="CAPPl"> l |
| | 11 |    <lbl>AEOI</lbl> l |
| | 12 |    <apn>APNpet</apn> l |
| | 13 |    <api>AEpet</api> : |
| | 14 |    <poa>http://127.0.0.1:54000</poa> l |
| | 15 |    <rr>true</rr> l |
| | 16 | </m2m:ae> l |

In example 1, the application protocol, shown in line 1, includes the method, target URI, and the application protocol version.

To decode the message, a call is first made to the HTTP component to extract the HTTP headers and determine where the payload data is located in the message. From information provided in the HTTP header, another internal call is made to extract data from the message payload. In both cases, the extracted data is saved in a data structure defined for use internally within the Interworking Service. After the data is extracted and saved into the internal data structure, the appropriate SL protocol is determined based on the information provided in the request. This determination may be made by inspecting the information contained in the content-type parameter where a SL protocol may be specified for Post/Put requests or it may be determined by extracting identifiers provided in the target URI and matching the ones provided in the Server Database for Retrieve/Delete requests, or it may be determined by inspecting the message payload to detect SL protocol information such as XML namespace. In addition, the detection of other SL protocol centric headers may be used to identify the SL protocol associated with the request.

The IoT Repository is the traffic controller of the Interworking Service that communicates to all the external interfaces: IoT Server, IoT Device, and Web interfaces. It contains a repository of all IoT Devices that have used the Interworking Service, has access to the details of all registered IoT servers, and makes available all IoT devices and IoT servers to external web queries. It is responsible for triggering IoT device interworking by communicating to the Interworking Engine when interworking between SL protocols is required. Policies may also be provisioned to help determine when interworking is triggered.

When the IoT Device interface receives a request, it extracts data using the facilities of the Protocol Units and saves it to an internal data structure. This data structure notes the identifying information about the IoT devices from the message details such as IP address and port number and information provided within the SL message such as the target URI, protocol headers, payload data, and other distinguishing data.

Contents of IoT repository internal data structure elements may include IoT device details and request details. For example, IoT device details may include device addresses, protocols, IoT servers, and server preferences. IoT device details may also be saved in the device database to keep a repository of IoT devices.

A device address may be sourced from a device request, for example, and contain the address of the device that usually consists of IP address and port number or a Fully Qualified Domain Name obtained from the device's request. There may be other addresses such as a cellular identifier to specify how to respond to the device. This will be used to return the response to the device.

An indication of protocols, such as SL, application, or payload may be sourced from a device request or IoT repository, for example, and contain the different protocols used in the device request if present. When present, the content type value may specify which SL and payload protocols are used in the request and the target URI may be used to match server name/ID. When not present, the Interworking Service may use other protocol centric information contained in protocol headers and payload data of the request message to determine the type(s) of protocol(s) applicable to the request.

A target IoT server data element may be sourced from a device request or IoT repository, for example. The target IoT server may be determined by inspecting the target URI of the request, for example. An IoT device may specify this after first discovering the available IoT servers using procedures similar to those described herein. For cases in which the device request does not specify a target IoT server (e.g., by using a wildcard character or other delimited character), the IoT Repository may select the IoT server on behalf of the device via some provisioned policy or criteria such as the type of service layer protocol the device is using in its requests.

A server preference may be sourced from a device request or IoT repository, for example. The device request may specify a preference for a certain IoT server type such as oneM2M or OCF by using the Accept option (or alternatively other options) that is available in both HTTP and CoAP protocols. This case occurs if the IoT device wants to communicate to a particular SL server but does not care which server instance it is. An example is if the communications is performed in a localized configuration where only one IoT server is deployed such as home or factory automation environment.

Contents of IoT repository internal data structure elements may include request details, such as methods, target resources, header information, and payload, all of which may be source from a device request. The method that is extracted from the IoT device's request may be, for example, CREATE, RETRIEVE, UPDATE, DELETE. The target resource may be extracted from the target URI from the IoT device's request.

Protocol header information may be extracted from the IoT device's request. This information may include the identifier or name of an IoT server, the type of transport, application or service layer protocols supported by the device, the type of data serializations supported by the device, the data serialization format of the data contained in the payload of the request, semantic descriptions that provide the meaning of the information contained with the payload.

The data transmitted in the payload (if any) from the IoT device's request. In addition to application specific data, the payload may also contain include the identifier or name of an IoT server, the type of transport, application or service layer protocols supported by the device, the type of data serializations supported by the device, the data serialization format of the data contained in the payload of the request, semantic descriptions that provide the meaning of the information contained with the payload.

Having access to both server and device databases as shown in the example of FIG. 11, the IoT Repository is in position to expose the data to external web searches through the Web Interface. Queries may be made from a web browser to target the Interworking Service through the web interface to locate IoT servers and IoT devices. The Interworking Service itself may be configured as an IoT web portal that offers a one stop site for all things IoT.

When a request is received, an interworking decision is made either based on the information in the request or based on policies provisioned to the IoT Repository. If a request contains a recognized IoT server name in the target URI or other parts of the message and a content type specification, whether using an Accept or Content-Type HTTP or CoAP header, an interworking decision may be made if the IoT server's SL protocol does not match that of the content type specification. There may be other clues in the request message that specifies which SL protocol the request is generated with: the presence of SL protocol specific headers or possibly information in the message payload.

In the absence of such clues in the request message, policies may be provisioned to the IoT Repository to assist in making the interworking decision. The policy may be a set of rules that is evaluated against the request or it may be implemented via an algorithm that takes into account the loading of an IoT server or uses information present in the request payload. Some examples of rules are provided in Table 2. The examples in Table 2 only show one criteria for the request message but more complex criteria are supported to combine multiple criteria together. For example, "if request is from SL Protocol A and it is a 3GPP device and contains a "<string>" in the payload, then interwork to SL Protocol D" may be a rule. The order of the rules may also determine the priority of the interworking decision with highest priority placed first. Multiple policies may exist to allow for separating the rules per SL protocol to provide for more granular interworking decisions, especially in larger systems.

TABLE 2

Examples of IoT Interworking Policy Rules

| Request Information | Policy Rule |
|---|---|
| If request is from SL Protocol A | Interwork to SL Protocol B |
| If request is from IP domain A | Interwork to SL Protocol C |
| If request is from 3GPP domain | Interwork to SL Protocol D |
| If request is using HTTP protocol | Interwork to SL Protocol E |
| If request is using CoAP protocol | Interwork to SL Protocol F |
| If request is in device group # | Interwork to SL Protocol A |
| If request contains "<string>" in payload | Interwork to SL Protocol D |

The Interworking Engine is triggered by the IoT Repository when a message needs to be interworked from one SL protocol to another. At this time, the internal data structure contains information of a request from one SL protocol and the IoT Repository has determined that the request needs to be interworked to another SL protocol. The determination may be based on an explicit indicator provided by the requesting device, the matching of a server or device ID specified in the request, or by a policy provisioned to the IoT Repository.

Within the Interworking Engine, a set of API definitions are found for primitive messages of all supported SL protocols. These API definitions help the Interworking Engine translate data from the internal data structure provided by the IoT Repository into data required by the primitive message of the new SL protocol. To do this, the Interworking Engine communicates with the Mapping Tables component, which provides mapping relationship of data models, identifiers, data types, and other protocol semantics between SL protocols. These two components are shown logically as individual components in FIG. 11 but they may be realized as one component as both are needed for interworking. There will be many interactions between these two components in order to complete the mapping of one SL protocol to another.

The API definition may be organized as a document which specifies the needed information for a primitive message as required by the associated SL protocol. An example of a request API definition document is shown in Table 3 for a oneM2M Create AE request and an example of a response definition is shown in Table 4 for a oneM2M response. The document may include attributes or parameters that are required by the primitive message as well as the optionality of each attribute or parameter and the associated data type. In addition, the document may include references to information in the mapping tables to provide the translation from one SL protocol to another SL protocol.

TABLE 3

Example API Definition for oneM2M Create AE Request

| Attribute | Optionality | Data Type | Mapping Table Reference |
|---|---|---|---|
| To | M | xs:anyURI | onem2m:$to |
| From | O | m2m:ID | onem2m:$fr |
| requestIdentifier | M | m2m:requestID | onem2m:$rqi |
| resourceType | M | m2m:resourceType | onem2m:$ty |
| content | M | m2m:primitiveContent | onem2m:$pc |
| role | O | xs:anyType | onem2m:$rol |
| originatingTimestamp | O | m2m:timestamp | onem2m:$ot |
| requestExpirationTimestamp | O | m2m:absRelTimestamp | onem2m:$rqet |
| resultExpirationTimestamp | O | m2m:absRelTimestamp | onem2m:$rset |
| operationExecutionTime | O | m2m:absRelTimestamp | onem2m:$oet |
| responseType | O | m2m:responseTypeInfo | onem2m:$rt |
| resultPersistence | O | m2m:absRelTimestamp | onem2m:$rp |
| resultContent | O | m2m:resultContent | onem2m:$rcn |
| eventCategory | O | m2m:eventCat | onem2m:$ec |
| deliveryAggregation | O | xs:boolean | onem2m:$da |
| groupRequestIdentifier | O | xs:string | onem2m:$gid |
| resourceName | O | xs:NCName | onem2m:$rn |
| accessControlPolicyIDs | O | m2m:acpType | onem2m:$acpi |
| expirationTime | O | m2m:timestamp | onem2m:$et |
| labels | O | m2m:labels | onem2m:$lbl |
| announceTo | O | xs:anyURI | onem2m:$at |
| announcedAttribute | O | xs:NCName | onem2m:$aa |
| dynamicAuthorizationConsultationIDs | O | xs:anyURI | onem2m:$daci |
| appName | O | xs:string | onem2m:$apn |
| App-ID | M | xs:string | onem2m:$api |
| pointOfAccess | O | m2m:poaList | onem2m:$poa |
| ontologyRef | O | xs:anyURI | onem2m:$or |
| requestReachability | M | xs:boolean | onem2m:$rr |
| contentSerialization | O | m2m:serializations | onem2m:$csz |

TABLE 4

Example API Definition for oneM2M Response Message

| Attribute | Optionality | Data Type | Mapping Table Reference |
|---|---|---|---|
| responseStatusCode | M | m2m:responseStatusCode | onem2m:$rsc |
| requestIdentifier | O | m2m:requestID | onem2m:$rqi |
| content | M | m2m:primitiveContent | onem2m:$pc |
| to | M | m2m:ID | onem2m:$to |
| from | M | m2m:ID | onem2m:$fr |
| originatingTimestamp | O | m2m:timestamp | onem2m:$ot |
| requestExpirationTimestamp | O | m2m:absRelTimestamp | onem2m:$rqet |
| eventCategory | O | m2m:eventCat | onem2m:$ec |

Figure 12:
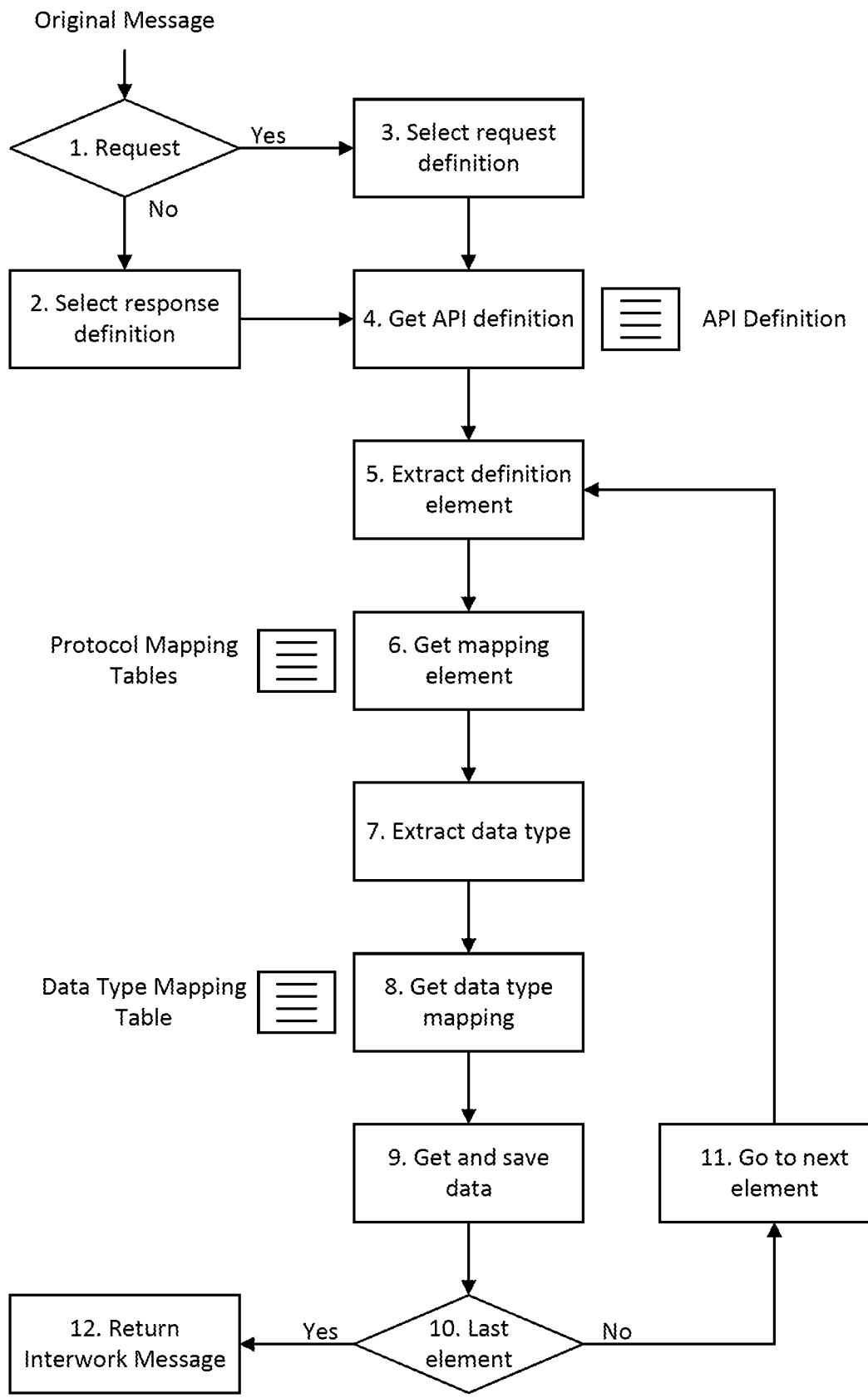
FIG. 12 is a flow chart of example interworking request/response procedure.

Upon being triggered by the IoT Repository, the incoming message may be processed by the Interworking Engine as shown in the FIG. 12.

In step 1 of FIG. 12, an Interworking Engine evaluates the incoming message and makes a determination if either a request or response is being interworked.

In step 2, if the message is a response, the appropriate SL protocol response API is selected. For some SL protocols, only a single response exists and therefore that response is selected. For other protocols, different responses may exist and the appropriate response API definition will be selected. The response selection is based on information received in the interworked message as well as information found in the request to this response. Processing continues to step 4.

In step 3, if the message is a request, the Interworking Engine selects a request API definition to use, which may include identifying a data model mapping if the request is either a Post or Put request. An example of a data model mapping document is shown in Table 5. The request method, the target SL protocol, and the target resource are used to select the request definition. Alternatively, the IoT Repository may be in position to make the determination and indicate the request API definition using information in the request message and policies provisioned with such information.

In step 4, once identified, the API definition is retrieved for further processing. An example of a request definition is shown in Table 3 for a oneM2M request to create an AE resource while an example of a response definition is shown in Table 4 for a oneM2M response.

In step 5, after the API definition is retrieved, the first element of the document is extracted.

In step 6, using the extracted definition element, a lookup is made in the Mapping Table to obtain the mapping information. Multiple mapping tables may be retrieved as necessary in order to perform the interworking. For request processing, a lookup to the data model and resource mappings are made while for response processing, a lookup to the response mapping is made.

In step 7, next, the data type of the mapping element is extracted. In step 8, using the extracted data type of the mapping element, a lookup is made to get the data type mapping of the data type used in the internal data structure.

In step 9, having identified the required data type, the data in the input message is retrieved and saved in the primitive message structure to send the request/response message to its final destination. Conversion functions may be utilized to convert data values from the original message to the interwork message as described herein.

In step 10, a check is made if the last element in the API definition document is reached. In step 11, if not, the next element is extracted and the process repeats from steps 5 to 10.

In step 12, once all the elements of the definition document have been processed, the interworked primitive message is ready to be sent to its final destination. This message is returned to the IoT Repository for binding to the appropriate SL protocol for encoding before sending the message to its recipient.

The Mapping Tables component provides various mapping tables to support interworking for both request and response messages, e.g., data model mappings among different SL protocols, SL identifier mappings, data type mappings, response code mappings, and protocol specific parameters that reflects the meta-data contained in messages. The design of the Mapping Tables component allows for new tables to be added as systems evolve and new devices are created for interworking extensibility. This flexibility may be realized through an administrator interface or through a document addition via device management capabilities.

Table 5 shows an example of a mapping table used during the interworking processing. This example table is used for Post and Put requests where some resource is being interworked. In this example, the mapping table shows a data model mapping between the OCF and oneM2M protocols. This mapping table helps determine what API definition documents are selected for requests as the primitive message requirement varies among different resources.

TABLE 5

Example Data Model Mapping Table of OCF to oneM2M Data Models

| OCF Data Model | oneM2M Data Model |
|---|---|
| oic.wk.rd | remoteCSE |
| oic.wk.d | AE |
| oic.wk.p | DevInfo |
| oic.wk.mnt | Reboot |
| oic.r.energy.battery | Battery |
| oic.r.operational.state | DevCap |
| oic.r.ptz | DevCap |
| oic.r.audio | flexContainer |
| oic.r.light.dimming | flexContainer |
| oic.r.sensor | flexContainer |

The next type of mapping tables are resource mappings between SL protocols as shown in the example in Table 6. Again, this is used for processing interworked requests and the table is used for mapping attributes or parameters of a resource from one SL protocol to another. Note that this type of mapping table may not completely map since SL protocols may be so different from each other that not everything maps. When there is no mapping relationship, an "NA" may be designated in the mapping table. For no mapping relationship elements, various internal functions are introduced to complete the mappings as best as possible or default values may be provided by policies. These internal functions are used to generate data that goes into the interworked primitive message. OCF have common parameters that are applicable to all messages, for requests only, and for responses only. See oneM2M TS-0001, Functional Architecture. The parameters "to" and "ri" are OCF common parameters that are applicable to all messages. The "to" parameter consist of a URI of the recipient of the message and the "ri" parameter is a request identifier that uniquely identifies the message.

TABLE 6

Example Mapping Table of OCF oic.wk.d Resource to oneM2M AE Resource

| oneM2M AE Resource | OCF oic.wk.d Resource |
| --- | --- |
| appName | (Device) Name |
| labels = concat(.) | Spec Version |
| App-ID | Device ID |
| labels = concat(.) | Data Model Version |
| To | to |
| requestIdentifier | ri |
| resourceType = "AE" | NA |
| content = protUnit( ) | NA |
| originatingTimestamp = timeDate( ) | NA |

The internal functions of the Interworking Service may include: fixed functions, conversion functions, manipulation functions, generation functions, and component derived functions. Fixed functions provide fixed data that are known based on the context of the interworking. For example, Table 6 shows a resource mapping between a oneM2M AE resource and an OCF oic.wk.d resource, the mapping for the resourceType in oneM2M is fixed to "AE". In this case, there is no one to one mapping and as a result, the internal function is required as resourceType is a mandatory attribute in oneM2M.

Conversion functions help convert data values that have similar meanings but represented with different types. For example, one light switch may have a Boolean type of True and False while another light switch may an integer type 0 and 1. The conversion function will convert the data from the provided type to the required type based on the mapping tables.

Manipulation functions manipulate the data found in the original message and are used to combine or extract data to form new data. For example, the concat(.) function concatenates data from the original message to form new data for the interworked message by combining them together. Other specialize functions may also be created to support the interworking process as necessary.

Generation functions are used to generate data that do not have one to one mapping between SL protocols. The generated data themselves do not have significant bearings to the underlying requests and may be inserted without affecting the operations. For example, a rand( ) function may be use to generate a random number for any identifier or parameter used as a temporary identifier. The value itself is not important but its presence is. Another example is time generation (e.g., timeDate( ), which may not be available in certain constrained devices, where the Interworking Service may provide that added benefit.

Component derived functions are provided by other components within the Interworking Service based on context they may have either from provisioned policies or other information extracted from previous interactions, e.g., from requests. Examples are the iotRepo( ) and protUnit( ) functions to specify these corresponding components are responsible for generating the data.

Table 7 shows another type of mapping table—data type mappings. This example shows a mapping table of oneM2M data types to the data types defined in the internal data structure within the Interworking Service. Using this information may aid the Interworking Engine to properly format the data when interworking is performed. The protocol centric data type references will be found in the API definition for each protocol and the internal data type references are specified in the internal data structure. Once the protocol element mapping is determined, then the data type is retrieved to ensure the format is properly translated.

TABLE 7

Example Mapping Table of oneM2M Data Types to Internal Data Types

| oneM2M Data Types | Internal Data Types |
| --- | --- |
| xs:boolean | Boolean |
| xs:integer | integer |
| xs:float | float |
| xs:base64Binary | binary |
| xs:string | string |
| m2m:labels | string |
| xs:anyURI | string |
| m2m:requestID | string |
| m2m:resourceType | unsigned integer |
| m2m:primitiveContent | string |

In addition to requests, mapping tables also exist for responses among the different SL protocols. Table 8 shows an example mapping table of an oneM2M response to an OCF response message. The example lists common OCF parameters for all messages, such as "fr" which specifies the URI of the message originator and "cn" which specifies the content of the message, and the parameter "rs" for the response code, which is applicable in responses only.

TABLE 8

Example Mapping Table of oneM2M Response to OCF Response

| oneM2M Response | OCF Response |
| --- | --- |
| responseStatusCode | rs |
| requestIdentifier | ri |
| content | cn |
| to | to |
| from | fr |
| originatingTimestamp = timeDate( ) | NA |
| requestExpirationTimestamp = timeDate(offset) | NA |
| eventCategory | NA |

Figure 13:
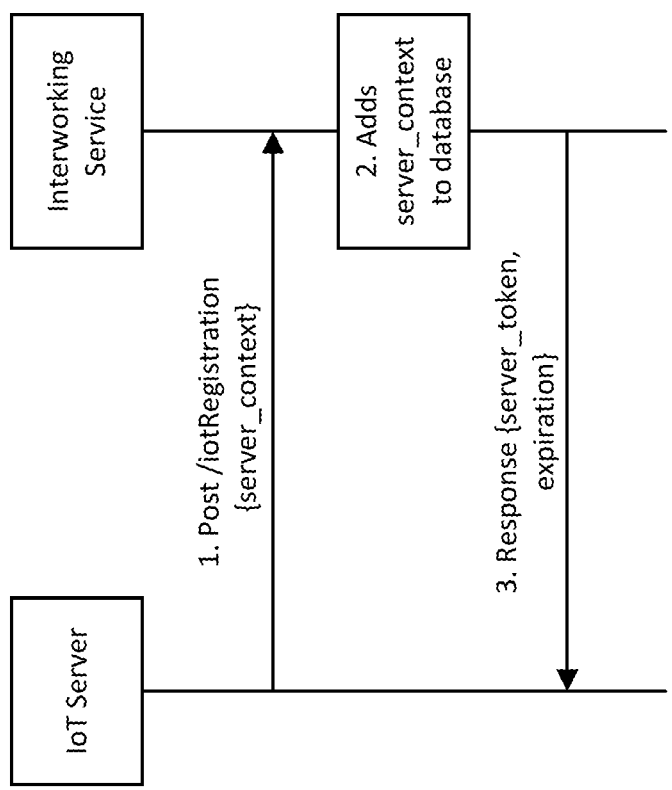
FIG. 13 is a call flow of an example interworking server registration procedure.

The IoT Server Registration procedure requires an IoT server to inform the Interworking Service of its contact information, available services, and any additional information that may be pertinent to the server's operations. The procedure may be triggered by a message sent by an IoT server or be provisioned via a web interface or administrator dashboard. FIG. 13 is a call flow of an example procedure where an IoT server initiates a registration request by sending a POST message to a target URI of "/iotRegistration". The payload of the message contains the server context, which may include mandatory server information such as server address, server ID, SL protocol, payload formats, application protocols, security protocols, supported services, and supported resources, as well as optional server information such as supported interfaces, service territory, availability, capacity, and loading. An example of the message payload is shown in Example 2a.

In response, the Interworking Service will save the server context internally for future use and for exposing the IoT server information to web searches for IoT servers. A response is then returned to indicate the status of the registration and optionally an expiration time of the registration. A server token may be returned as well by the Interworking Service to identify the IoT server for future communications. Alternatively, an IoT server may send its native server registration request if one is supported and the server context may be extracted from information provided in that request. To obtain some server context, the Interworking Service may need to perform additional retrieves of resources in the IoT server.

The expiration time may be long lived as long as the IoT server is in operation to minimize the requirement that the IoT server needs to update its registration on a regular basis. However, an IoT server may want to periodically update its registration information to provide updates of its operational status. Examples include if the IoT server is approaching its maximum capacity of handling requests or if an upgrade to the server includes new capabilities that the IoT server wants to advertise. The IoT Server may send a Put request targeting the server token returned from the registration response and provide the updated information in the payload. The Interworking Service may also proactively remove IoT server registrations if it determines the IoT server is non-responsive to requests. Similarly, IoT servers may also remove their registration by sending a Delete request targeting their server token, e.g., "/<serverToken>".

Example 2

Example Server Registration Payload Data

Figure 14:
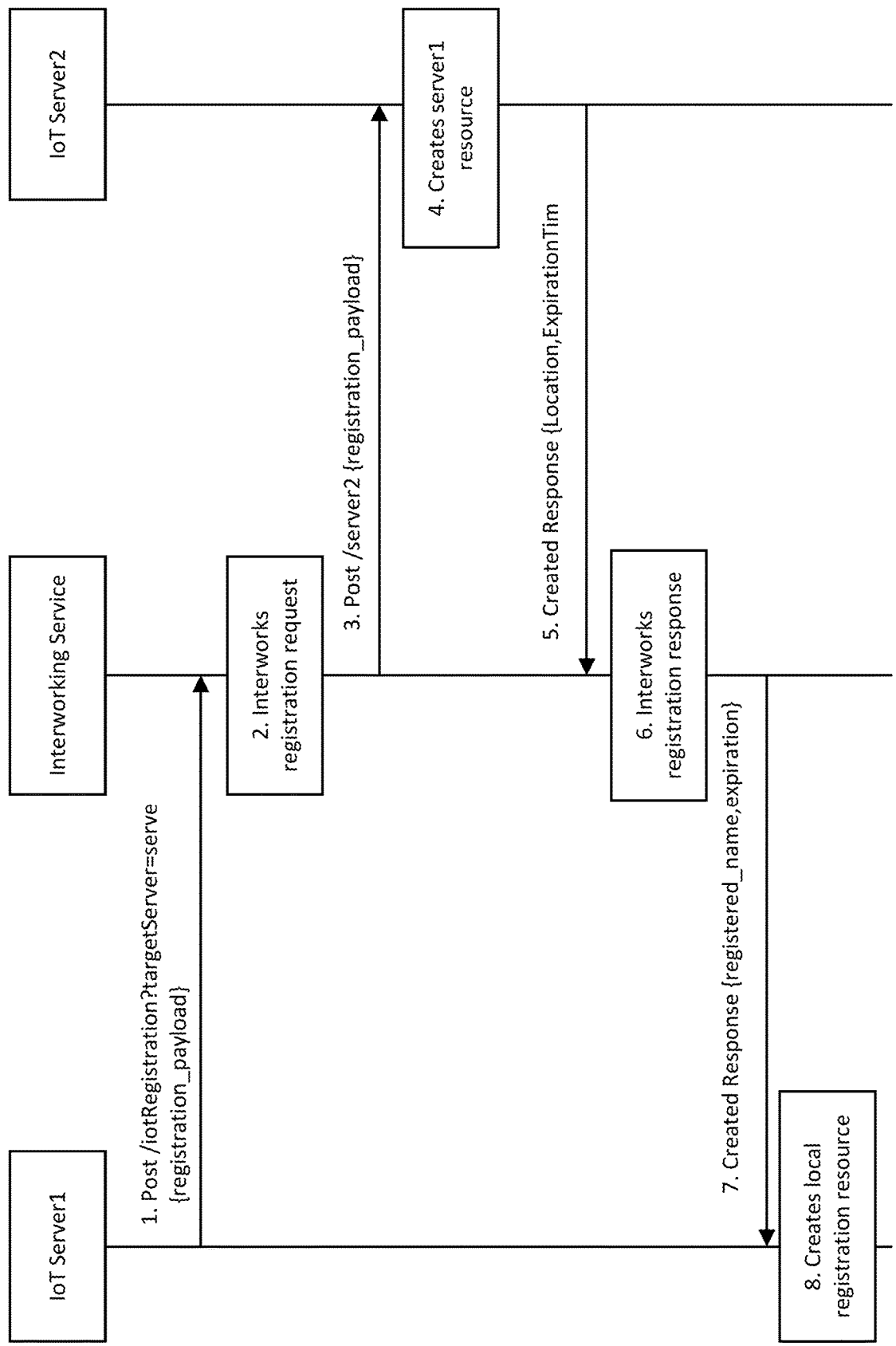
FIG. 14 is a call flow of an example modified IoT server registration procedure for IoT server to IoT server registration.

In addition to registering to the Interworking Service, an IoT server supporting one service layer protocol may also register to another IoT server supporting a different service layer protocol using a modified procedure of FIG. 13. The Post request will still target the "/iotRegistration" URI but the new request will include a query parameter in which the target IoT server is specified. FIG. 14 shows an example of the modified procedure in which IoT Server1 is trying to register to IoT Server2 through the Interworking Service. Note IoT Server1 and IoT Server2 are operating with different SL protocols.

In step 1 of FIG. 14, IoT Server1 sends a Post request targeting "/iotRegistration" and with a query parameter "targetServer=name", where "name" is the name of IoT Server2. The message payload contains information that is required for the registration request. An Accept option is included to represent the SL protocol of IoT Server1.

In step 2, the Interworking Service determines an interworking request is present due to examining the Accept option and comparing to the SL protocol of IoT Server2 that is found in the server database. The Interworking Service interworks the registration request using the corresponding mapping tables associated with each IoT Server.

In step 3, the interworked request is sent to IoT Server2 with the required information in the registration payload.

In step 4, IoT Server2 creates a resource server1 for IoT Server1 if the registration is successful. If the registration is not successful, then an error is generated.

In step 5, IoT Server2 sends an appropriate response to the Interworking Service.

In step 6, the Interworking Service interworks the response from IoT Server2.

In step 7, the interworked response is returned to IoT Server1 with the registered name of the resource (server1) and the expiration for the resource.

In step 8, IoT Server1 may create a local resource for its registration with IoT Server2.

```
<?xml version="1.0" encoding="UTF-8"?>
<serverRegistration>
    <address>http://iotserver01.example.com</address>
    <serverID>iotServer01</serverID>
    <slProtocol>oneM2M</slProtocol>
    <payloadFormats>xml,json</payloadFormats>
    <applicationProtocols>http,coap</applicationProtocols>
    <securityProtocols>
        <channel>tls1.2,dtls1.2</channel>
        <vpn>L2TP/IPsec,openVPN</vpn>
    </securityProtocols>
    <supportedServices>Registration,Storage,Query,Subscription,DM,Analytics,
        Semantics</supportedServices>
    <supportedResources>acp,ae,cnt,la,ol,cin,cb,dlv,fopt,grp,nod,pch,
        req,sch,sub,fwr,swr,mem,bat,dvi,dvc,rbo,</supportedResources>
    <supportedInterfaces>mcc',mcc,mca</ supportedInterfaces >
    <serviceTerritory>
        <region>Northeast US</region>
        <name>Philadelphia, PA</name>
        <gps>39.9526N,75.1652W</gps>
        <radius>25 miles</radius>
    </serviceTerritory>
    <availability>24/7,365</availability>
    <capacity>
        <storage>16TB</storage>
        <devices>1000000</devices>
        <requests>10000</requests>
    </capacity>
    <loading>
        <current>32</current>
        <lastUpdate>20170619T154031</lastUpdate>
    </loading>
```

Figure 15:
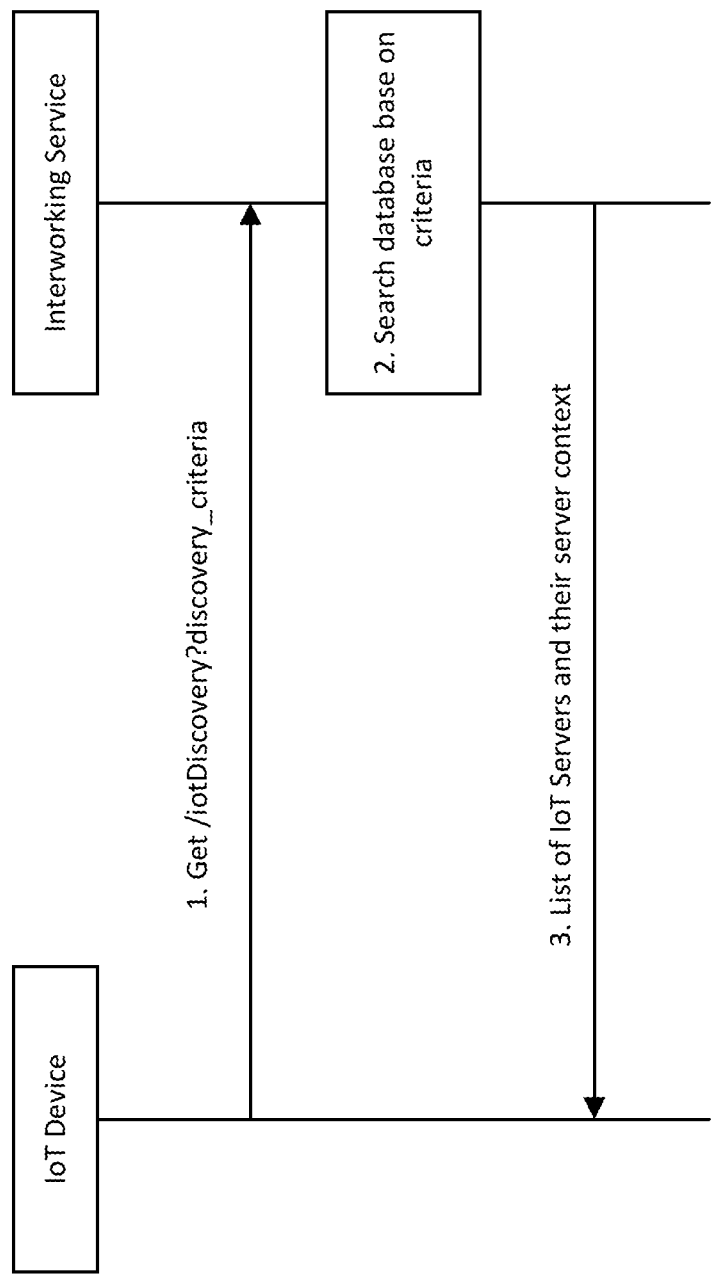
FIG. 15 is a call flow of an example IoT server discovery procedure.

The Interworking Service supports a discovery procedure in which IoT devices may discover it and all registered IoT servers and devices. In a similar fashion, IoT servers may discover the Interworking Service and all registered IoT servers and devices. For example, IoT devices may send a request targeting the URI "/iotDiscovery" and provide one or more discovery criteria to indicate what the device is looking for. The request may be sent via a multicast address or a unicast address if the IoT device is provisioned with or discovers the address of the Interworking Service. FIG. 15 shows an example procedure for executing an IoT Server Discovery request.

The contents of the discovery criteria may determine the amount of information that is selectively returned by the Interworking Service. Some criteria specify what and how much data is returned while other criteria specify what types of IoT servers and the corresponding server details the device is looking for.

Example discovery criteria may include: all available servers; only matching AND; only matching OR; only best match; IoT server details; IoT server type; supported protocols; supported payload formats; supported services; supported resource types; supported interface types; and supported device types. Table 9 shows an example CoAP message implementing the proposed discovery request.

All Available Servers (aas) Specifies all available IoT servers that match the provided criteria are returned Only Matching AND (oma) Specifies only IoT servers that match all the provided criteria are returned; when multiple criteria are provided, the IoT server must meet all the criteria in order to be in the list returned Only Matching OR (omo) Specifies only IoT servers that matches at least one of the provided criteria are returned; when multiple criteria are provided, the IoT server must meet at least one of the criteria in order to be in the list returned Only Best Match (obm) Specifies only one IoT server is returned that matches the most criteria. If more than one IoT server match the same criteria the Interworking Service may decide which to return based on its local policies (e.g., least recently used IoT server).

IoT Server Details (isd) Specifies how much details are returned about IoT servers; may be divided into various levels such as Basic, All Mandatory, or All. In "Basic" setting, only IoT server ID and all supported protocols are returned. "All Mandatory" may include information such as server address, server ID, SL protocol, payload formats, application protocols, security protocols, supported services, and supported resources. "All" may return all information about the IoT server.

IoT Server Type (ist) specifies the SL server type, e.g., oneM2M, OCF, LWM2M, WoT, Hypercat, etc.

Supported Protocols (sp) Specifies the protocols the IoT server supports, e.g., HTTP, CoAP, MQTT Supported Payload Formats (spf) Specifies the payload formats the IoT server supports, e.g., JSON, XML, CBOR, Plain Text, etc.

Supported Services (ss) Specifies the SL services the IoT server supports, e.g., Registration, Storage, Query, Subscription, DM, Analytics, Semantics, Retargeting, etc.

Supported Resource Types (srt) Specifies the resource types the IoT server supports, e.g., AE, container, contentInstance, subscription, mgmtObj, etc.

Supported Interface Types (sit) Certain SL protocols have well defined interface types each device supports and this parameter specifies those interfaces, for example, RD support Registration and Lookup interfaces; while OCF supports baseline, sensor, actuator, etc. interfaces.

Supported Device Types (sdt) specifies the types of devices the IoT server supports, e.g., sensors, appliances, HAIM, IPSO, etc. This criteria may also include semantic based discovery and query criteria based on semantic ontology information.

TABLE 9

Example IoT Server Discovery Request using CoAP Protocol

| | |
|---|---|
| Version: | 1 |
| Type: | CON |
| Token Length: | 6 |
| Code: | GET |
| msgID: | 1032 |
| Token: | token1 |
| Uri-Path= | discovery |
| Uri-Query= | obm |
| Uri-Query= | isd=basic |
| Uri-Query= | ist=onem2m |
| Uri-Query= | sp=coap |
| Uri-Query= | spf=json |

In the absence of discovery criteria, what the Interworking Service returns will be determined by the policies provisioned. One policy may specify that a list of IoT servers and their supported protocols are returned in the message payload to enable the IoT device to decide which server to communicate to. Another policy may be to only return the most popular or least loaded IoT server, the supported protocols, and their capabilities. A third policy may specify that an error response is returned with the message that not enough information is provided to complete the request.

If the Interworking Service is able to process the request, a list of IoT servers is returned that meets the criteria provided in the request. The list may include detailed information about the IoT server such as SL protocol, application protocols, payload formats, supported resource types, etc. The majority of mandatory and option server information may be returned. However, the IoT server's address may not be returned as communications are expected to go through the Interworking Service.

Once an IoT device receives the response to the discovery request, it may then decide which IoT server(s) to communicate to from the list of IoT servers that is provided. The device may examine the details about each IoT server and choose which one (or more) fulfill(s) its requirements. This process may be triggered by a person who is deploying the device and selects the IoT server through a user interface provided by the device. If a device is provisioned with information about the IoT server it must communicate to (e.g., a server supporting a certain SL protocol and provides certain services), the device software may programmatically make this determination and select the IoT server that matches the information returned in the response. For example, a device is configured with the requirements to discover IoT servers that support oneM2M protocol, uses CoAP and JSON protocols, and recognizes IPSO objects. The device then performs an IoT Server Discovery request specifying all the aforementioned criteria as well as specifying the "Only Best Match" criteria. The response returned would only provide one IoT server that the IoT device's software may then programmatically parse the returned data and continue on with its operations.

Certain headless IoT devices, on the other hand, may not have the capability to make a determination based on the results returned for the discovery request. In these cases, a provisioning tool may be used to initiate the IoT Server Discovery request and have the results displayed in the tool. A user could then select the desired IoT server and initiate a registration request on behalf of the IoT device. Information about the device is provided in the registration request so future communications goes to the device. The provisioning tool may be an application running on a tablet or a smartphone the user interacts with to select the IoT server.

The device configuration may be integrated with the IoT Server Discovery procedure to offload this requirement from IoT devices. A device manufacturer may simplify the design of their device applications by implementing the IoT Server Discovery procedure and let the Interworking Service select the appropriate IoT server to communicate to. In many IoT deployments where there is only one IoT server, the interworking decision is easily made within the Interworking Service through a policy.

In other cases, the use of the Accept header option in either the HTTP or CoAP protocol may be specified during the IoT Server Discovery request to inform the Interworking Service of the SL protocol for the target IoT server. This is an explicit indicator an IoT device may provide to allow the Interworking Service to assist in the device configuration process. Since the discovery procedure is generic enough, all IoT devices may implement the request regardless of SL protocol and use the resulting response to target the desired IoT server.

The availability of the discovery criteria allows IoT devices to generate queries during the discovery procedure to get selective information from the Interworking Service. This may simplify the parsing that is necessary to extract configuration data the device will need to communicate to an IoT server. For devices that have more capabilities and a user interface, the discovery criteria allows for more choices in selecting an IoT server to communicate with regardless of SL protocol.

For peer-to-peer SL protocols such as OCF, the device applications themselves host resources locally and expose a discovery mechanism where other device applications may discover the resources they host. For these SL protocols, the Interworking Service may proactively discover and register the devices and their resources to the IoT Repository. In addition, the Interworking Service may also register the devices and their resources on IoT servers that support a device registration procedure such as oneM2M servers.

In these cases, the Interworking Service may send periodic multicast discovery requests in the native SL protocol to discover the devices and their available resources. For example, the/oic/res resource is used for OCF resource discovery where an OIC client may discover the resources supported by the OIC device being queried. The Interworking Service may send a Get request targeting "/oic/res" using IP multicast to discover available devices. OIC devices that want to be discovered will respond with a unicast message to the Interworking Service with the contents of the/oic/res resource. The Interworking Service may then store the resulting information in the IoT Repository and may send a registration request(s) to one or more IoT Server(s) that supports such a procedure. In doing so, the Interworking Service may interwork these devices to one or more IoT servers.

Figure 16:
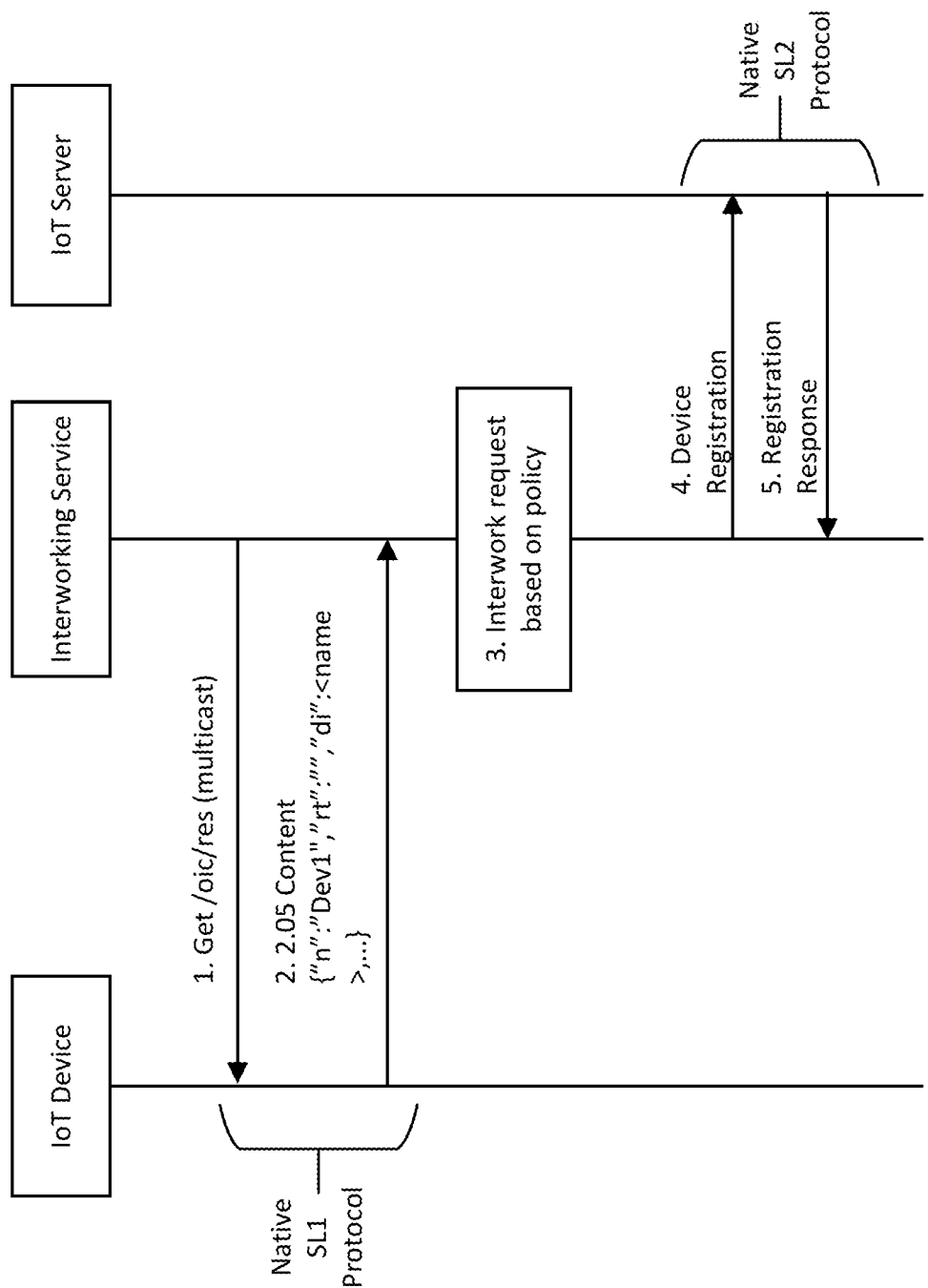
FIG. 16 is a call flow of an example IoT device discovery and registration procedure.

FIG. 16 illustrates an example IoT device discovery and registration procedure. In step 1 of FIG. 16, an Interworking Service performs periodic discovery requests in the native SL protocol. In this example, an OCF discovery request is multicasted using the "/oic/res" URI. The Interworking Service may also be triggered on demand by a user pressing a button on the device it runs on and in response, sending the generic IoT Device Discovery request.

In step 2, any IoT device that wishes to be discovered will return a response in a unicast message directly to the Interworking Service. The resource may include discovery information the device would like to share. In the example, the contents of the "/oic/res" is returned.

In step 3, the Interworking Service updates the device database in the IoT Repository and may use the policies provisioned to determine which IoT server to register the IoT device to. The policy may be provisioned such that no registration request is made.

In step 4, if the policy specifies, a device registration request is made on behalf of the IoT Device using the information returned in step 2. An interworked request is sent to the IoT server using the server's native SL protocol.

In step 5, the IoT server responds with the status of the registration request.

The procedure shown in FIG. 16 may also be applied to repositories such as a Resource Directory or a Hypercat server. These repositories store resource links of the actual IoT resources that are hosted elsewhere on IoT devices. The Interworking Service may access these repositories' registration interfaces and register the resource links onto another IoT server such as a oneM2M CSE.

Exemplary embodiments are provided for the IoT Interworking Service procedures defined in this document. Several interworking examples that show the use of the Interworking Service with a oneM2M CSE, a CoRE Resource Directory (RD), and a Hypercat server are presented. See: oneM2M TS-0001, Functional Architecture, CoRE Resource Directory draft-ietf-core-resource-directory-10 of Mar. 13, 2017, and the Hypercat 3.00 Specification.

Note that only pertinent information of messages and data in messages are displayed to convey the information for each particular example.

The following embodiments show how the Interworking Service may be used for the IoT Server Discovery procedure that includes device configuration. In addition, examples of interworking requests from IoT devices and interworking responses from IoT servers are provided.

A cellular service provider has deployed an Interworking Service within its Core Network infrastructure to support IoT deployments. For example, the Interworking Service may be implemented as a function of the SCEF in the 3GPP system. Within the Interworking Service, numerous IoT protocols are implemented such as oneM2M, OCF, LwM2M, WoT, etc. The cellular service provider actively works with IoT server providers and has agreements in place in which different IoT servers register to the Interworking Service using the IoT Server Registration procedure described herein. With the system in place, the cellular service provider advertises to users of the IoT capabilities in its network.

A user is a registered user of an IoT service provider that provides services through a oneM2M server operating in the cloud. The user purchases an IoT electric bike that operates using the OCF protocol and wants to manage the bike through his service provider. The bike has cellular capabilities to provide GPS coordinates and the ability to monitor the bike's battery level, tire pressure, and braking pad depth. In addition, the bike supports the generic IoT Server Discovery procedures described herein and has a user interface on the bike to allow the user to configure the bike to communicate to an IoT server.

Figure 17:
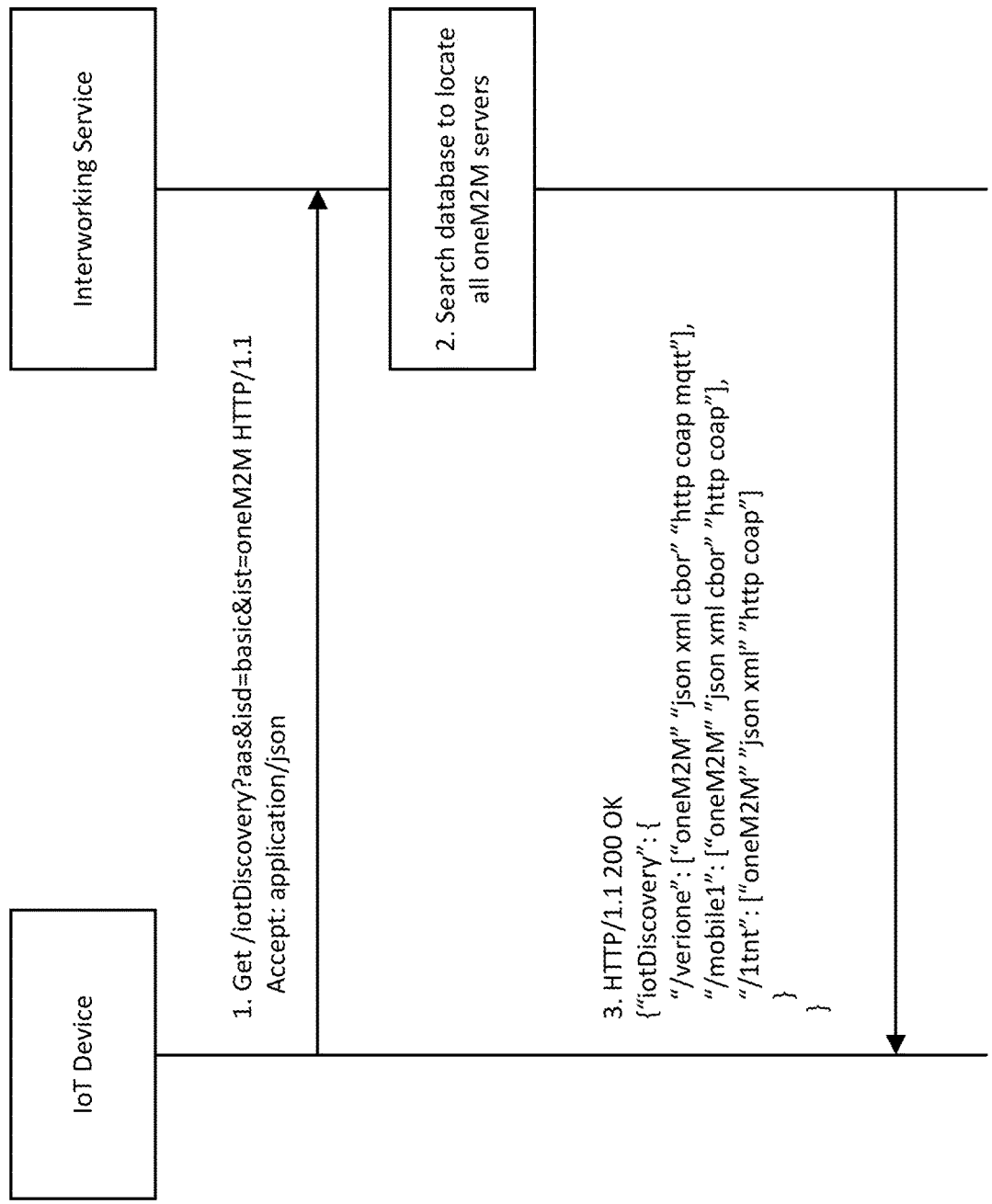
FIG. 17 is a call flow of an example generic IoT server discovery request in HTTP.

After the purchase, the user connects the bike to the cellular provider's network and initiates the IoT Server Discovery procedure. In the request, the user selects that the Interworking Service returns a list of basic information of all IoT servers that implements the oneM2M protocol. The Interworking Service will search its IoT server database and return only IoT servers that may communicate with the oneM2M protocol. The list is returned to the bike and displayed on its interface. The user scrolls through the list to find the IoT service provider he is registered with and selects it to save the server ID locally on the bike's system. All future communications from the bike will use this server ID to inform the Interworking Service where to send the request to. FIG. 17 shows an example procedure in which an IoT Server Discovery request uses the All Available Servers, IotServer Details, and IoT Server Type discovery criteria. In response to the discovery request, the Interworking Service returns a list of three oneM2M servers that it finds in the IoT server database. The list includes the server ID of each IoT server with the basic information for each of the servers— the SL protocol, the supported payload format and the application protocols.

Once the user has discovered the IoT server which the bike may communicate to, the bike may then publish its resource information to the IoT server. In OCF, this involves the bike sending a request to the Resource Directory (RD) to register its oic.wk.d resource information. The oic.wk.d resource provides a device ID and name for the bike and the request will target the IoT server previously discovered using the oneM2M server's ID.

The request is sent with a content type of "application/ xml" to indicate the request contains a payload in XML format. The content type may also be specified with other sub-types to identify the specific protocol the message is encoded in. In this case, OCF has chosen to use the common subtype "xml" rather than a vendor specific sub-type to identify that the OCF protocol is used. For example, oneM2M uses a vendor specific sub-type "vnd.onem2m-res+xml".

Upon receiving this request, the Interworking Service may determine interworking is required by comparing the content type specified in the request to the IoT Server Type associated with the IoT server ID provided. In this case, the sub-type "xml" does not definitively distinguish what SL protocol is used. Therefore, the Interworking Service may additionally examine the message data (either protocol headers or message payload) to identify if interworking should be used. In this case, the resource is "oic.wk.d" which indicates the bike is an OCF device. The Interworking Service then determines that interworking is required since the bike uses OCF protocol while the IoT server operates using oneM2M protocol.

Since this is an interworking request, the Interworking Engine references Table 5 to map OCF data models to oneM2M data models as part of step 3 of FIG. 12. This results in a mapping of OCF oic.wk.d to a oneM2M AE resource. Next, the oneM2M AE create API definition document from Table 3 is retrieved since it is a Post request and each element is evaluated based on the mapping table shown in Table 6. Finally, for each element of the API definition document, the appropriate data types are mapped based on a mapping table shown in Table 7. Table 13 shows an example request of the bike registering its "oic.wk.d" resource to the RD and Example 4 shows the interworked oneM2M message based on the data provided in Example 3. The Interworking Service will send the request shown in Example 4 to the oneM2M server and wait for a response to interwork back to the bike. During this process, information is saved in the Server Matching component to match request-response pairs to ensure the proper messages are sent to the correct entities.

Example 3

Example OCF Registration Request to Resource Directory

```
POST /mobile1 HTTP/1.1
Accept:application/json
X-OCI-RI:regreq
Content-Type:application/json
{ "oic.wk.d": {
    "n": "Electric Bike",
    "icv": "core.1.3.2",
    "di": "<bikeID>",
    "dmv": "res.1.2.0"
  }
}
```

Example 4

Example oneM2M Create AE Request Interworked from OCF RD Registration Request

```
POST /mobile1 HTTP/1.1
X-M2M-RI:regreq
X-M2M-Origin:<bikeID>
Content-Type:application/json; ty=2
{ "m2m:ae": {
    "lbl": "icv= core.1.3.2; dmv= res.1.2.0",
    "apn": "Electric Bike",
    "api": "<bikeID>",
    "rr": "true"
  }
}
```

The oneM2M server processes the request and returns an appropriate response to the Interworking Service. Using the information saved within the Server Matching component, the IoT Repository invokes the Interworking Engine once more to translate the response from oneM2M to OCF. Example 5 shows the response returned from the oneM2M server and Example 6 shows the interworked OCF response sent to the bike.

Example 5

Example oneM2M Create AE Response

```
HTTP/1.1 201 Created
X-M2M-RSC:2001
Content-Location:/mobile1/<bikeID>
X-M2M-RI:regreq
Content-Type:application/vnd.onem2m-res+json
{ "m2m:ae": {
    "ty": "2",
    "ri": "<bikeID>",
    "pi": "mobile1",
    "ct": "20170620T101003",
    "lt": "20170620T101003",
    "et": "99991231T235959",
    "aei": "<bikeID>"
  }
}
```

Example 6

Example oneM2M Create AE Response Interworked to OCF Registration Response

```
HTTP/1.1 201 Created
X-OCI-RS:200
Content-Type:application/json
{ "oic.wk.d": {
    "loc": "/mobile1/<bikeID>"
  }
}
```

The Interworking Service may be realized as a Common Services Function (CSF) within a CSE or as an enhanced oneM2M Interworking Proxy Entity (IPE) which has both Mcc and Mca interfaces. See oneM2M TS-0001, Functional Architecture. The Mcc interface allows the Interworking Service the ability to register IoT servers to the CSE as remoteCSE resources while the Mca interface allows for registering IoT devices to the CSE as AE or node resources. New attributes may be added to the remoteCSE resource as shown in Table 10 to represent an IoT server registration. Alternatively, the new attributes may be included as primitive attributes provided during CSE registration and the hosting CSE maintains the information as meta-data that is not made visible in the resource tree. An IoT server may register with the Interworking Service using the IoT Server Registration procedure. The Interworking Service may then create a remoteCSE resource on the hosting CSE and include a number of attributes, such as iwType, iwCapabilities, and iwInterfaces. Alternatively, these attributes may be added to the AE or node resource if the IoT server is to be represented as either an AE or node resource within the oneM2M resource tree.

TABLE 10

Example Interworking Attributes for oneM2M remoteCSE Resource

| Attributes of <remoteCSE> | Multiplicity | RW/RO/WO | Description | <remoteCSE Annc> Attributes |
|---|---|---|---|---|
| Universal and common attributes | * | * | See clause 9.6.1.3 of oneM2M TS-0001, Functional Architecture. | OA |
| cseType | 0 ... 1 | WO | Indicates the type of CSE represented by the created resource. Mandatory for an IN-CSE, hence multiplicity (1). Its presence is subject to SP configuration in case of an ASN-CSE or a MN-CSE. | OA |
| iwType | 0 ... 1 | WO | Indicates the type of IoT server/device that is being interworked with oneM2M. Examples include OCF, RD, Hypercat, LwM2M, WoT, etc. | OA |
| iwCapabilities | 0 ... 1 | RW | Indicates the capabilities of the IoT server/device. Examples may include services offered, list of supported resources or resource types, or list of types of devices. | OA |
| iwInterfaces | 0 ... 1 | RW | Certain IoT protocols have well defined interfaces and they may be listed here for the server/device. | OA |
| pointOfAccess | 0 ... 1 (L) | RW | For request-reachable remote CSE it represents the list of physical addresses to be used to connect to it (e.g., IP address, FQDN). If this information is not provided and <pollingChannel> resource does exist, the CSE should use <pollingChannel> resource. Then the Hosting CSE may forward a request to the CSE without using the PoA. | OA |
| CSEBase | 1 | WO | The address of the CSEBase resource represented by this <remoteCSE> resource. | OA |
| CSE-ID | 1 | WO | The CSE identifier of a remote CSE in SP-relative CSE-ID format (clause 7.2). | OA |
| M2M-Ext-ID | 0 ... 1 | RW | Supported when Registrar is IN-CSE. See clause 7.1.8 where this attribute is described. This attribute is used only for the case of dynamic association of M2M-Ext-ID and CSE-ID. | NA |

TABLE 10-continued

Example Interworking Attributes for oneM2M remoteCSE Resource

| Attributes of <remoteCSE> | Multiplicity | RW/RO/WO | Description | <remoteCSE Annc> Attributes |
|---|---|---|---|---|
| Trigger-Recipient-ID | 0 . . . 1 | RW | Supported when Registrar is IN-CSE. See clause 7.1.10 where this attribute is described. This attribute is used only for the case of dynamic association of M2M-Ext-ID and CSE-ID. | NA |
| requestReachability | 1 | RW | If the CSE that created this <remoteCSE> resource may receive a request from other AE/CSE(s), this attribute is set to "TRUE" otherwise "FALSE" (see note) | OA |
| nodeLink | 0 . . . 1 | RW | The resourceID of a <node> resource that hosts the CSE represented by the <remoteCSE> resource. | OA |
| . . . | | | | |

Once the remoteCSE resource is created, IoT devices that publish their resource information to the interworked server may have corresponding oneM2M resources created on the CSE. For example, a CoRE RD may be represented as a remoteCSE resource and CoAP endpoints that register their CoRE Link formats to the RD may have AE and container resources created under the remoteCSE resource. The AE resource may be mapped to the endpoint and the resource links may be organized as container, as flexContainer resources, or both, for example. Similarly, an OCF Repository, a LwM2M server, or a Hypercat server may all be represented as a remoteCSE. The Interworking Service may register itself to the hosting CSE and be associated with a remoteCSE resource. IoT devices that register to the Interworking Service may then be associate with AE resources. In this case, the attributes in Table 10 may be applied to AE resources to support interworking with different SL protocols that exist under the remoteCSE resource.

Certain IoT devices that operate as servers may be represented as oneM2M AE or node resources if the device only offers resources available locally on the device. Examples may be lights, switches, fans, or other simple IoT devices that do not host resources from other devices. If there are multiple resources available on the device, then oneM2M container or flexContainer resources may be created for each of the resources. The attributes in Table 10 may be added to either the AE or node resource to indicate the IoT device is being interworked from another SL protocol.

Figure 18:
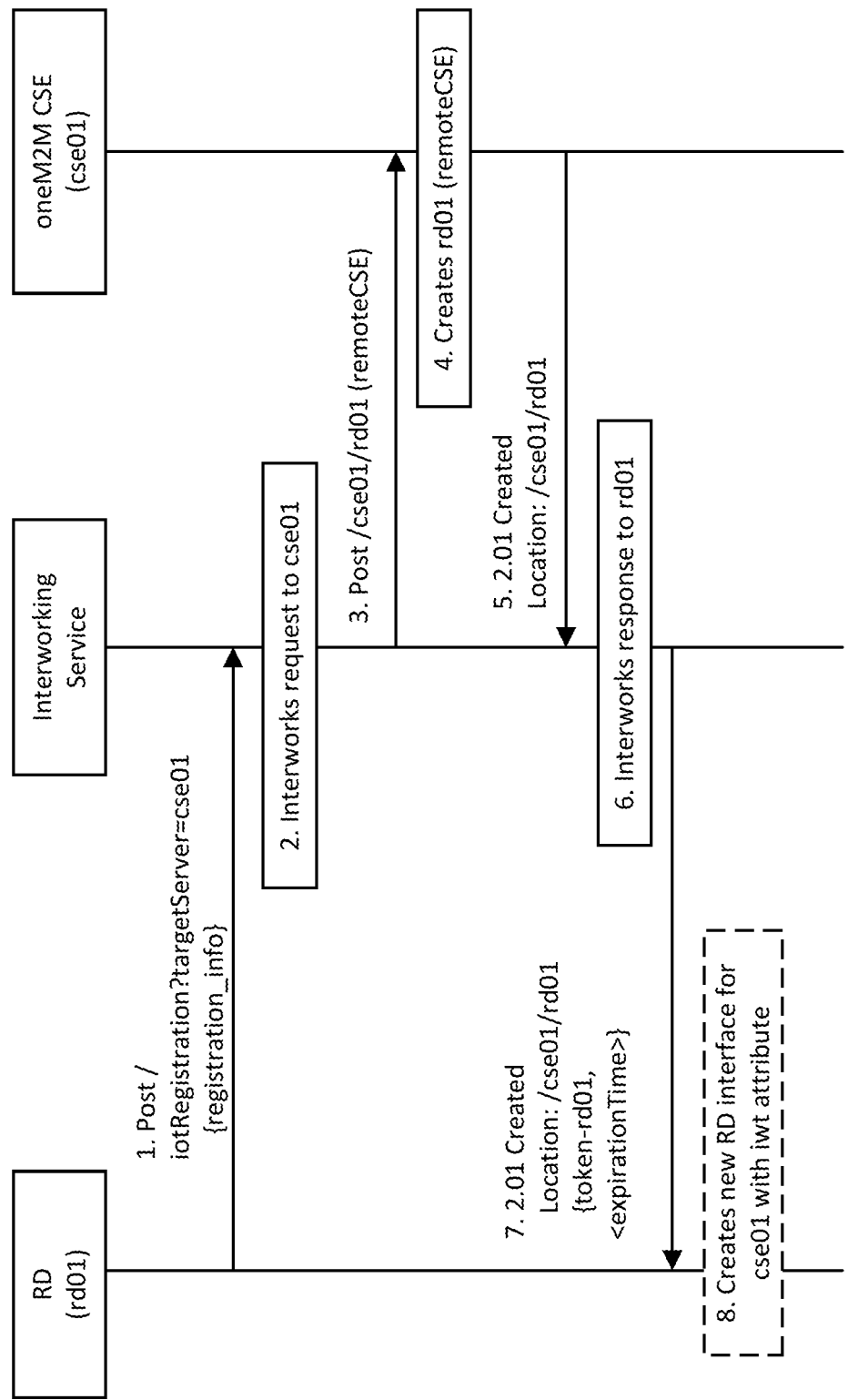
FIG. 18 is a call flow of an example IoT server registration procedure from RD to CSE.

The Interworking Service may be integrated with a CoRE RD to provide interworking with a service layer server such as a oneM2M CSE. Alternatively, the Interworking Service may operate standalone and interwork the core link formats on the RD to oneM2M resources and attributes to allow oneM2M AEs access to resources on the RD endpoints. FIG. 18 shows an example call flow of an RD registering to a CSE using the IoT Server Registration procedure. Note that rd01 could also have used the IoT Server Discovery procedure to locate cse01 before it registers to cse01. rd01 targets the "/iotRegistration" URI and provides a list of server contexts to the Interworking Service. The interworked request is sent to cse01 in step 3 where it is requested to create a remoteCSE resource on cse01. Alternatively, an AE resource may be created instead of a remoteCSE resource. Upon getting a success response from cse01, an interworked response is relayed to rd01 with the server token provisioned by the Interworking Service and the expiration time of the registration. Once registered to a CSE, an RD may create oneM2M resources to correspond to endpoints and the link formats that it manages.

In step 1 of FIG. 18, an RD rd01 executes the IoT Server Registration request to the Interworking Service targeting cse01. The request includes the RD's name=rd01 and other registration information. Previously, rd01 may have discovered cse01 using the IoT Server Discovery procedure or be provisioned with cse01's contact information. rd01 includes the Accept option with a value of "application/link-format+json" to indicate the SL protocol it is associate with.

In step 2, an Interworking Service detects interworking is required since the SL protocol of the target server is different than indicated SL protocol in the Accept option. The server context information are interworked to the new remoteCSE attributes iwType, iwCapabilities, and iwInterfaces.

In step 3, the Interworking Service sends a remoteCSE resource create request to cse01 to correspond with rd01 and inserts the proposed interworking attributes (e.g., iwType, iwCapabilities, iwInterfaces) as well as the keywords "RD" and "interworking" into the oneM2M labels attribute. Other key words may be added to the labels attribute to offer more context to the remoteCSE resource. Note that other RDs may be represented as remoteCSE resources and hence the CSE may link multiple RDs together by creating multiple remoteCSE resources.

In step 4, cse01 creates the remoteCSE resource on its resource tree. Alternatively, an AE resource may be created for rd01 instead.

In step 5, a "2.01 Created" response is returned with the location of the remoteCSE resource.

In step 6, the Interworking Service interworks the response from cse01 to rd01.

In step 7, the Interworking Service sends the interworked response to rd01 with the status of the registration, a server token for rd01 to use in future interworking request, and an expiration time of the registration.

In step 8, optionally rd01 may also create a new interface for cse01 where RD endpoints may target to search for resources in cse01. The new RD interface may have the form "/rd-iw/cse01" or "/rd/iw-cse01" and RD endpoints may target this new interface to search for resources on cse01. A new link format attribute "Interworking Resource Type" (iwrt) may be introduced that maps to oneM2M's labels attribute. Alternatively, a new RD endpoint registration entry for cse01 may be added to the RD with a new link format attribute "Interworking Type" (iwt) to indicate interworking is available. RD endpoints may target the newly created cse01 registration with the iwt attribute to initiate a resource discovery on cse01. The RD endpoint may provide the iwrt attribute to search for resources in cse01.

Figure 19:
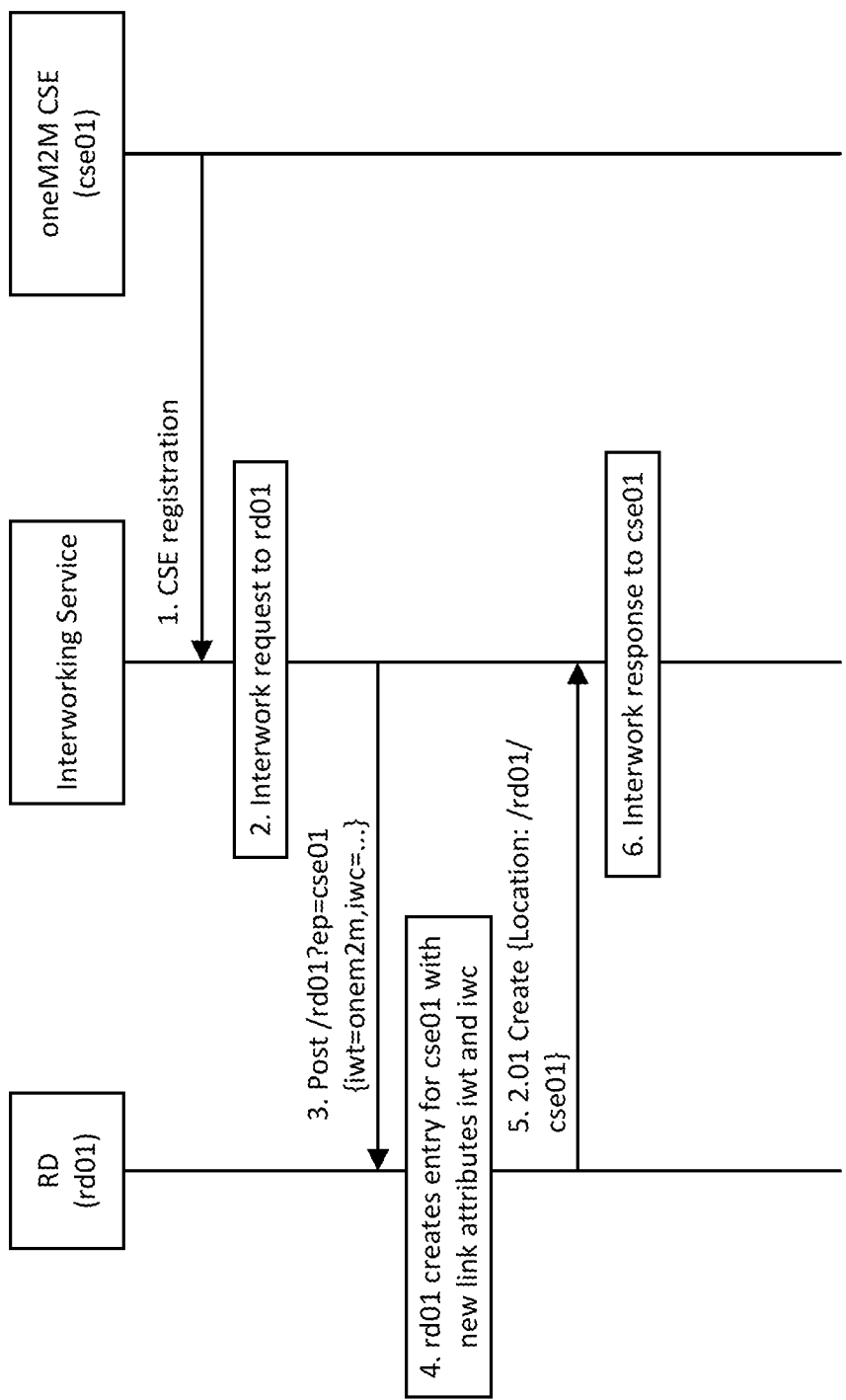
FIG. 19 and FIG. 20 show a call flow of an example IoT server registration procedure from CSE to RD.
Figure 20:
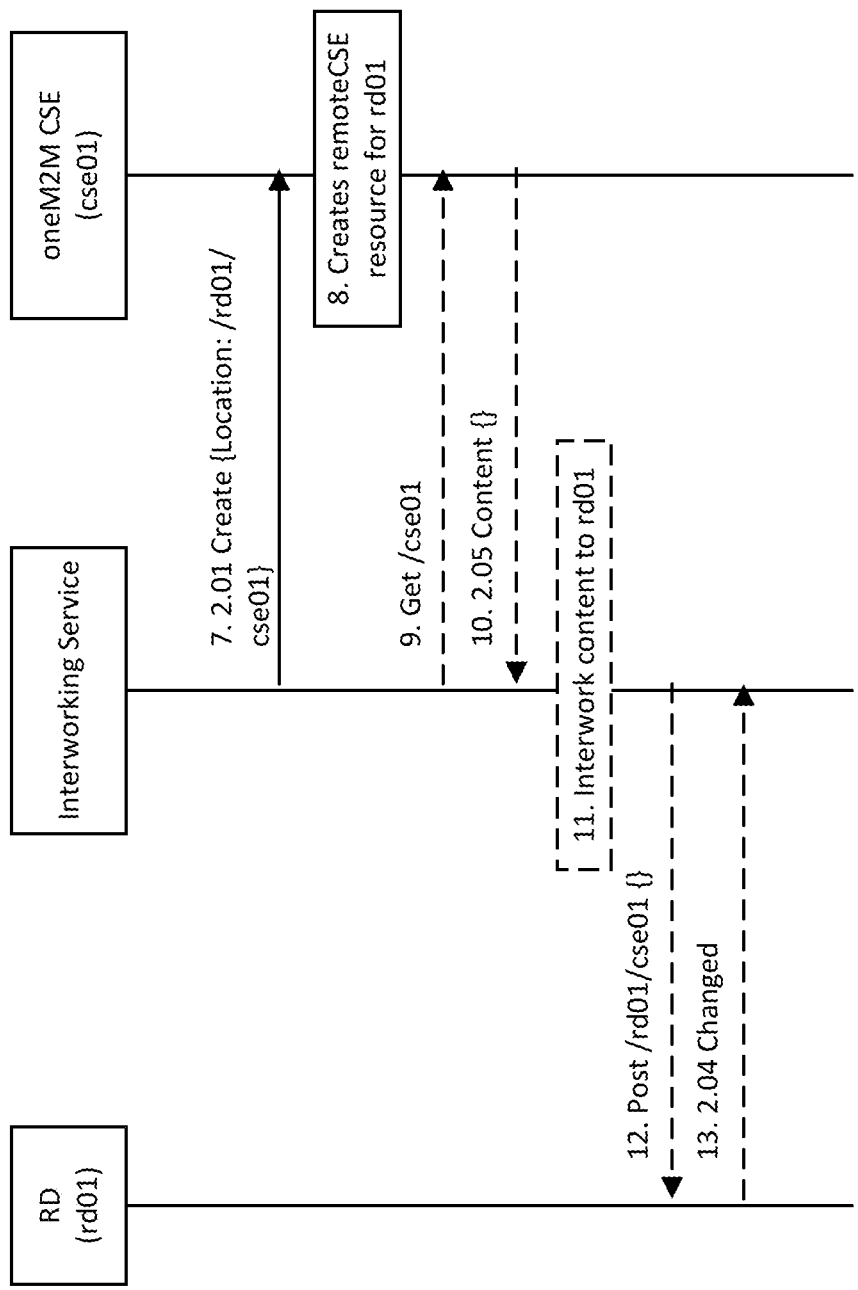

A oneM2M CSE may also register to an RD to enable IoT interworking capabilities as shown in FIG. 19 and FIG. 20. In this example, cse01 is sending an existing oneM2M CSE registration request instead of the herein proposed IoT Registration request as shown in FIG. 18. In response, the Interworking Service will perform an endpoint registration on behalf of cse01 and include new link attributes iwt, iwc, and iwi as appropriate. These attributes correspond with the oneM2M interworking attributes listed in Table 10. In addition, the Interworking Service may perform retrieves of cse01's resource tree to gather information that is found in the IoT Server Registration request but not included in the CSE registration request. Conversely, the Interworking Service may also perform lookups of rd01 to update the interworking attributes iwType, iwCapabilities, and iwInterfaces of rd01's remoteCSE resource on cse01.

In step 1 of FIG. 19, cse01 sends a oneM2M CSE registration request to the Interworking Service. In step 2, an Interworking Service interworks the request to an RD endpoint registration request. In step 3, the interworked request is send to rd01 with new link attributes iwt, iwc, and iwi as appropriate. In step 4, rd01 creates an entry for cse01 with the new link attributes. In step 5, rd01 returns an appropriate response with the location of the cse01 entry in the RD. In step 6, the Interworking Service interworks the response to cse01.

In step 7 of FIG. 20, the interworked response is sent to cse01 with the location of the cse01 entry in the RD. In step 8, cse01 creates a remoteCSE resource for rd01.

In step 9, optionally, the Interworking Service may retrieve resources from cse01 to obtain information that are required in the IoT Server Registration request but not included in the CSE registration request. There may be multiple retrieves made if the information is found in different resources within cse01. Alternatively, resource discovery could be performed on cse01 to ascertain the types of resources that are managed by cse01. Conversely but not shown in FIGS. 19 and 20, the Interworking Service may perform similar retrieves on rd01 to extract information for updating the interworking attributes (e.g., iwType, iwCapabilities, and iwInterface) of rd01's remoteCSE resource.

In step 10, cse01 returns the associate contents to the retrieve or discovery request in step 9. In step 11, the Interworking Service interworks the contents returned in step 10 to rd01. In step 12, a request with the interwork contents is sent to rd01. In this case, the request is a registration update to cse01's registration entry in rd01. In step 13, rd01 returns an appropriate response.

Figure 21:
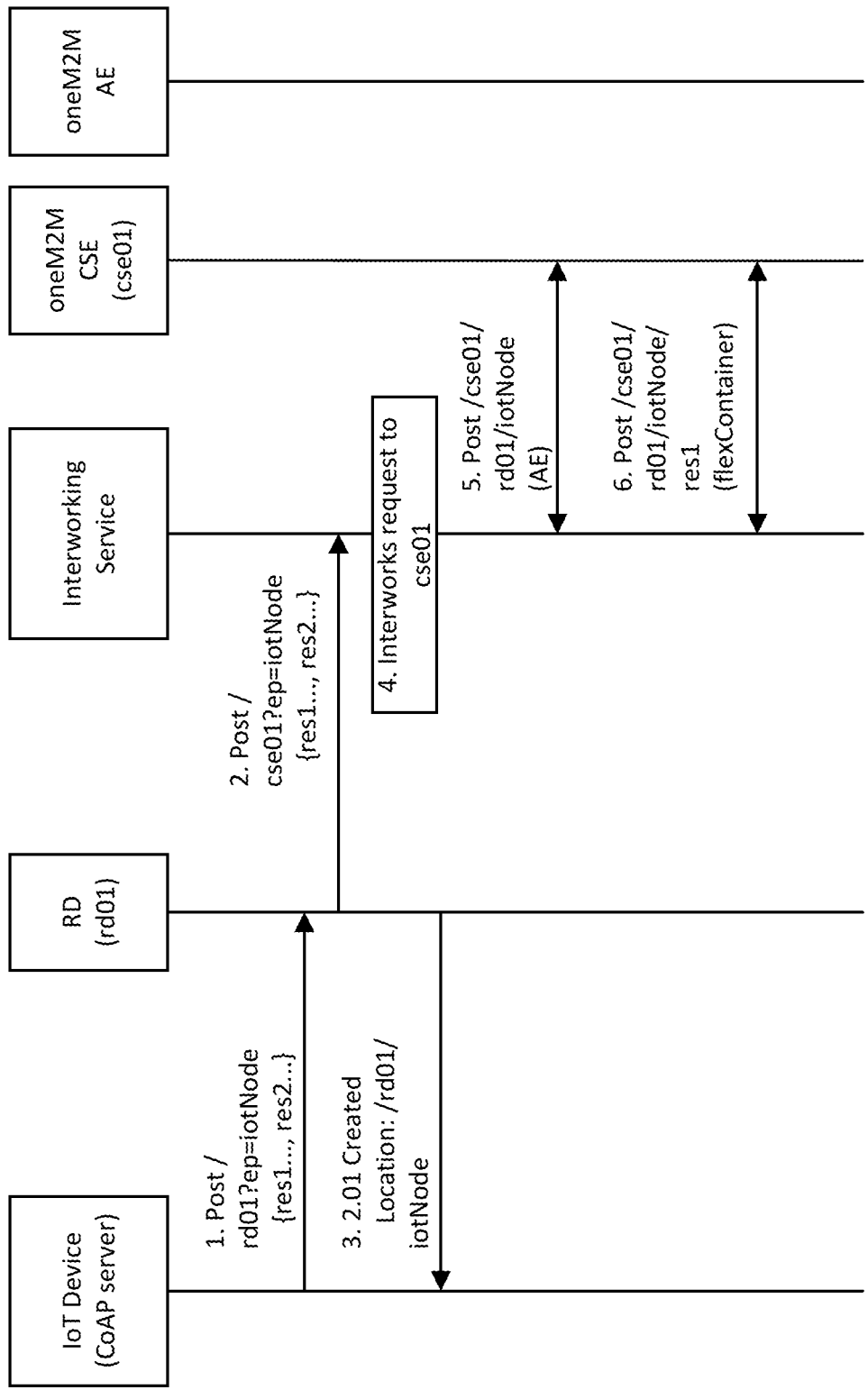
FIG. 21 and FIG. 22 show a call flow of an example interworking RD endpoint registration request to oneM2M CSE.
Figure 22:
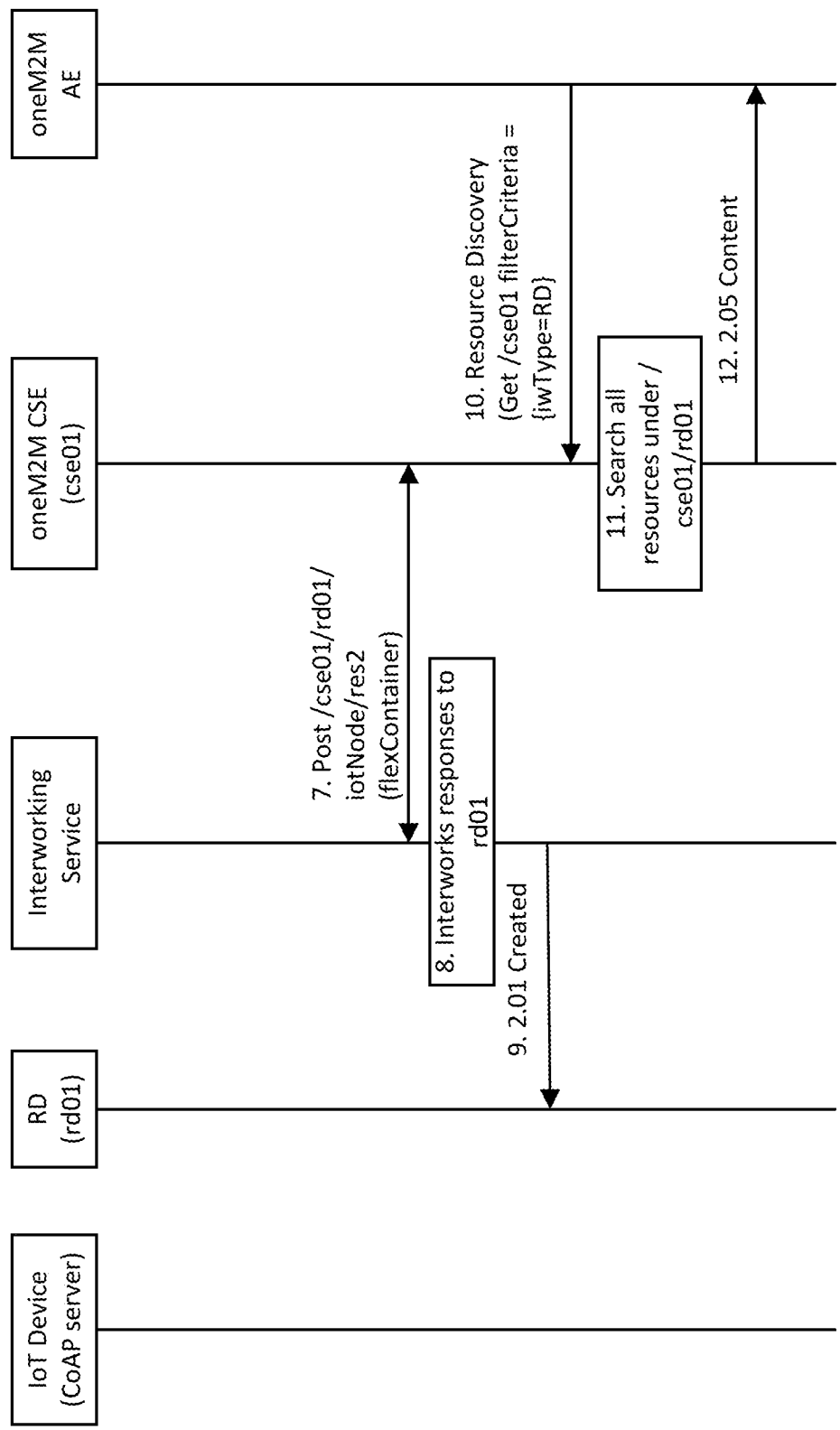

The RD's registration interface may also be extended for an RD to register a device's resource links onto the CSE. The link format in an endpoint's registration request may be interworked to a oneM2M create AE registration request and one or more flexContainer create requests for each resource hosted by the RD endpoint. Alternatively, an endpoint's registration may also be interworked to a oneM2M node resource and the endpoint's resource links may be mapped to oneM2M flexContainer resources. Once the oneM2M resources are created, other oneM2M AEs may access the RD endpoint's resources through the AE, node, and flex-Container resources corresponding to the endpoint's link format. The request will be retargeted to the Interworking Service, which may then interwork the request to the RD endpoint. FIGS. 21 and 22 shows an example call flow of extending the RD's registration interface to interwork to a oneM2M CSE.

In step 1 of FIG. 21, an IoT device (CoAP server) performs an endpoint (EP) registration request with an endpoint name of "iotNode" and two resource links "res1" and "res2".

In step 2, rd01 processes the request and makes a determination based on the presence of cse01 to send the registration request to the Interworking Service to also register iotNode on the oneM2M CSE with a target URI of "/cse01" and an Accept option set to "application/link-format+json". The RD had previously registered to cse01 using the procedure shown in FIG. 18.

In step 3, rd01 sends a response to iotNode for the RD registration from step 1. Alternatively, rd01 may wait until after step 8 to return the response to iotNode.

In step 4, the Interworking Service interworks the request from step 2. The Mapping Tables component contains data model mappings as follows: RD ep=oneM2M AE, RD resource links=oneM2M flexContainers. Using this mapping information, the Interworking Service requires three Post requests to the CSE in order to map the EP registration to a oneM2M AE and both resource links (res1 and res2) to oneM2M flexContainers.

In step 5, the Interworking Service first creates a oneM2M AE resource to correspond with the endpoint "iotNode" and an appropriate response is returned from cse01. In step 6, then a oneM2M flexContainer is created for resource link "res1" and an appropriate response is returned from cse01.

In step 7 of FIG. 22, a second oneM2M flexContainer is created for resource link "res2" and an appropriate response is returned from cse01. In step 8, the Interworking Service aggregates cse01's responses and interworks it into a separate response to rd01. In step 9, the Interworking Service sends the interworked response and returns the location of the iotNode registration back to rd01.

In step 10, a oneM2M AE may perform resource discovery using filter criteria of resources hosted by an RD by specifying iwType=RD. Using the filter criteria in this way informs the hosting CSE that the AE is only interested in discovering resources of RD endpoints. Note the oneM2M resources associated with an RD endpoint's registration may also be found by other AEs using oneM2M resource discovery without the iwType filter criteria.

In step 11, cse01 searches its resource tree and finds res1 and res2 flexContainers. In step 12, cse01 returns the search result to the AE.

Figure 23:
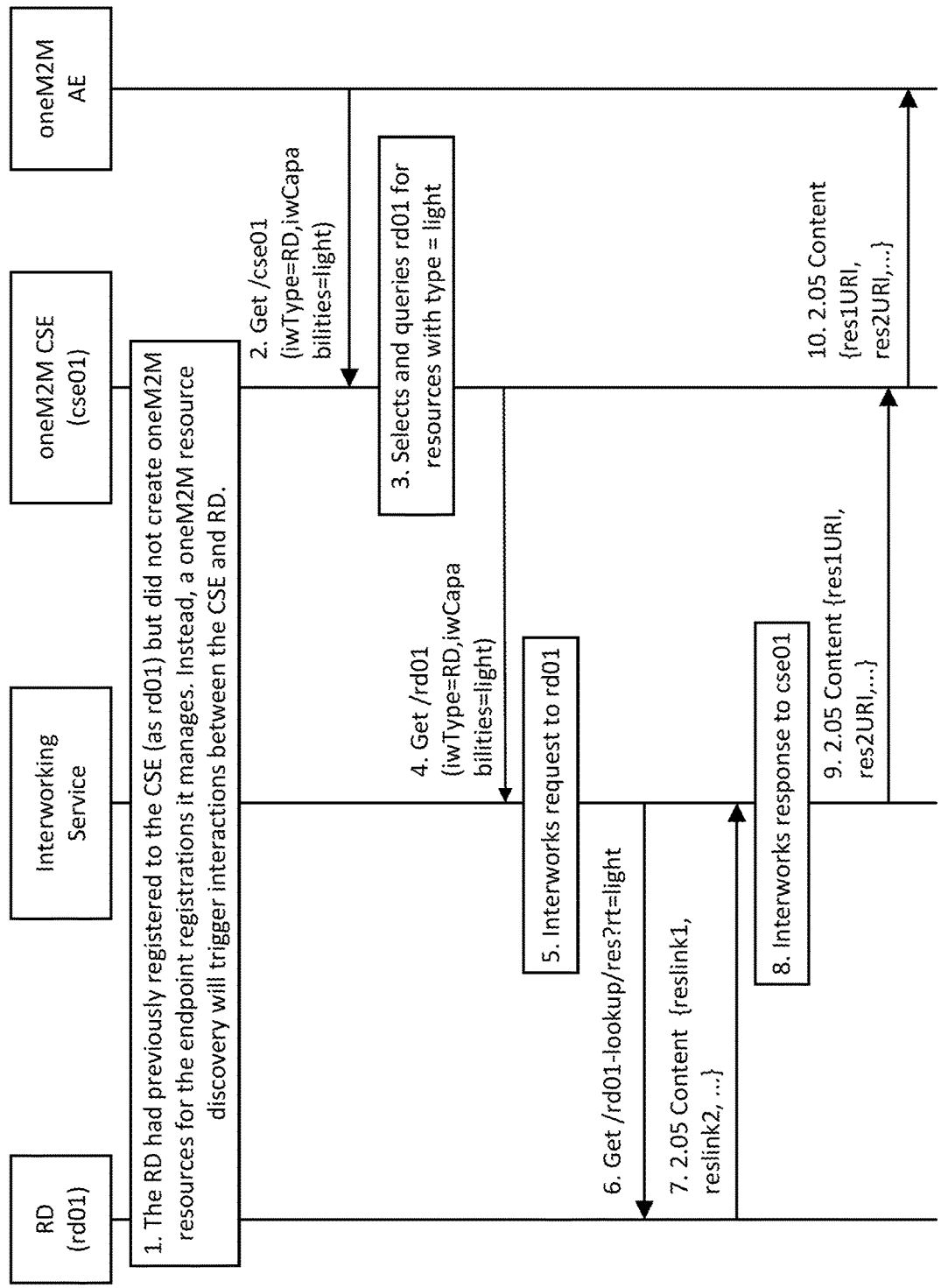
FIG. 23 is a call flow of an example interworking oneM2M resource discovery to RD lookup interface.

FIGS. 21 and 22 show the case in which an RD creates resources on the oneM2M CSE in response to endpoint registrations. This approach allows oneM2M AEs to directly discover an RD endpoint and its resource links directly within the CSE using native oneM2M resource discovery. However, it introduces overhead for the RD to maintain synchronization between the listing in the RD and the CSE. An alternative method to avoid the need for this synchronization is for the RD to only register to the CSE and let the CSE query the RD to discover the resource links available in the RD in response to oneM2M resource discovery. FIG. 23 shows an example of interworking oneM2M resource discovery to the RD's Lookup interface to provide this alternative approach to interworking.

In step 1 of FIG. 23, an RD registers to cse01 as described in FIG. 18 and a oneM2M resource (rd01) is created for the RD. In Step 2, a oneM2M AE performs resource discovery in which the attributes iwType and iwCapabilities are utilized to inform the CSE that the AE is looking to find devices with capability of light that is listed in an RD.

In step 3, cse01 selects rd01 based on the iwType attribute it has for rd01 and retargets the query towards the Interworking Service. If there are more than one RD registered with cse01, multiple queries may be made by cse01. In Step 4, cse01 sends a oneM2M request to query rd01 for resources that has an iwCapability of light.

In step 5, the Interworking Service interworks the request from cse01 based on the procedures proposed herein.

In step 6, an interwork request is generated in which the RD's Lookup interface is query for resources with a resource type (rt) of light. In Step 7, rd01 returns a response with a list of core link formats that contains a resource type of light. In Step 8, the Interworking Service interworks the response from rd01 to a response to cse01. In Step 9, the Interworking Service sends a response to cse01 with the results of the RD lookup query. In Step 10, cse01 returns a list of URIs that correspond to the link formats found from the RD lookup interface.

The procedure in FIG. 23 may be reversed in which an RD client performs a lookup query of rd01 for resources hosted on a oneM2M CSE. The RD lookup query may include the iwt link attribute to specify the client wants to perform a lookup for oneM2M resources on cse01. Alternatively, a new RD lookup interface may be created for cse01 in which RD clients may target to indicate a lookup of oneM2M resources. This new interface may simply be "/rd01-lookup/cse01" or "/cse01-lookup", for example.

Figure 24:
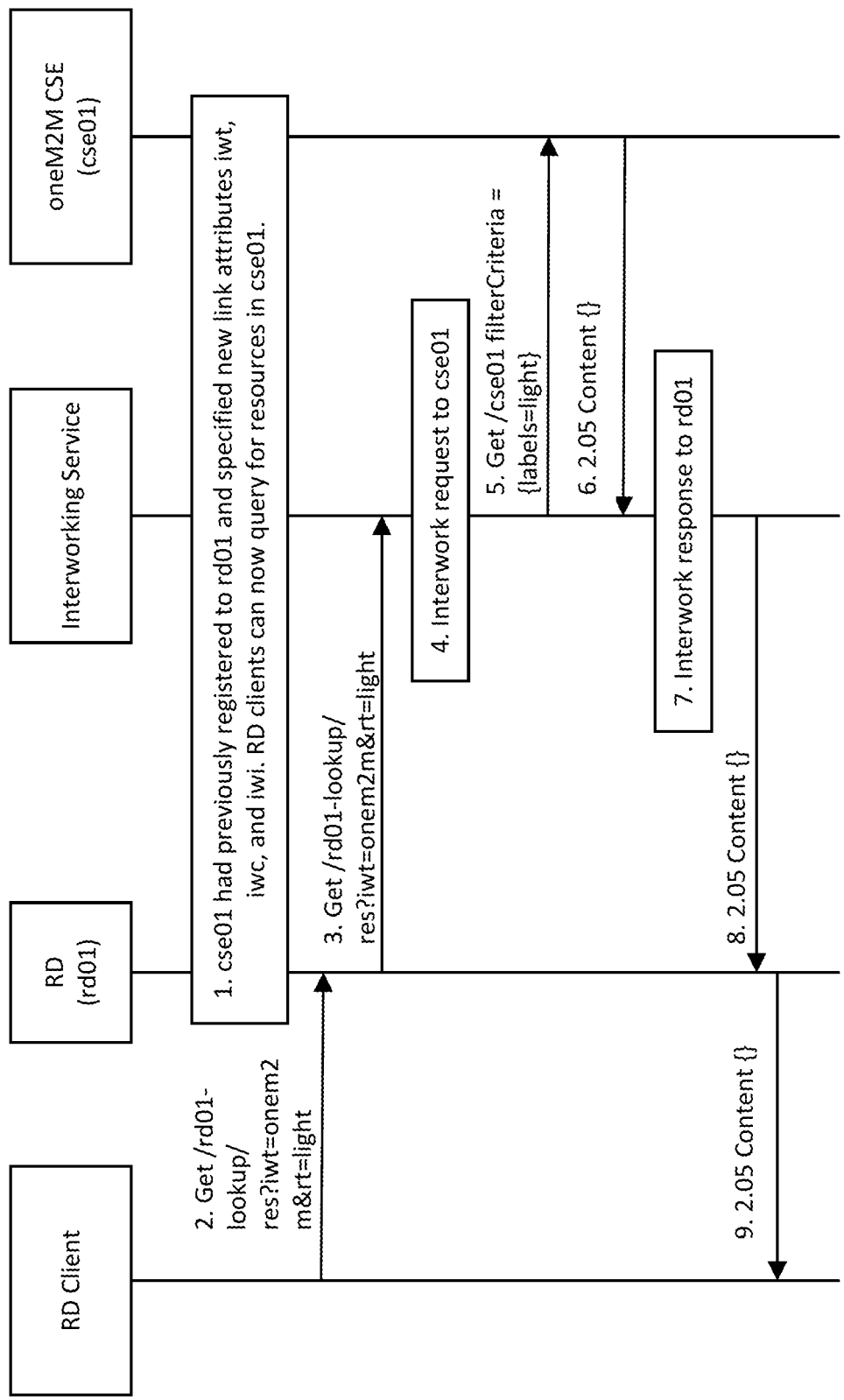
FIG. 24 is a call flow of an example oneM2M AE retrieval request with interworking service.

An example is shown in FIG. 24. In step 1 of FIG. 24, cse01 had previously registered to rd01 using either the IoT Server Registration request or the existing oneM2M CSE registration request. An RD endpoint registration entry is created for cse01 in which the new link attributes iwt, iwc, and iwi may be associated with cse01 to enable interworking.

In step 2, an RD client sends a lookup request to rd01 and specifies the iwt attribute with a value of oneM2M and with some resource type it is looking for. Alternatively, a new RD lookup interface such as/rd01-lookup/cse01 or/cse01-lookup may be targeted by the RD client to indicate the lookup is to be performed on cse01.

In step 3, rd01 forwards the lookup request to the Interworking Service. In Step 4, the Interworking Service interworks the request to cse01. In Step 5, the interworked request is sent to cse01 to perform oneM2M resource discovery.

In step 6, cse01 returns an appropriate response with the contents of the discovery results. In Step 7, the Interworking Service interworks the response to rd01. In Step 8, the interworked response is sent to rd01. In Step 9, rd01 returns the results to the RD client.

Figure 25:
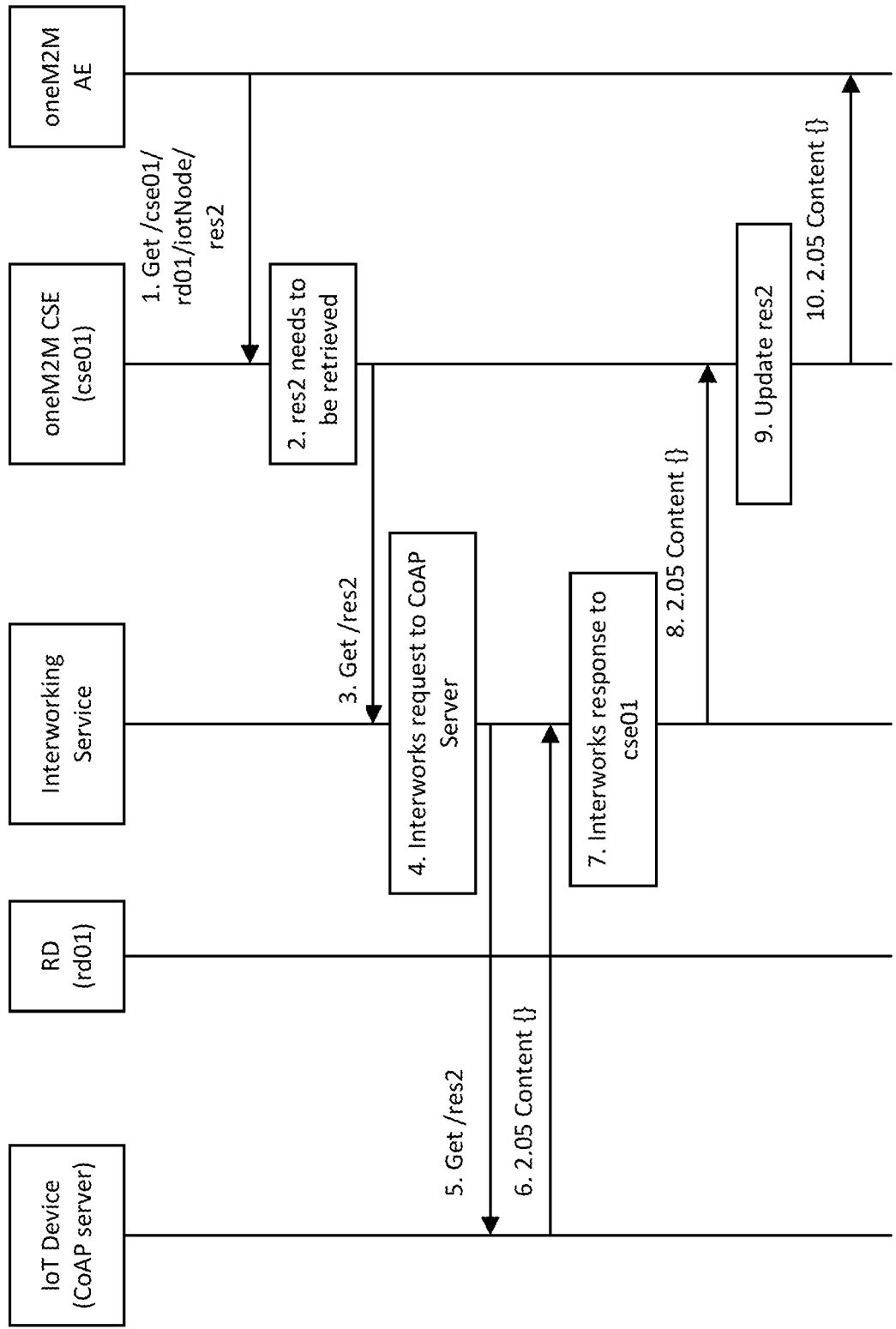
FIG. 25 is a call flow of another example oneM2M AE retrieval request with interworking service.

Once a oneM2M AE discovers the CoAP server's resource links, it may then retrieve the resource representation associated with the link. FIG. 25 shows an example procedure of an AE retrieving res2 from a CoAP server that hosts the resource.

In step 1 of FIG. 25, the AE performs a Get of the URI "/cse01/rd01/iotNode/res2". In Step 2, cse01 determines the resource data needs to be retrieved.

In step 3, cse01 retargets the request to the Interworking Service with a target URI of "/res2" and an Accept option set to "application/vnd.onem2m-res+json". The "To" field will point to "iotNode".

In step 4, the Interworking Service interworks the request to the CoAP server. In Step 5, the Interworking Service sends the interworked request to the CoAP server to retrieve the latest resource representation. In Step 6, the CoAP server returns the latest content of res2.

In step 7, the Interworking Service interworks the response from the CoAP server. In Step 8, the Interworking Service sends the interworked response to cse01. In Step 9, cse01 updates the latest content for res2. In Step 10, cse01 returns the latest content associated with res2 to the AE.

Figure 26:
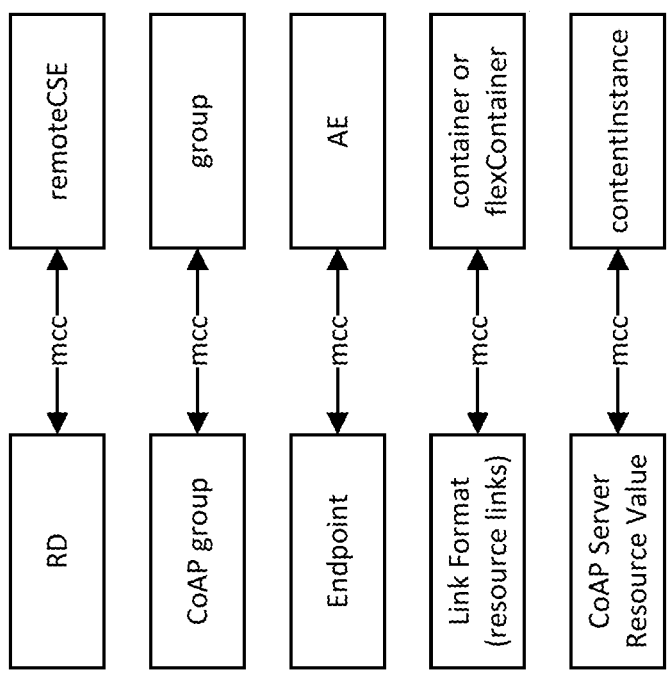
FIG. 26 illustrates an example data model mapping from RD to oneM2M.
Figure 27:
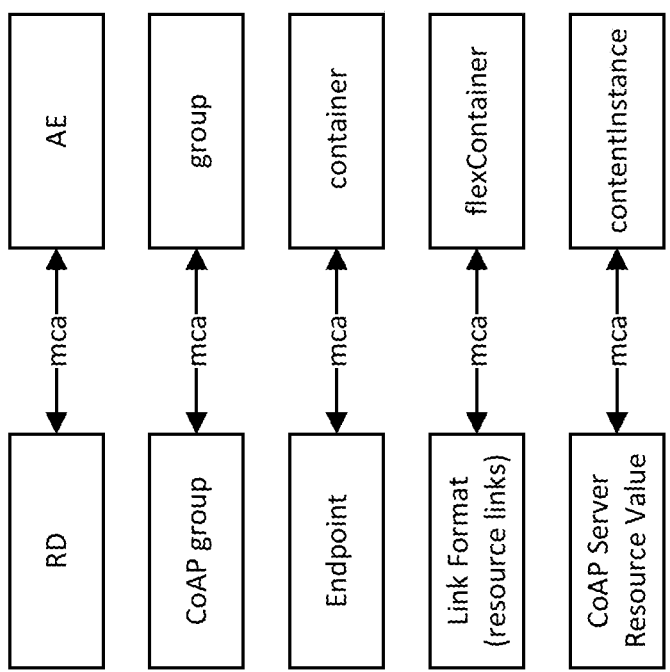
FIG. 27 illustrates another example data model mapping from RD to oneM2M.

FIGS. 18, 21, and 22 show the RD and endpoints (or CoAP servers) being represented as remoteCSE and AE resources in oneM2M, respectively. The link formats of the endpoints' resources may be represented as either oneM2M container or flexContainer resources. However, an alternative to organize RD resource links on the CSE may be that RDs are represented as oneM2M AE resources and the link formats of the endpoints' resources within the RD be realized as oneM2M container or flexContainer resources. The pointOfAccess attribute of the AE resource may be configured to point to the Interworking Service and all requests targeting the AE's container or flexContainer resources are retargeted to the Interworking Service, which then interworks the request to either the RD or the endpoints. Similarly, for multiple RDs, multiple AE resources may be created each representing the corresponding RDs. FIGS. 26 and 27 show potential data model mappings from RD to oneM2M. In FIG. 26, the Interworking Service has an mcc interface to the CSE and RDs are represented as remoteCSEs, endpoints as AEs, endpoint's link formats as containers/flexContainers, and CoAP server's resources as contentInstance resources. In FIG. 27, the Interworking Service only has an mca interface to the CSE and hence, an RD is represented as an AE, the endpoints as containers, the endpoint's link formats as flexContainers, and the CoAP server's resources as contentInstance resources. In both cases, RD CoAP group entries are mapped to oneM2M group resources.

A Hypercat server provides search capability of IoT resources through the use of catalogues. The catalogues use the JSON file format to describe IoT resources including their URI and other metadata and provides web APIs for fetching, serving, searching, and editing the catalogue. To access the Hypercat server, a client uses the HTTP protocol with a target URI of "/cat". Each resource in a catalogue is described as an item and annotated with item meta-data similar to a semantic triple that describes the relationship between a subject and an object. A client may then accumulate one or more catalogues together to form a knowledge graph of IoT resources, which may then be queried to find the desired information.

A Hypercat server may be represented as an IoT server and use the Interworking Service to interoperate with a SL server such as a oneM2M CSE. The Hypercat server may host one or more catalogues and each catalogue may be represented as either a oneM2M remoteCSE or AE resource. Alternatively, all the catalogues in a Hypercat server may be organized collectively as one remoteCSE or AE resource. The items within a catalogue may then be represented as container or flexContainer resources and the item's meta-data may be represented as a oneM2M semanticDescriptor attribute. A Hypercat catalogue-metadata describes the capabilities of the Hypercat server for the catalogue and may be interworked as the iwCapabilities attribute in Table 10 for the oneM2M remoteCSE or AE resource.

To enable interworking, a Hypercat server may execute the IoT Server Registration procedure targeting a oneM2M CSE. Upon successful registration, the created remoteCSE or AE resource may expose the Hypercat catalogue to oneM2M AE clients for searching IoT resources found in the catalogue. A resource discovery request targeting the remoteCSE or AE resource may trigger an interworking request to the Hypercat server as shown in the example of FIG. 28.

Figure 28:
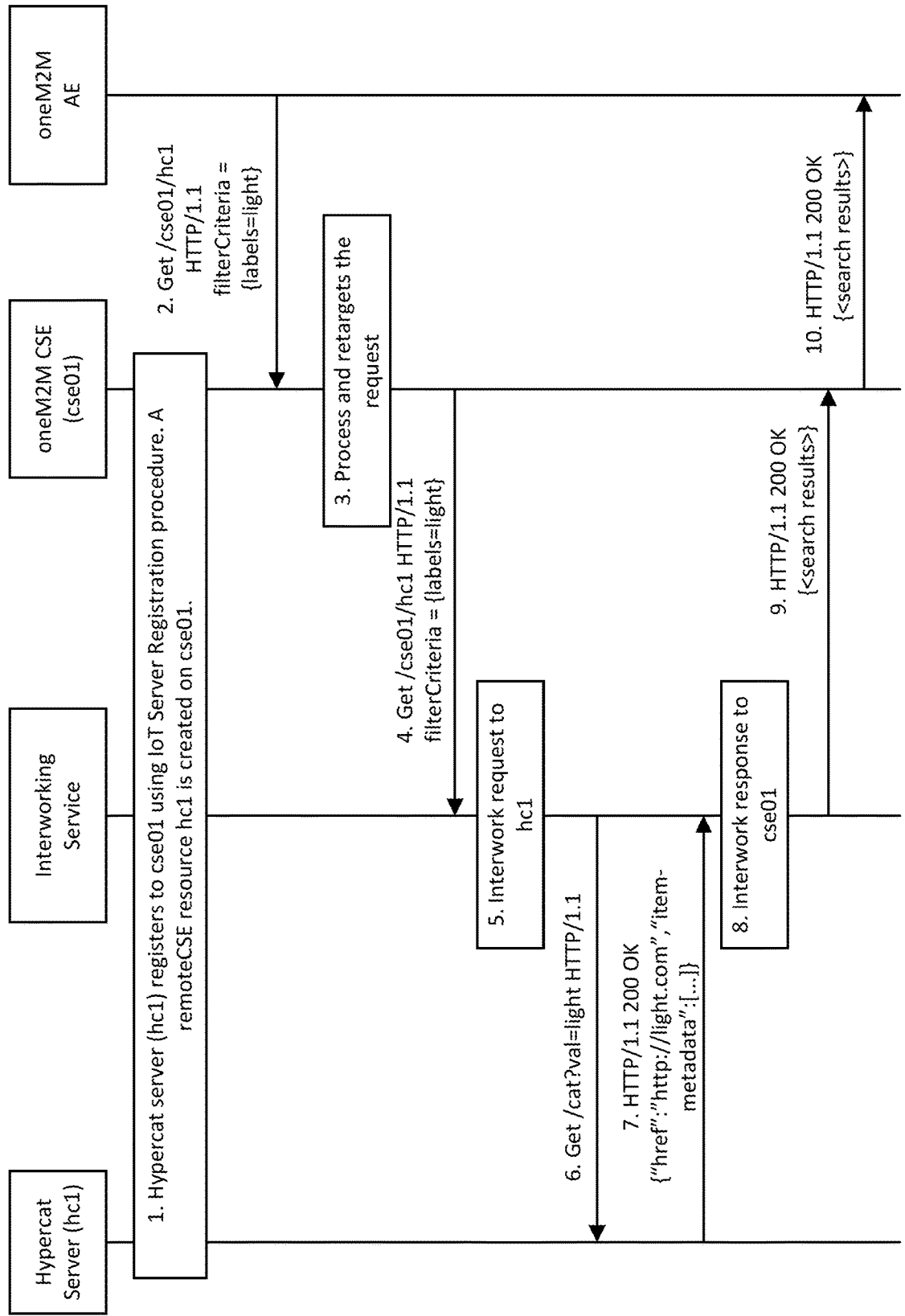
FIG. 28 is a call flow of an example oneM2M resource discovery interworking to HyperCAT simple search.

In step 1 of FIG. 28, the Hypercat server registers to cse01 with the aid of the Interworking Service. A remoteCSE resource hc1 is created on cse01 and hc1's catalogue-metadata is interwork to the iwCapabilities attribute of the remoteCSE resource. One capability in this case indicates hc1 supports simple searches.

In step 2, a oneM2M AE performs resource discovery of the hc1 resource where a query string of "val=light" is provided. The query string may be in the form of a filter criteria or primitive attribute. In Step 3, cse01 processes the request and makes a determination to retarget the request, e.g., based on a subscription that exists for the/cse01/hc1 resource or a retargeting mechanism of cse01 if one exists.

In step 4, cse01 retargets the request to the Interworking Service with a target URI of "/hc1", a query parameter "val=light", and an Accept option set to "application/vnd.onem2m-res+json". In Step 5, the Interworking Service interworks the request from cse01 to hc1.

In step 6, the interworked request is sent to hc1 to perform a simple search of the catalogue with a query string of "val=light". In Step 7, hc1 returns a catalogue item matching the simple search criteria with the item's URI and metadata. In Step 8, the Interworking Service interworks the response from hc1 to cse01. In Step 9, the interworked response is returned to cse01 with the result of the simple search. In Step 10, cse01 returns the simple search result to the AE.

Conversely, a Hypercat server may expose the resources of a oneM2M CSE by adding a catalogue to represent the resources hosted by the CSE. Hypercat, as other standards like oneM2M, store metadata associated to datasets originating from IoT-enabled devices. oneM2M, in contrast to Hypercat, allows the storage and transfer of data itself. oneM2M metadata supports federation of data between CSEs and AEs, and may be extended to allow the publication of data to data catalogues such as Hypercat.

Three possible ways for publication of oneM2M data to Hypercat may be used, for example, depending on the scope of integration. First, attributes of oneM2M resources directly used to create Hypercat records. The Interworking Service would be in charge of creating Hypercat catalogues duplicating the metadata found in oneM2M resources. This option includes the continuous update of Hypercat catalogues with oneM2M metadata as data updates are provided into the system.

Second, HyperCAT may become aware of the organizational structure of oneM2M resources for a particular deployment or industrial vertical. The Interworking Service provides additional information regarding the nature of the data in oneM2M.

Third, Hypercat may use the semantic description of oneM2M resources to support query mechanisms.

The Hypercat 3.00 Specification does not support creating a catalogue through a web API. Herein, an API is described to enable the creation of a new catalogue on a Hypercat server. A oneM2M CSE may trigger the catalogue creation by performing the IoT Server Registration procedure to the Interworking Service. In turn, the Interworking Service sends the web API to create a new catalogue targeting the "/cat" URI and with a query parameter "newcat" set to "hcat01", or the name for the catalogue to be created. The payload of the request will include the contents of the catalogue which will include the catalogue-metadata as well as one or more items to correspond with the resources hosted on the CSE. Alternatively, a "newcat" URI may be added to the Hypercat 3.00 Specification to specify that a new catalogue is requested to be created. The catalogue name reference may then be placed at the beginning of the catalogue before the catalogue-metadata.

Figure 29:
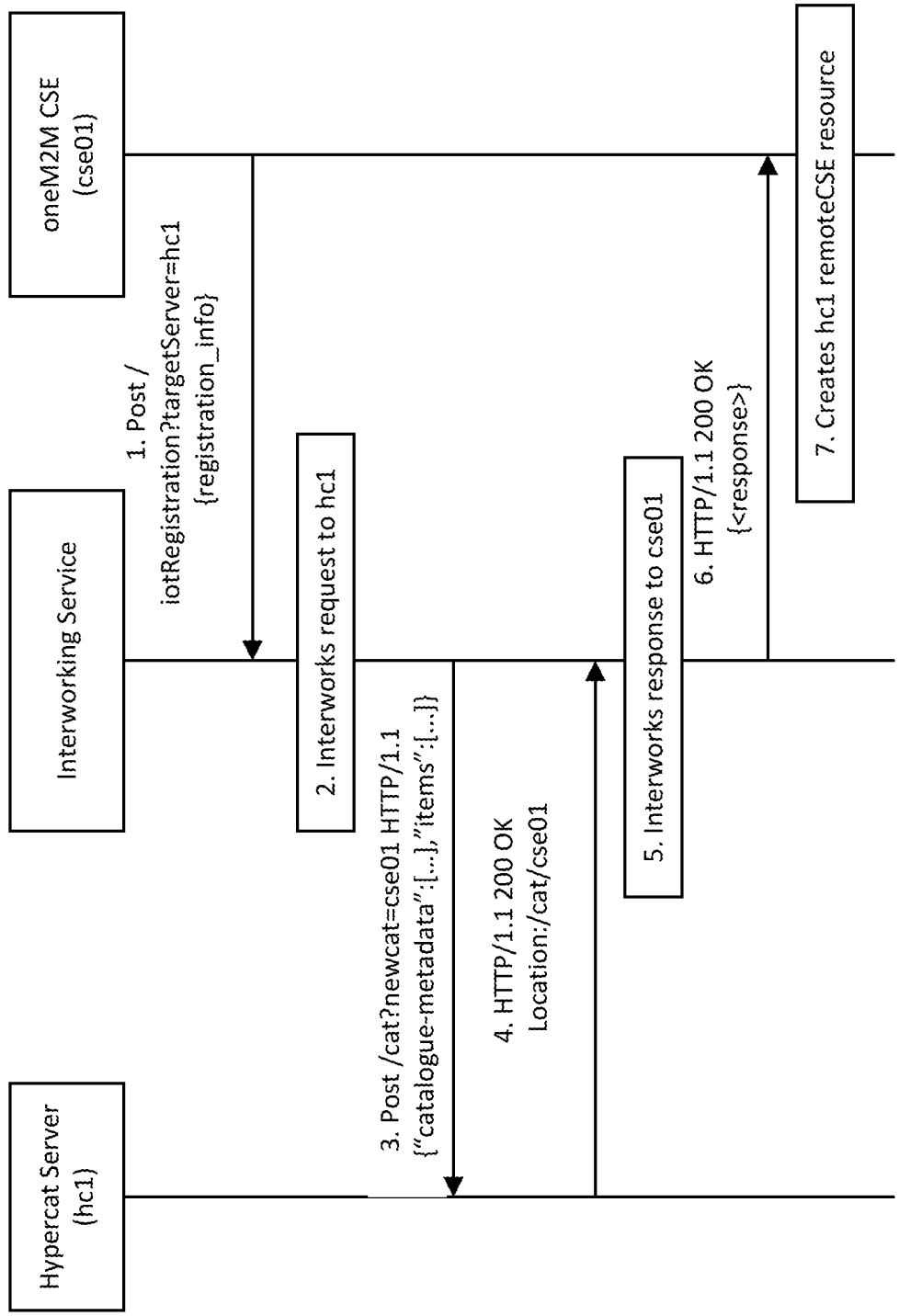
FIG. 29 is a call flow of an example IoT server registration from oneM2M CSE to HyperCAT server.

An example is shown in FIG. 29. In step 1 of FIG. 29, cse01 executes the IoT Server Registration procedure targeting a Hypercat server hc1 and providing the associate registration information to the Interworking Service. Cse01 may have previously discovered hc1 using the IoT Server Discovery procedure or had been provisioned with hc1's contact information. cse01 includes the Accept option with a value of "application/vnd.onem2m-res+json" to indicate the SL protocol it is associate with.

In step 2, the Interworking Service interworks the request to hc1.

In step 3, a Post request targeting the "/cat" URI and with a query parameter "newcat=hcat01" to specify the creation of a new catalogue with the name "hcat01". The message payload includes the contents of the catalogue-metadata and one or more item entries.

In step 4, hc1 returns an appropriate response. In Step 5, the Interworking Service interworks the response to cse01. In Step 6, the interworked response is sent to cse01. In Step 7, cse01 creates a remoteCSE resource hcat01 to represent the registration with hc1.

All oneM2M resources share Universal Attributes, as they extend from a base "Resource" class definition. oneM2M also defines a number of Common Attributes which are common among normal (not virtual) resources. Both Universal Attributes and Common Attributes may be used as a source of information to a data catalogue. Some oneM2M resources include attributes which map more directly to HyperCAT metadata attributes. A potential mapping of oneM2M resource attributes to HyperCAT metadata is listed in the table herein. The contentInfo attribute of a Content Instance resource describes the type of content upload. It is a composite attribute composed of an IETF RFC 6838 type of data and an encoding type, allowing content to be stored as Base64 or plain-text. contentInfo would need to be transformed from an RFC6838 type to a RFC2046 MIME type.

TABLE 11

Example Interworking oneM2M Attributes to Hypercat Metadata

| Attribute Name | oneM2M Resource Attribute | Hypercat Metadata |
| --- | --- | --- |
| lastModifiedTime | Universal Attribute | urn:X-hypercat:rels:lastUpdated ISO8601 UTC timedata string of last known update to resource |
| contentInfo | Content Instance | urn:X-hypercat:rels:containsContentType |
| Labels | Common Attribute | TBC |

Once the Hypercat server and oneM2M CSE are registered with each other, Hypercat clients may then perform searches of oneM2M resources through the Hypercat server.

Figure 30:
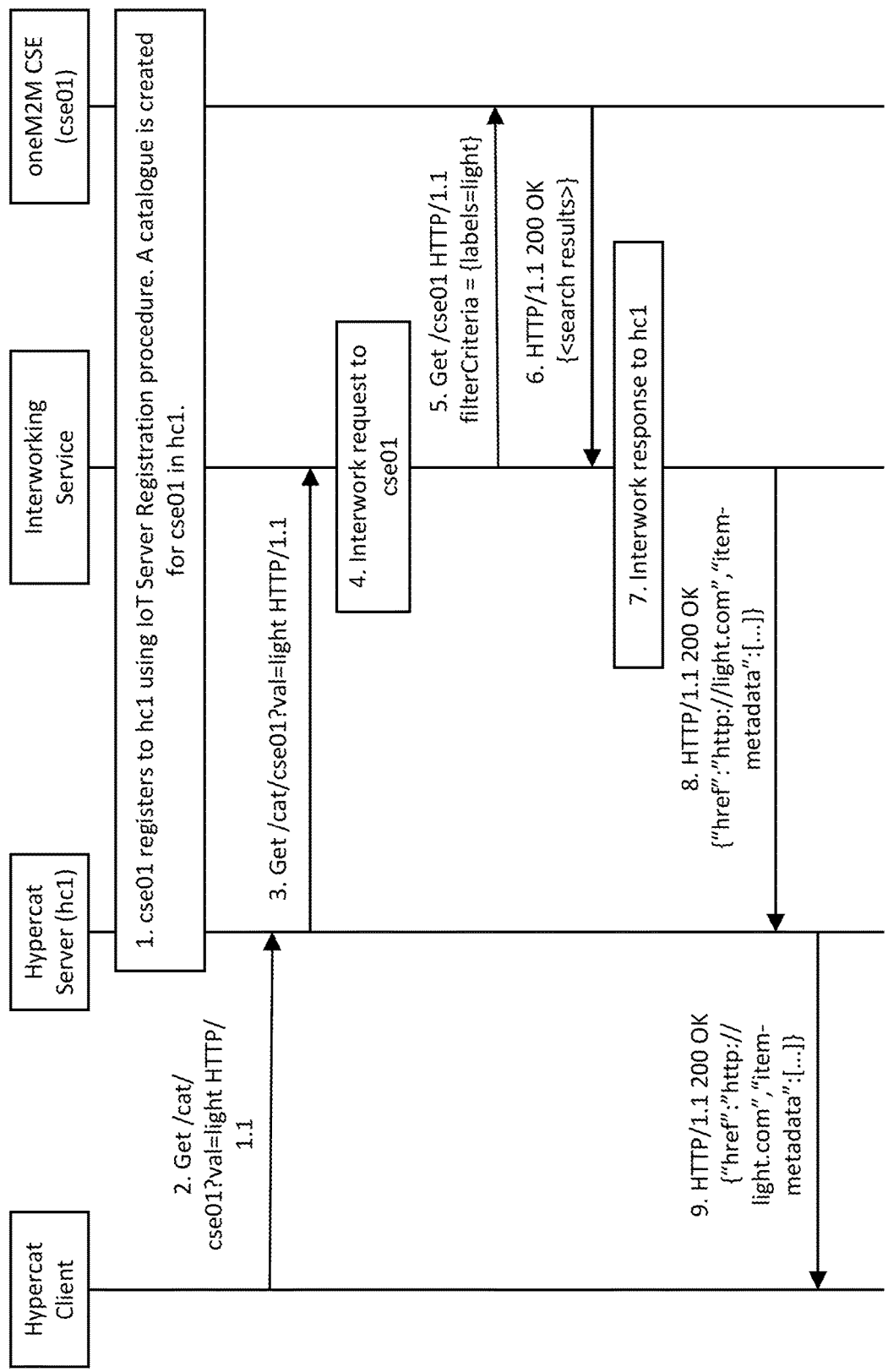
FIG. 30 is a call flow of an example interworking involving a HyperCAT client search and a oneM2M resource discovery.

FIG. 30 shows an example of such an interworking scenario. In step 1 of FIG. 30, cse01 registers to hc1 using either the IoT Server Registration request or the oneM2M CSE registration request. A catalogue is created for cse01 in the Hypercat server.

In step 2, a Hypercat client may target the cse01 catalogue to perform searches for oneM2M resources with a particular value. Note that at present, the Hypercat 3.00 Specification does not provide for a way to target a specific catalogue to search from. An alternative approach is to add the specification of the cse01 catalogue using a query string of the search request. For example, the search request may be specify as "Get/cat?iwt=oneM2M&val=light HTTP/1.1". This example highlights the use of the interworking attributes in Table 10.

Figure 31:
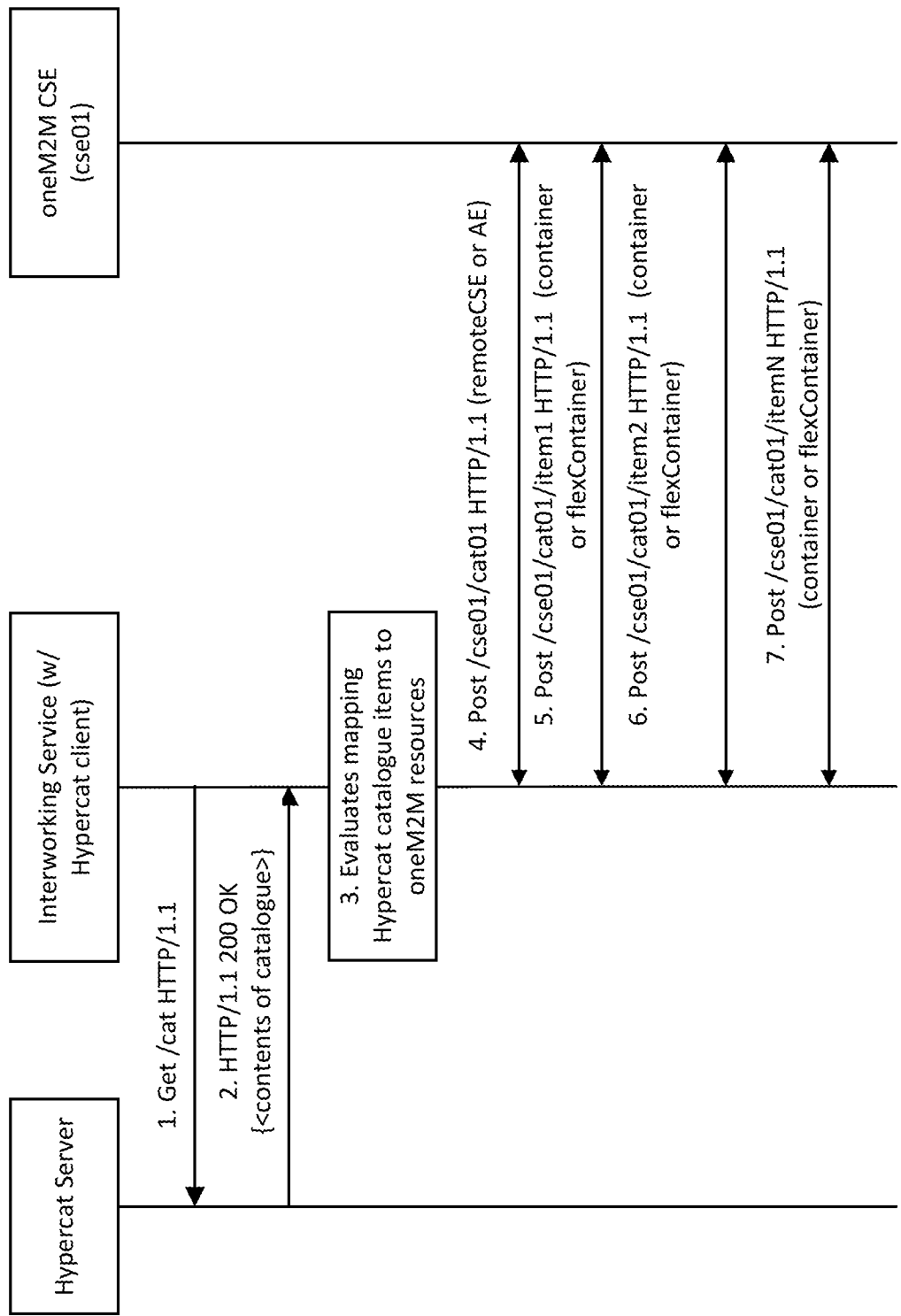
FIG. 31 is a call flow of an example interworking involving a HyperCAT catalogue items and oneM2M CSE resources.
Figure 32:
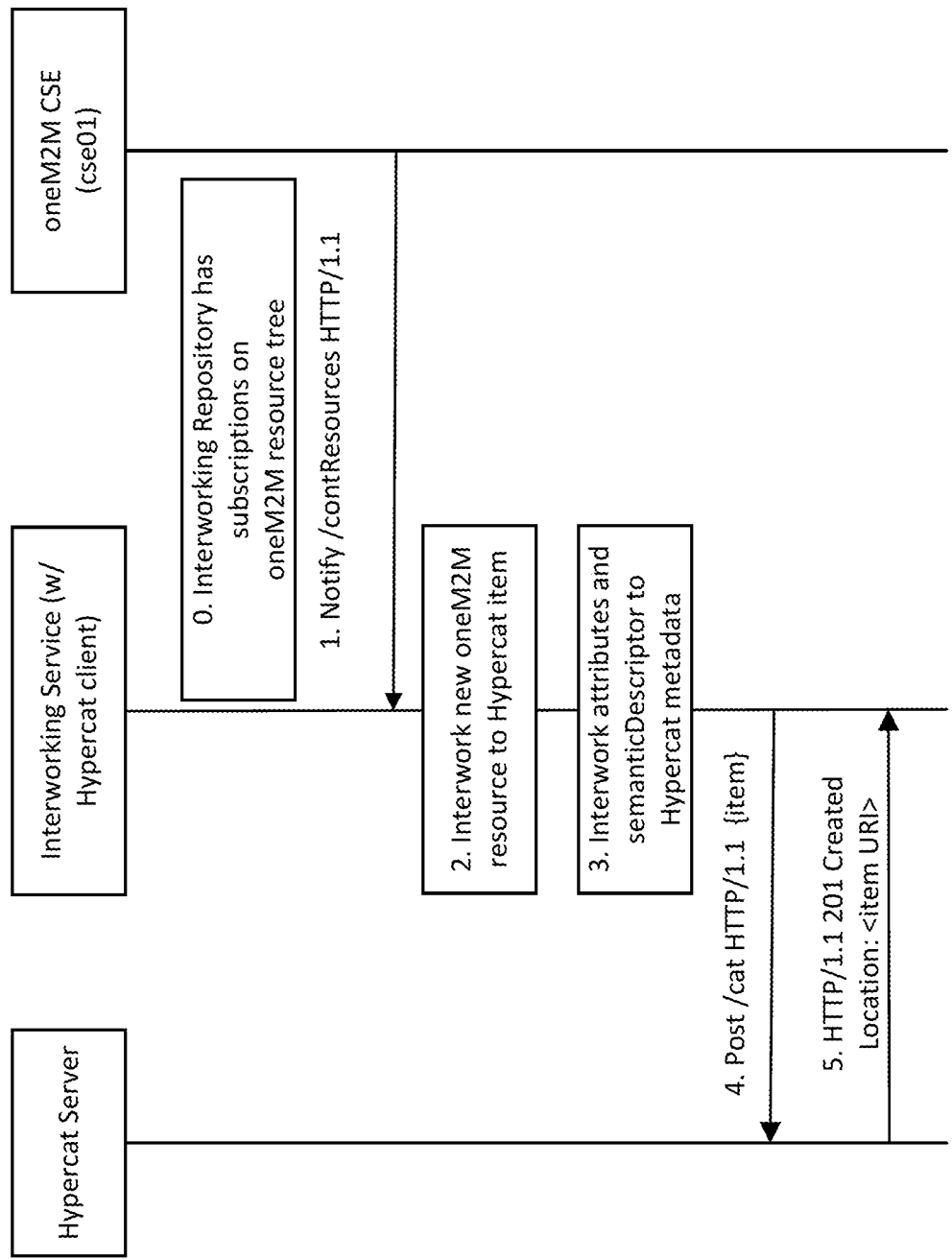
FIG. 32 is a call flow of an example interworking involving a oneM2M CSE resources and HyperCAT catalogue items

In step 3, the Hypercat server forwards the request to the Interworking Service. In Step 4, the Interworking Service interworks the request to a oneM2M resource discovery request. In Step 5, the interworked request is sent to cse01. In Step 6, cse01 returns an appropriate response to the discovery request. In Step 7, the Interworking Service interworks the response to hc1. In Step 8, the interworked response is sent to hc1. In Step 9, hc1 returns the search results from cse01 to the Hypercat client. Once the Hypercat server and the oneM2M CSE are registered with each other, the Interworking Service may be utilized as a Hypercat client to retrieve catalogues and interwork the items in the catalogues into resources in a oneM2M CSE to take advantage of the CSE's semantic capabilities. Similarly, the Interworking Service may be used by an oneM2M CSE or AE to publish oneM2M resources to a Hypercat server. FIG. 31 shows an example of the former case and FIG. 32 shows an example of the latter case. In both examples, the Interworking Service is shown as an external, standalone entity. However, it may easily be integrated into either the Hypercat server or the oneM2M CSE as well.

FIG. 31 shows Interworking of Hypercat Catalogue Items to oneM2M CSE Resources. In step 1 of FIG. 31, the Interworking Service performs a Get operation of the catalogue hosted on the Hypercat server. If there are multiple catalogues available, there may be multiple Get requests—one for each catalogue. The Get operation may be triggered by an administrator of the Interworking Service, by a oneM2M AE performing a retrieve of the remoteCSE resource associated with the Hypercat catalogue, or by a CSE in response to the successful creation of a remoteCSE resource as described in connection with FIG. 29.

In step 2, the Hypercat server returns the contents of the catalogue.

In step 3, the Interworking Service evaluates the contents of the catalogue and maps each item to a oneM2M resource. A simple mapping table may be created at or provisioned to the Interworking Service by a special client; the mapping table may also be updated later by the special client. The mapping table specifies how to map Hypercat catalogue and its items including their metadata to oneM2M resources. As an simple example: 1) each Hypercat catalogue is associated with an oneM2M CSE and each item of a catalogue corresponds to a container or flexContainer resource under the CSE; 2) then, the metadata of the catalogue itself and each catalogue item is mapped to oneM2M attributes and/or a semanticDescriptor child resource within the oneM2M resource. In another example, a Hypercat catalogue may be mapped to an oneM2M AE and the catalogue's items mapped to container or flexContainer resources. As a result, oneM2M attributes or a semanticDescriptor child resource of the container/flexContainer may be used for mapping with the catalogue metadata, and content instance child resource may map with items where item metadata maps to the semanticDescriptor child resource of the contentInstance resource.

In step 4, the Interworking Service first registers the catalogue by creating a remoteCSE or AE resource on cse01 to correspond with the current catalogue.

In step 5, then for the first item in the catalogue, an oneM2M container resource is created under the remoteCSE or AE resource cat01. The metadata of the item is interworked as the semanticDescriptor attribute of the container resource. For other mapping scenarios, the corresponding resources are created accordingly.

In step 6, a second oneM2M container resource may be created for item2 under the cat01 remoteCSE resource. The meta-data of item2 may be interworked to the semanticDescriptor attribute of the container resource.

In step 7, for each item in catalogue cat01, a corresponding oneM2M container resource and the associate semanticDescriptor attribute are created up to itemN, which represents the last item in the catalogue.

In addition to the Get request shown in FIG. 31, the Interworking Service may subscribe to changes in the Hypercat catalogue using the Hypercat subscription mechanism "Get/cat/events" to get notifications of changes to the catalogue. Then upon a notification from the Hypercat server, the Interworking Service may update the oneM2M resource accordingly. Note the changes in the Hypercat catalogue may entail adding, updating, or deleting catalogue items and the notifications will reflect that. As a result, the corresponding oneM2M changes also reflect the method applied to the resources, whether it is created, updated, or deleted.

FIG. 32 shows the inverse case where changes to the oneM2M resource tree is reflected in the Hypercat catalogue. In step 0 of FIG. 32, the Interworking Service maintains subscriptions on the oneM2M resource tree to get notifications of newly created resources. Alternatively, the Interworking Service may perform periodic retrieves of the oneM2M resource tree using filter criteria to discover new resources.

In step 1, a oneM2M container is created and the CSE notifies the Interworking Service. Alternatively, either an Update or Delete operation may also trigger a notification to the Interworking Service. The Interworking Service responds to the notification but it is not shown in FIG. 32.

In step 2, the Interworking Service evaluates the new resource and maps it to a Hypercat item. For an Update or Delete operation, the Hypercat catalogue item is provided in the notification.

In step 3, then the Interworking Service interworks the oneM2M resource's attributes and semanticDescriptor to Hypercat metadata for the item. For a Delete operation, no interworking of oneM2M attributes to Hypercat metadata is performed.

In step 4, a Post request is sent from the Interworking Service to the Hypercat server to create the new catalogue item. A Put request is sent if an update to the resource occurred and a Delete request is sent if the resource was deleted from the oneM2M resource tree.

In step 5, the Hypercat server returns an appropriate response for the status of creating the item. If the status was successful (201 Created), the Hypercat server also returns the URL of the catalogue of the item in the HTTP location header. If the oneM2M resource was modified, then a Put (or Post) request is made to the URL provided in the successful response to update the item.

Interworking is a fluid process and may need updates as new device types are introduced into the IoT system. As such, the architecture of the Interworking Service is designed to support this dynamic nature. An administrator or authorized user may access the Interworking Service remotely through the web interface to add new mapping tables as new device types are deployed. FIG. 33 shows an example user interface of a data model mapping table. The table shows a mapping of LWM2M objects to oneM2M resources. There are options to add, delete, or update the entries in the table using the buttons displayed at the bottom. In addition, the version of the corresponding SL protocols are displayed and the time stamp of the last update are provided on the left hand side.

Figure 34:
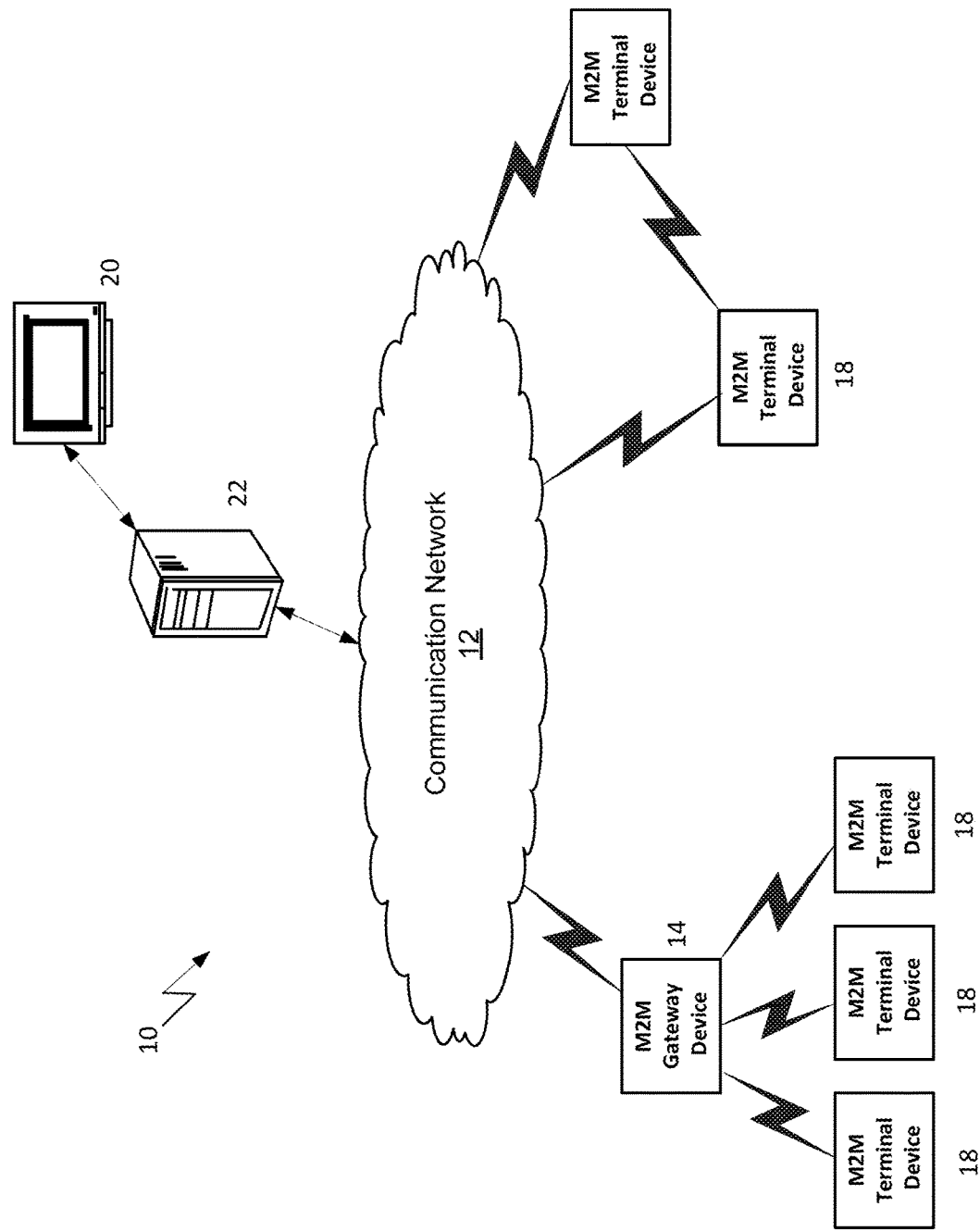
FIG. 34 is a system diagram of an example machine-to-machine (M2M), Internet of Things (IoT), or Web of Things (WoT) communication system in which one or more disclosed embodiments may be implemented.

FIG. 34 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 2-11, 13-25, and 28-32 may comprise a node of a communication system, such as the ones illustrated in FIGS. 2-11, 13-25, and 28-32

The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer may provide applications and/or various devices with access to a collection of or a set of the above mentioned capabilities or functionalities, supported by the service layer, which may be referred to as a CSE or SCL. A few examples include but are not limited to security, charging, data management, device management, discovery, provisioning, and connectivity management which may be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

As shown in FIG. 34, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 34, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 35:
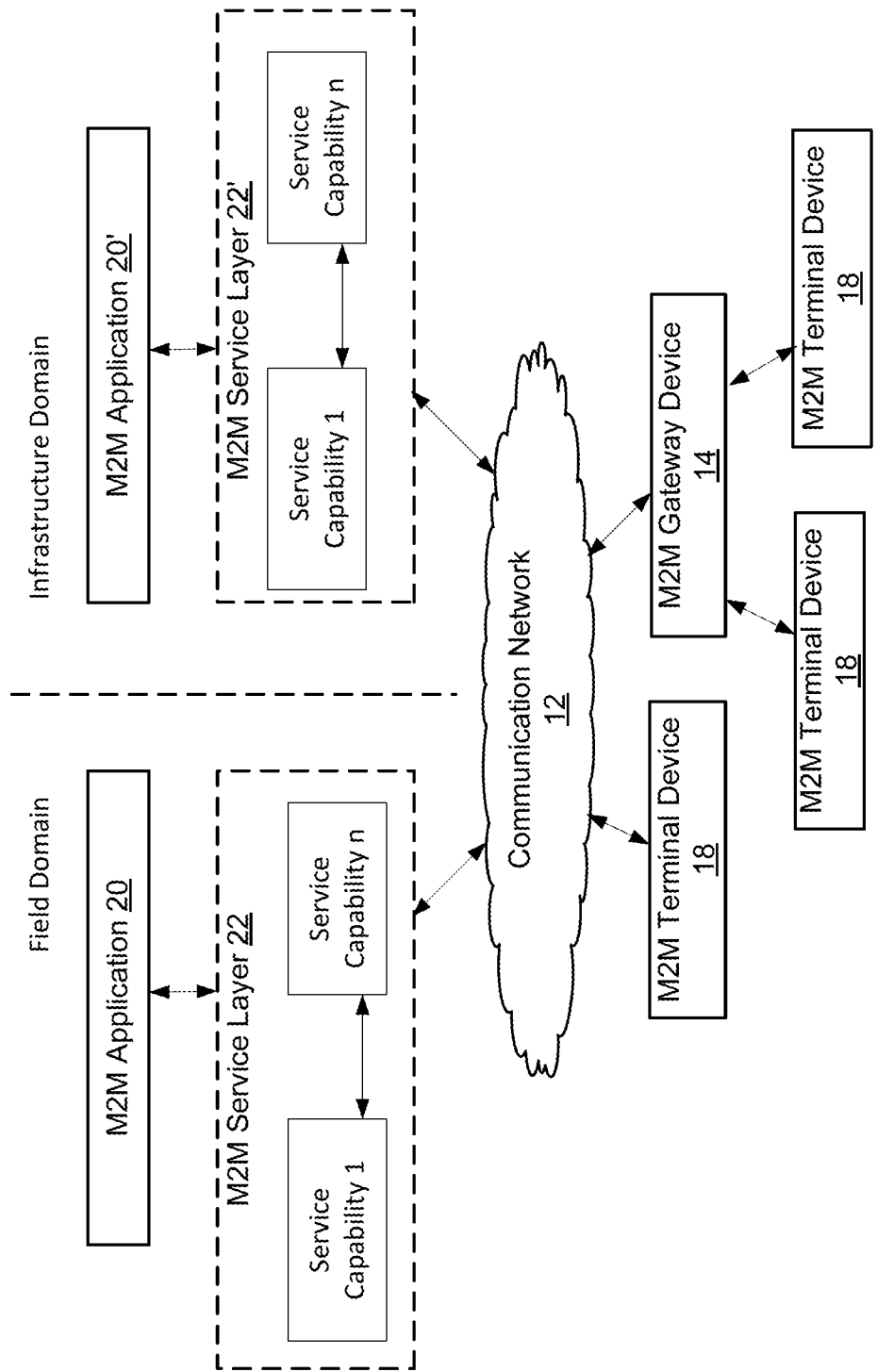
FIG. 35 is a system diagram of an example architecture that may be used within the M2M/IoT/WoT communications system illustrated in FIG. 34.

Referring to FIG. 35, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 35, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 35, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 36 or FIG. 37 described below.

Further, the methods and functionalities described herein may be implemented as part of an M2M network that uses a Service Oriented Architecture (SOA) and/or a Resource-Oriented Architecture (ROA) to access services.

Figure 36:
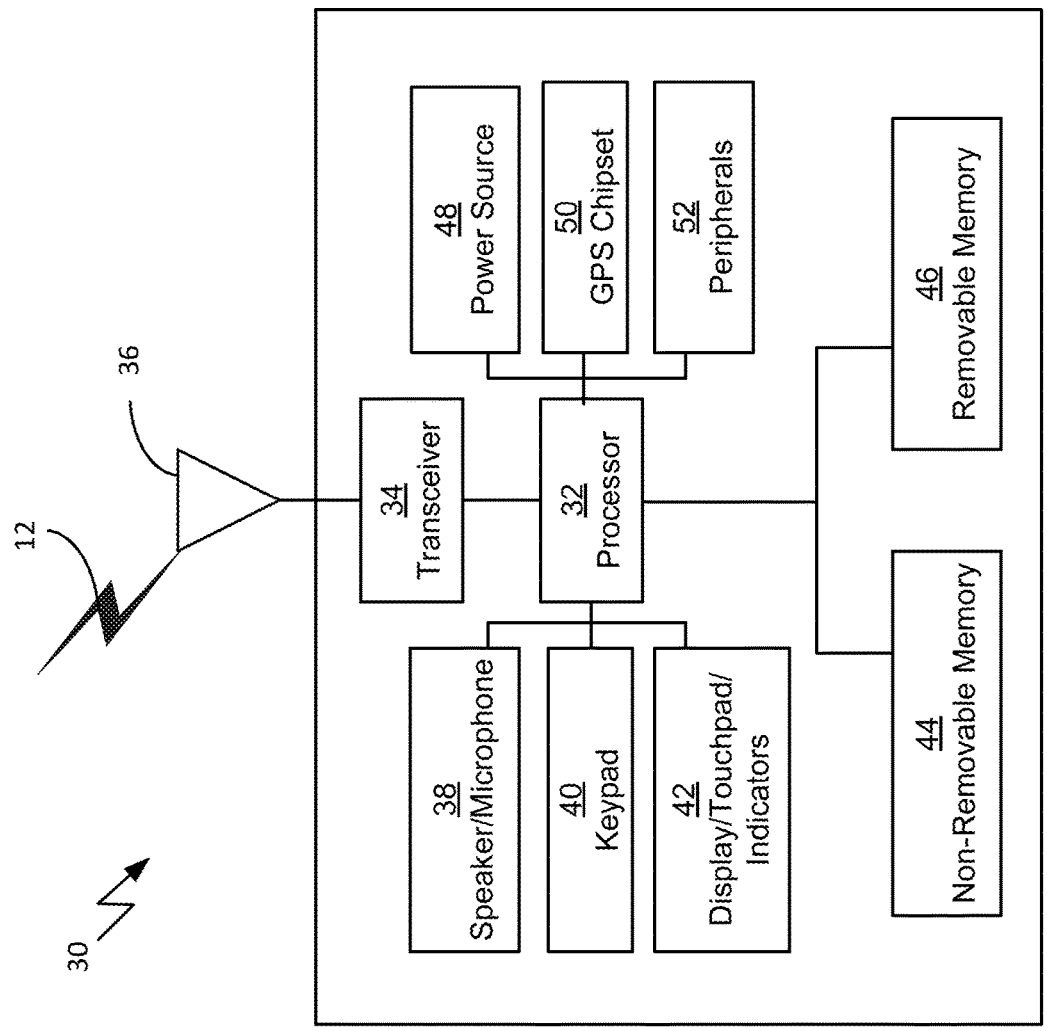
FIG. 36 is a system diagram of an example communication network node, such as an M2M/IoT/WoT device, gateway, or server that may be used within the communications system illustrated in FIGS. 34 and 35.

FIG. 36 is a block diagram of an example hardware/software architecture of a node of a network, such as one of the clients, servers, or proxies illustrated in FIGS. 2-11, 13-25, and 28-32, which may operate as an M2M server, gateway, device, or other node in an M2M network such as that illustrated in FIGS. 2-11, 13-25, and 28-32. As shown in FIG. 36, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements interworking and related methods described herein, e.g., in relation to the methods described in reference to FIGS. 8-10, 12-25, and 28-33 or the data structures of FIGS. 11, 16, 27, and 33, Examples 1-6, Tables 2-11, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 36, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the interworking and related methods described herein, e.g., in relation to FIGS. 8-10, 12-25, and 28-33, or in a claim. While FIG. 36 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 36 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 37:
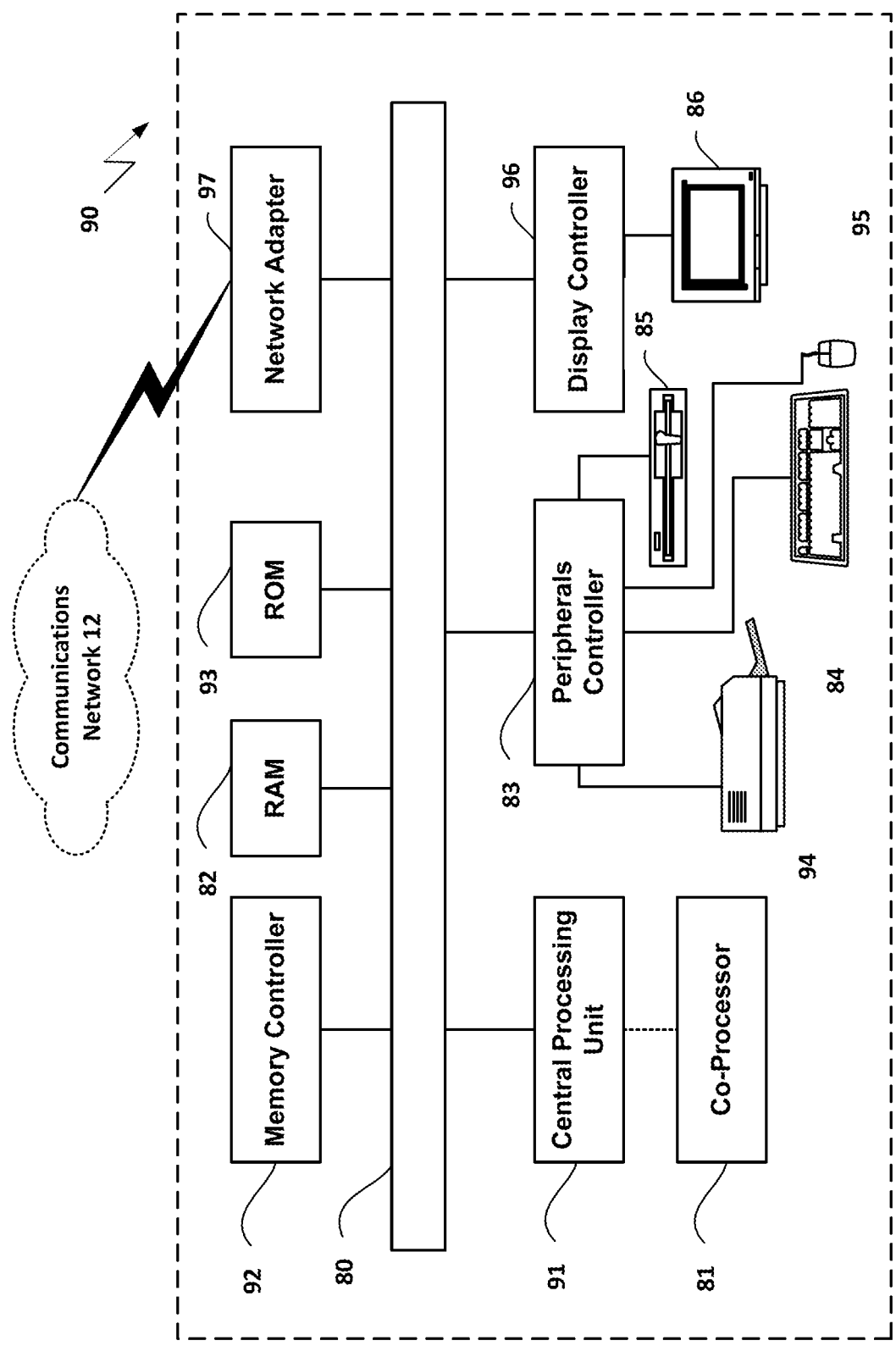
FIG. 37 is a block diagram of an example computing system in which a node of the communication system of FIGS. 34 and 35 may be embodied.

FIG. 37 is a block diagram of an exemplary computing system 90 which may also be used to implement one or more nodes of a network, such as the clients, servers, or proxies illustrated in FIGS. 2-11, 13-25, and 28-32, which may operate as an M2M server, gateway, device, or other node in an M2M network such as that illustrated in FIGS. 2-11, 13-25, and 28-32.

Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 34-37, to enable the computing system 90 to communicate with other nodes of the network.

We claim:

1. A first apparatus for providing an internet of things, IoT, interworking service, the first apparatus comprising a processor, a memory, and communication circuitry, the first apparatus being connected to a network via its communication circuitry, the first apparatus further comprising computer-executable instructions stored in the memory of the first apparatus which, when executed by the processor of the first apparatus, cause the first apparatus to perform operations comprising:
    sending, to a second apparatus, a discovery request, the discovery request being sent in a first service layer protocol, the second apparatus being an IoT device;
    receiving, from the second apparatus, a response to the discovery request, the response comprising first information regarding the second apparatus which is to be shared with an IoT server and being sent in the first service layer protocol;
    adding, to a repository of device information, the information regarding the second apparatus, the information regarding the second apparatus being derived from the response to the discovery request;
    selecting, based on a repository of server information, the repository of device information, and a policy, a third apparatus, wherein the third apparatus is compatible with the second apparatus and is an IoT server;
    sending, to the third apparatus selected according to the policy, a request message, the request message being sent in a second service layer protocol and requesting registration at the third apparatus of the second apparatus; and
    receiving, from the third apparatus, a response to the request message, the response to the request message being sent in the second service layer protocol and indicating whether the second apparatus has been registered at the third apparatus.

2. The first apparatus of claim 1, wherein the response to the discovery request comprises an indication of a server type.

3. The first apparatus of claim 1, wherein the response to the discovery request comprises an identifier of the third apparatus.

4. The first apparatus of claim 1, wherein the response to the discovery request comprises an indication of a supported service, a supported interface type, or a supported device type.

5. The first apparatus of claim 1, wherein the instructions further cause the first apparatus to:
    receive, from the third apparatus, a server registration request; and
    add, to the repository of server information, information provided in the server registration request.

6. The first apparatus of claim 5, wherein the server registration request further comprises an indication of a security protocol, a supported service, or a service territory.

7. The first apparatus of claim 5, wherein the server registration request further comprises an indication of an availability, a capacity, or a loading.

8. The first apparatus of claim 1, wherein the instructions further cause the first apparatus to send, to a fourth apparatus via the second service layer protocol, a device registration request, the device registration request comprising an identifier of the second apparatus.

9. The first apparatus of claim 1, wherein the instructions further cause the first apparatus to:
    receive, from the second apparatus via the first service layer protocol, a first message, where the first message is intended for a fourth apparatus;
    compose, based on the first message, a second message; and
    send, to the fourth apparatus via the second service layer protocol, the second message.

10. The first apparatus of claim 9, wherein composing the second message comprises translating the first message using a mapping table.

11. The first apparatus of claim 10, wherein the instructions further cause the first apparatus to provide a web interface whereby a user may adjust the mapping table.

12. The first apparatus of claim 9, wherein composing the second message comprises translating the first message using a protocol unit.

13. The first apparatus of claim 9, wherein composing the second message comprises altering content in accordance with a rule or policy.

14. The first apparatus of claim 13, wherein the instructions further cause the first apparatus to provide a web interface whereby a user may adjust the rule or policy.

15. An apparatus for providing an internet of things, IoT, interworking service, the apparatus, comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
    receiving, from a plurality of IoT servers, server registration requests, where each server registration request comprises an indication of a service layer protocol;
    maintaining a repository of server information, the repository of server information comprising information derived from the IoT server registration requests;
    receiving, from a plurality of IoT devices, discovery requests, wherein each discovery request comprises an indication of a IoT server type and information regarding the IoT device which is to be shared with an IoT server;

maintaining a repository of device information, the repository of device information comprising information derived from the discovery requests;

maintaining a repository of policies;

determining, based on the policies and a discovery request, a first IoT server that is compatible with a first IoT device;

sending, to the first IoT server, a request message, the request message being sent in a first service layer protocol and requesting registration at the first IoT server of the IoT device; and receiving, from the first IoT server, a response to the request message, the response to the request message being sent in the first service layer protocol and indicating a status of the registration of the IoT device at the first IoT server.

16. The first apparatus of claim 15, wherein the instructions further cause the apparatus to:

receive, from a second IoT device via a first service layer protocol, a first message, where the first message is intended for a server;

compose, based on the first message, a second message;

send, to the server via a second service layer protocol, the second message.

17. The first apparatus of claim 15, wherein composing the second message comprises translating the first message using a mapping table.

18. The first apparatus of claim 15, wherein composing the second message comprises translating the first message using a protocol unit.

19. The first apparatus of claim 15, wherein composing the second message comprises altering content in accordance with a rule or policy.

* * * * *